United States Patent [19]

Steinberg et al.

[11] 4,109,187
[45] Aug. 22, 1978

[54] CONTOUR CONTROL SYSTEM INCLUDING CUTTER RADIUS COMPENSATION

[75] Inventors: Walter A. Steinberg, Huntington Station; Howard E. Parker, Syosset, both of N.Y.

[73] Assignee: Autonumerics, Inc., Hauppage, N.Y.

[21] Appl. No.: 615,361

[22] Filed: Sep. 22, 1975

[51] Int. Cl.² ............................................. G05B 19/24
[52] U.S. Cl. .................................. 318/572; 318/570; 318/574
[58] Field of Search ............... 318/572, 570, 574, 573; 235/151.11

[56] References Cited

U.S. PATENT DOCUMENTS

| 2,933,244 | 4/1960 | Tripp | 318/572 |
| 3,866,179 | 2/1975 | McGee et al. | 318/572 |
| 3,939,330 | 2/1976 | Fluet | 318/572 |

*Primary Examiner*—Robert K. Schaefer
*Assistant Examiner*—Michael K. Mutter
*Attorney, Agent, or Firm*—Stevens, Davis, Miller & Mosher

[57] ABSTRACT

A control system for moving a machining member relative to a workpiece table in accordance with a set of programmed input instructions which correspond to a prescribed path of movement, including a main contour control logic to generate output signals to move the machining member relative to the table in accordance with the stored values of the components I and J of a main contour vector, a sub-contour control logic which generates output signals to move the machining member based on the stored values of the components $i$ and $j$ of a sub-contour vector, and cutter compensation control logic which enables either the main or the sub-contour control logic to operate based on a determination of whether the main contour vector is leading or lagging the sub-contour vector.

23 Claims, 49 Drawing Figures

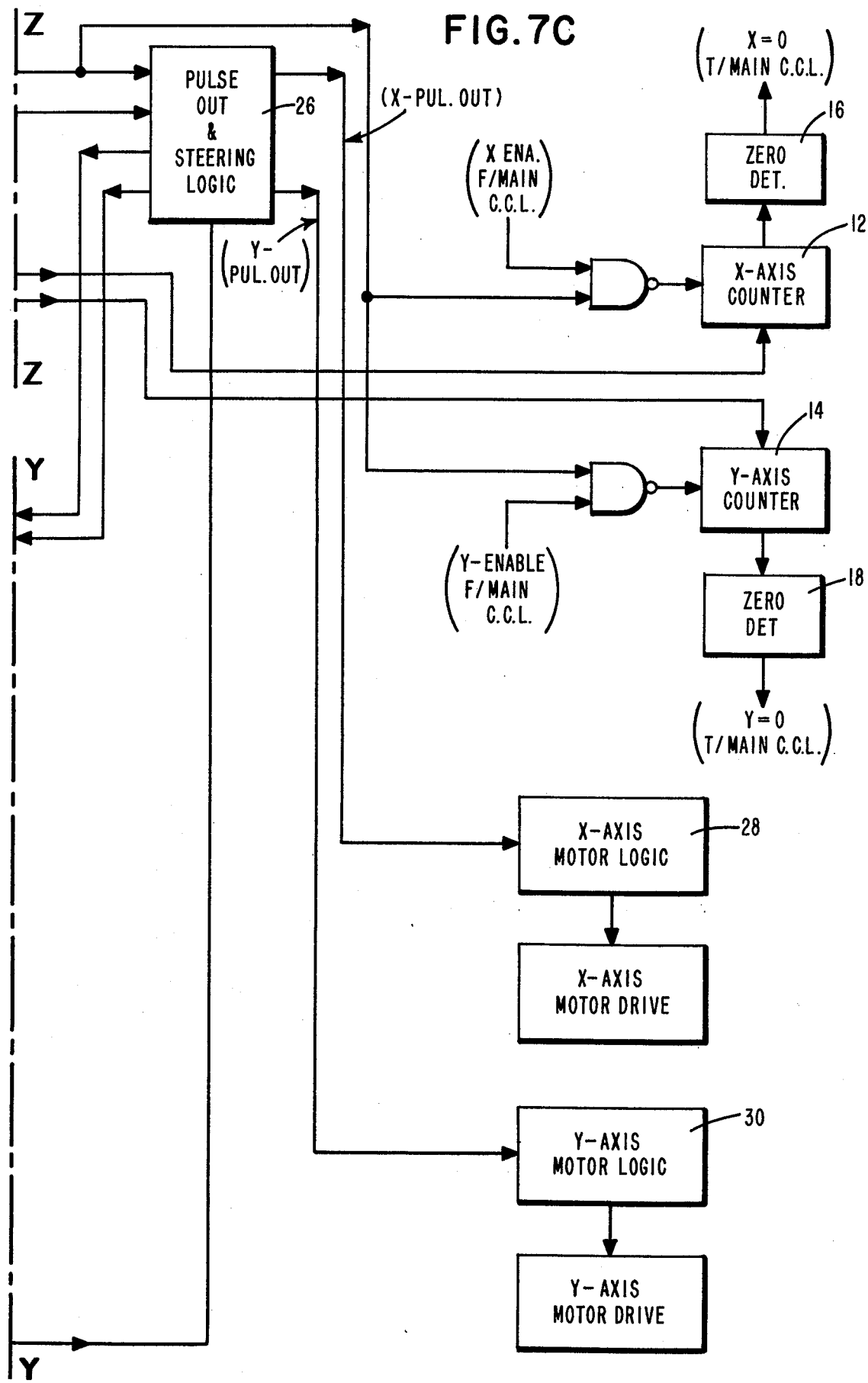

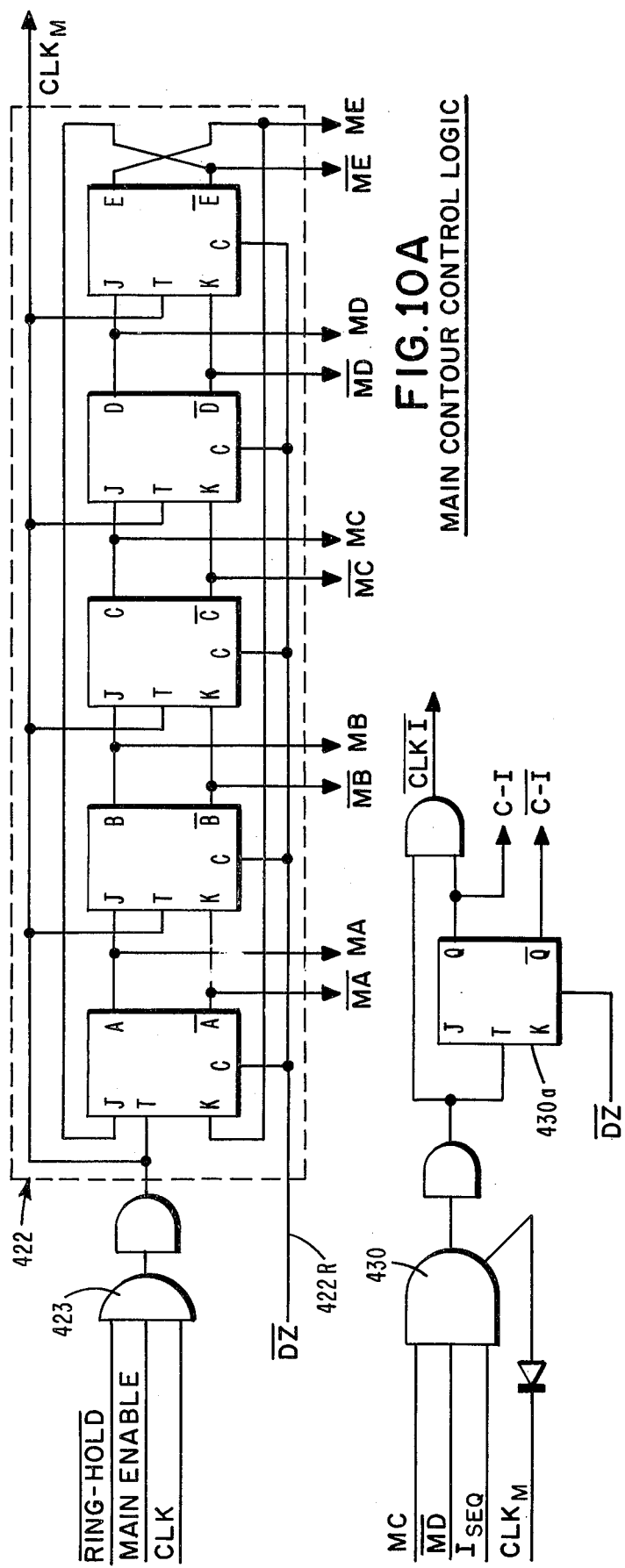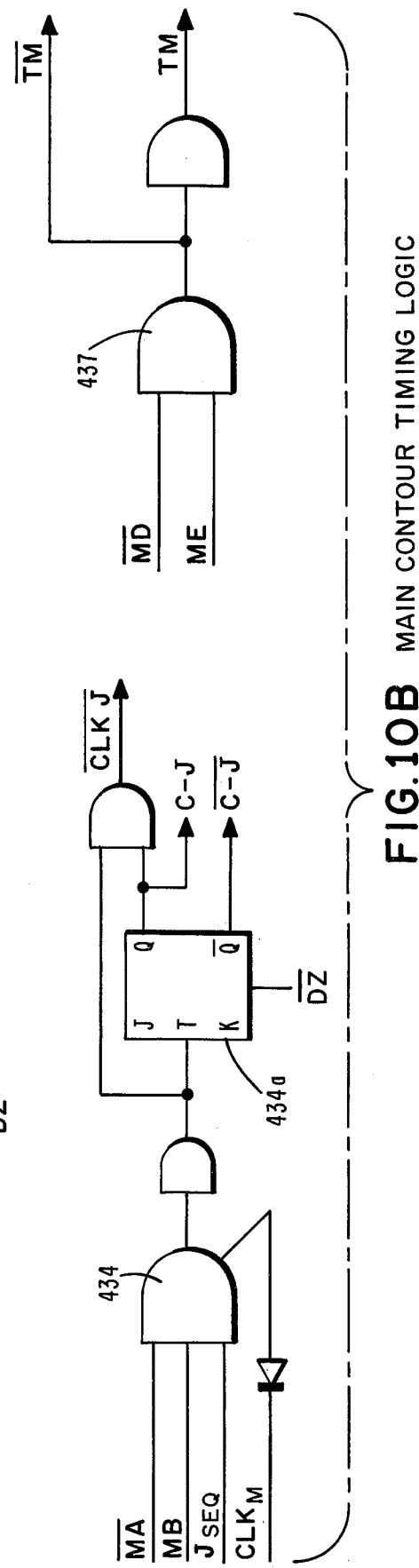
FIG.10A MAIN CONTOUR CONTROL LOGIC
FIG.10B MAIN CONTOUR TIMING LOGIC

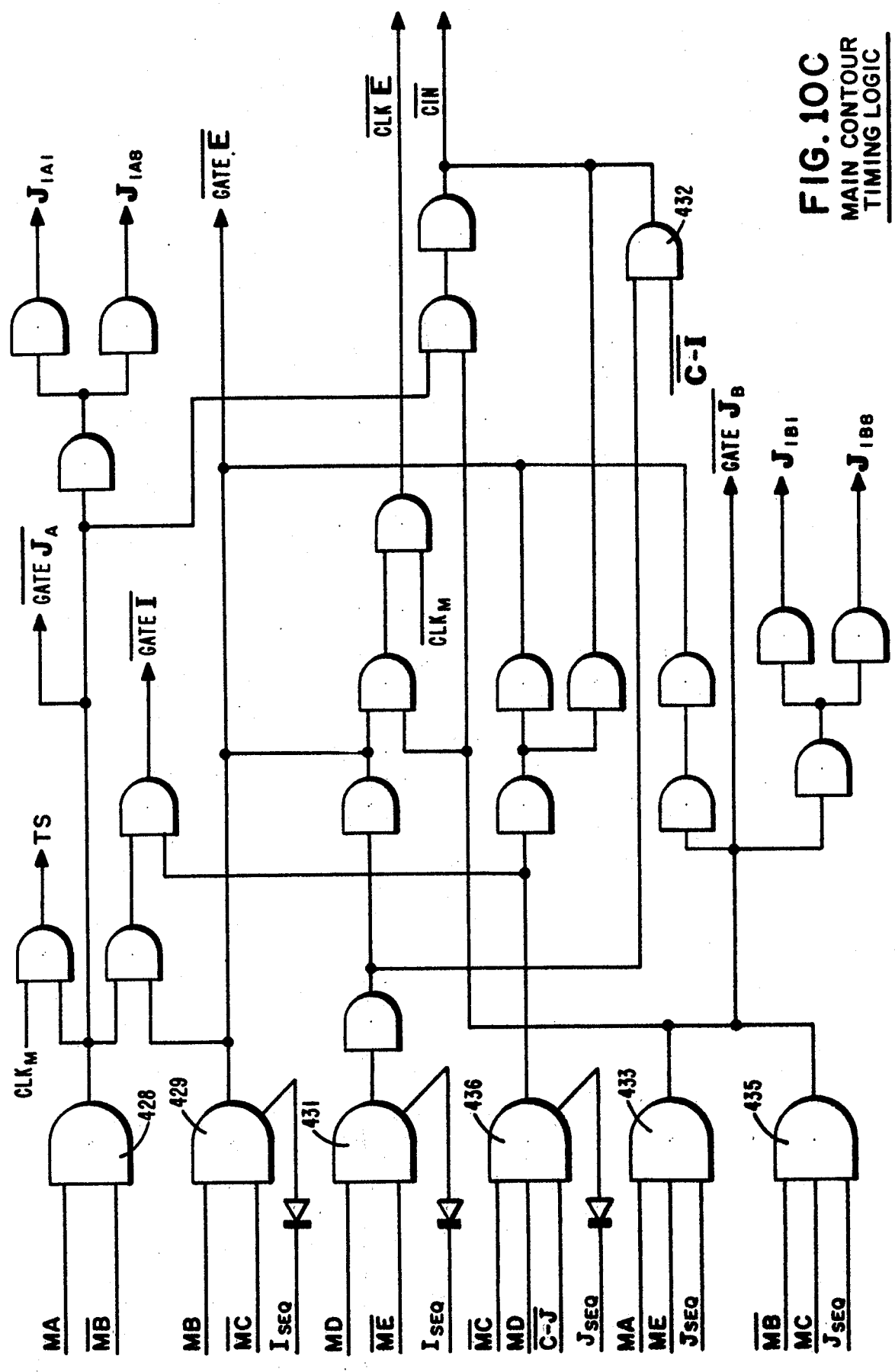

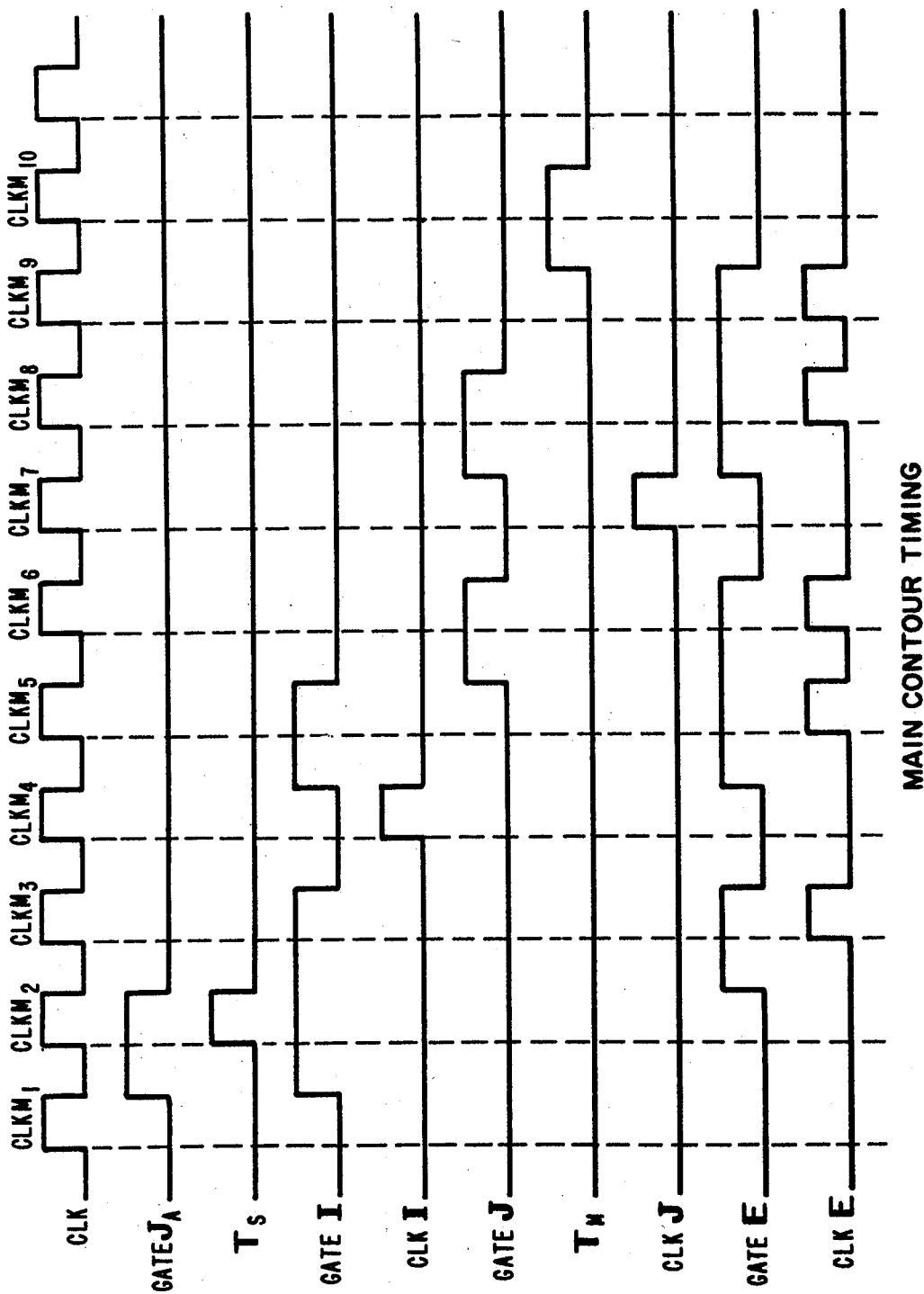
FIG. 11　MAIN CONTOUR TIMING

I/J SEQUENCE LOGIC

SUB CONTOUR CONTROL LOGIC i/j SEQUENCE LOGIC

DIRECT OFFSET / CROSS OFFSET LOGIC

FIG. 16
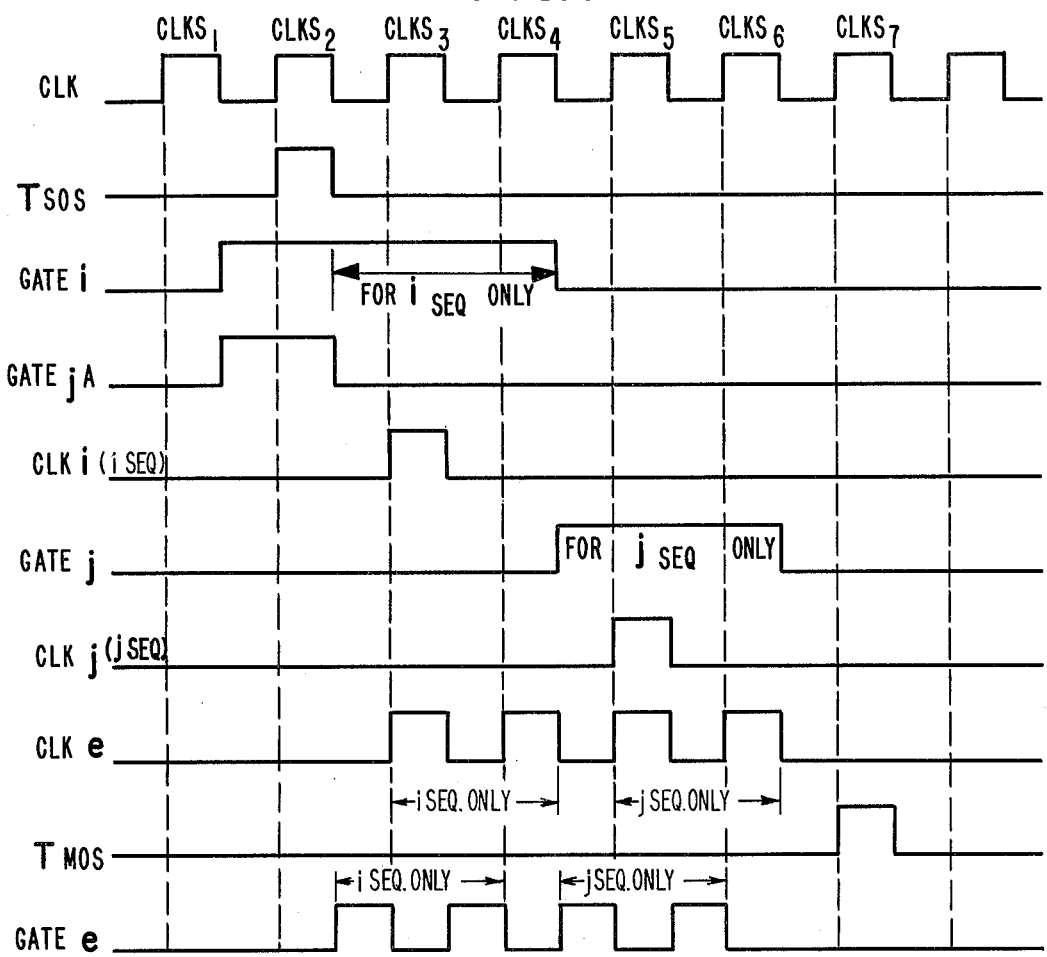
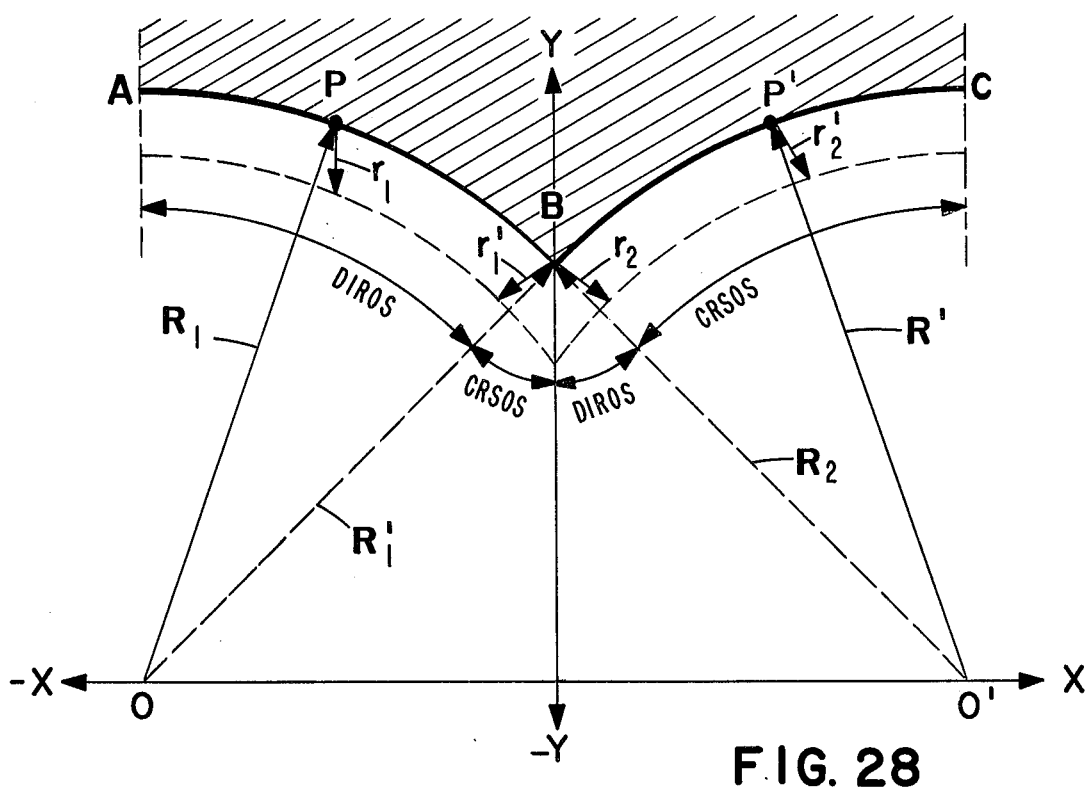
FIG. 28

OFFSET LOAD LOGIC

SIGNS & STEERING LOGIC

STEERING LOGIC

TRUE-COMPLEMENT LOGIC

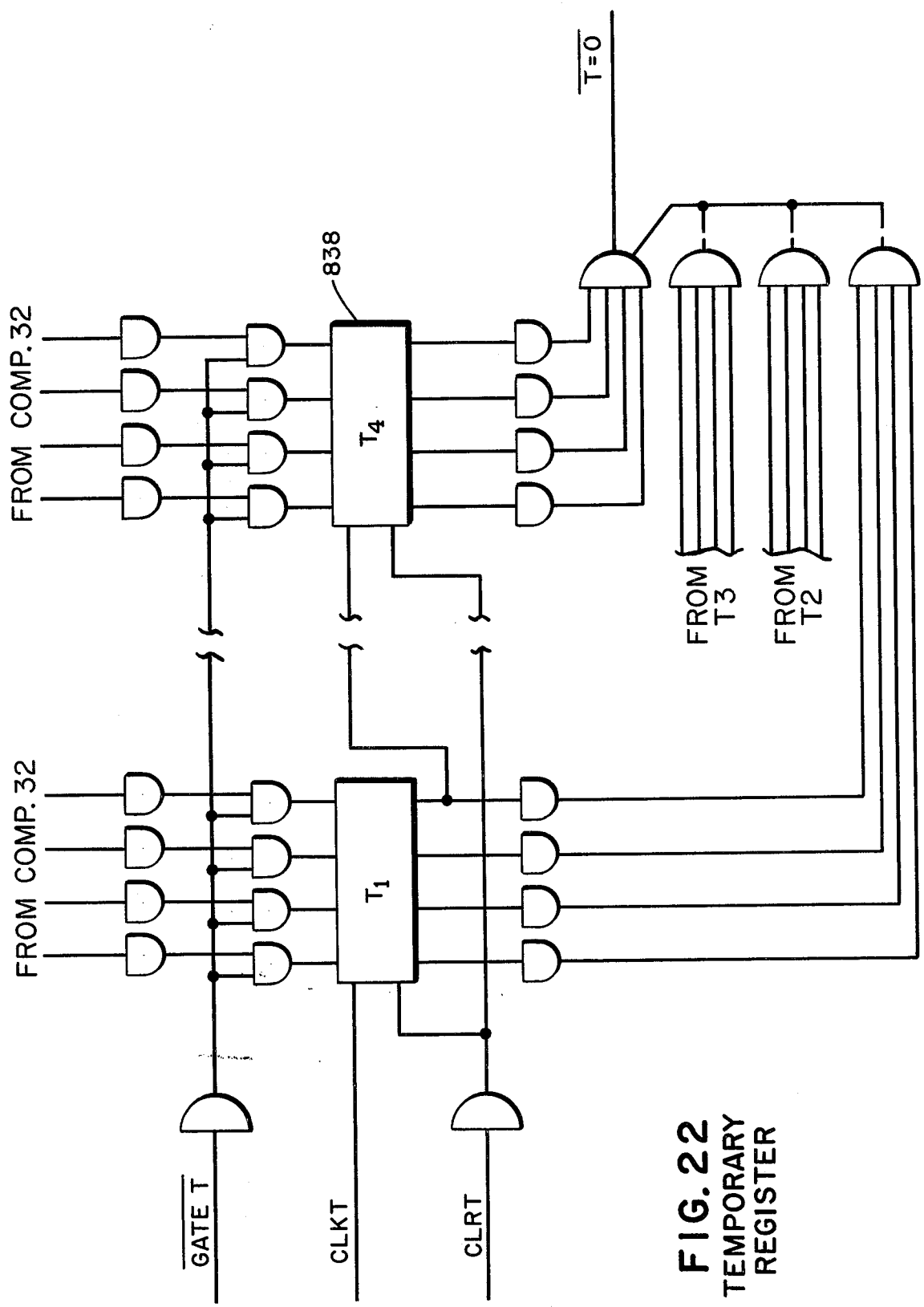
FIG. 22 TEMPORARY REGISTER

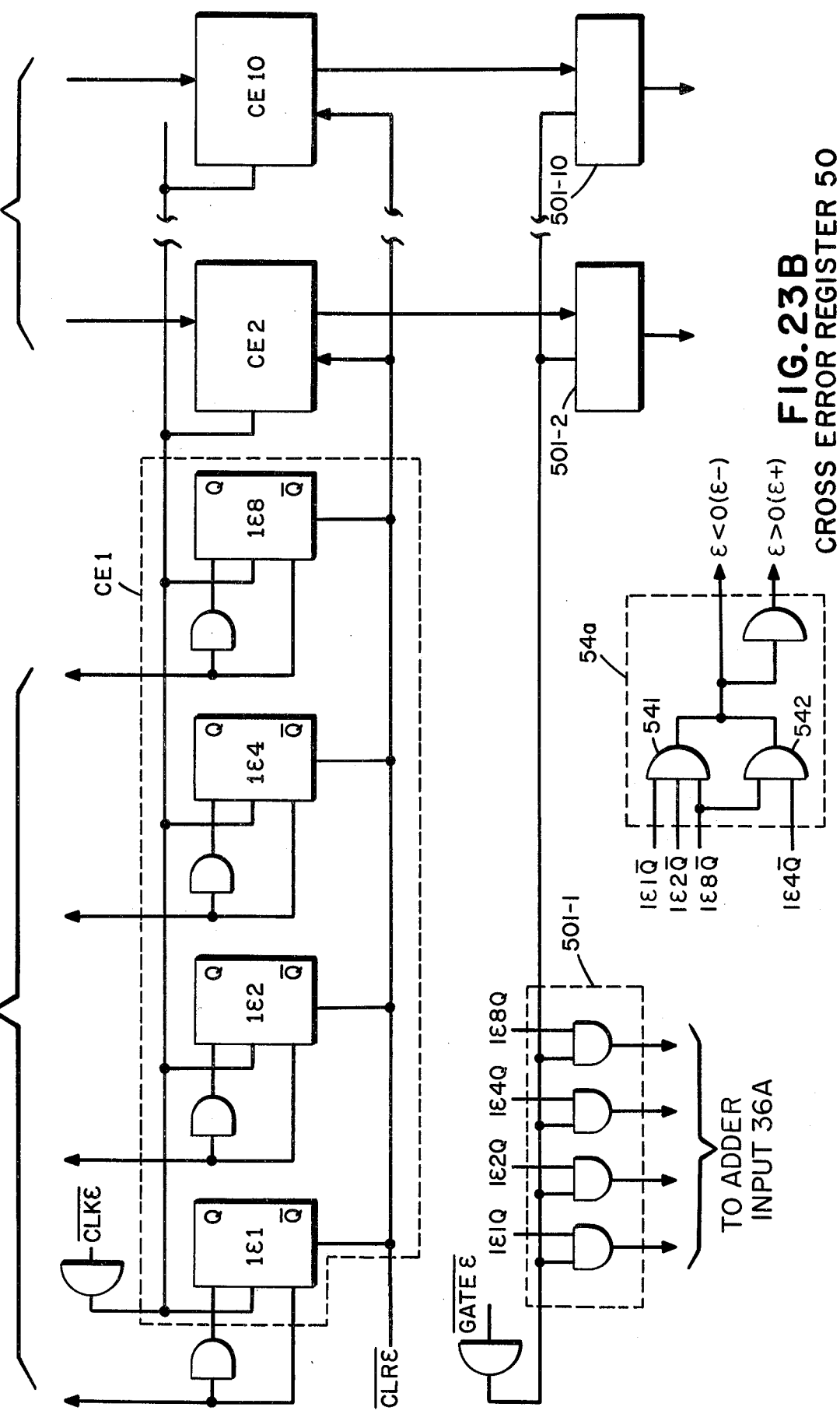

UPDATE CONTROL LOGIC

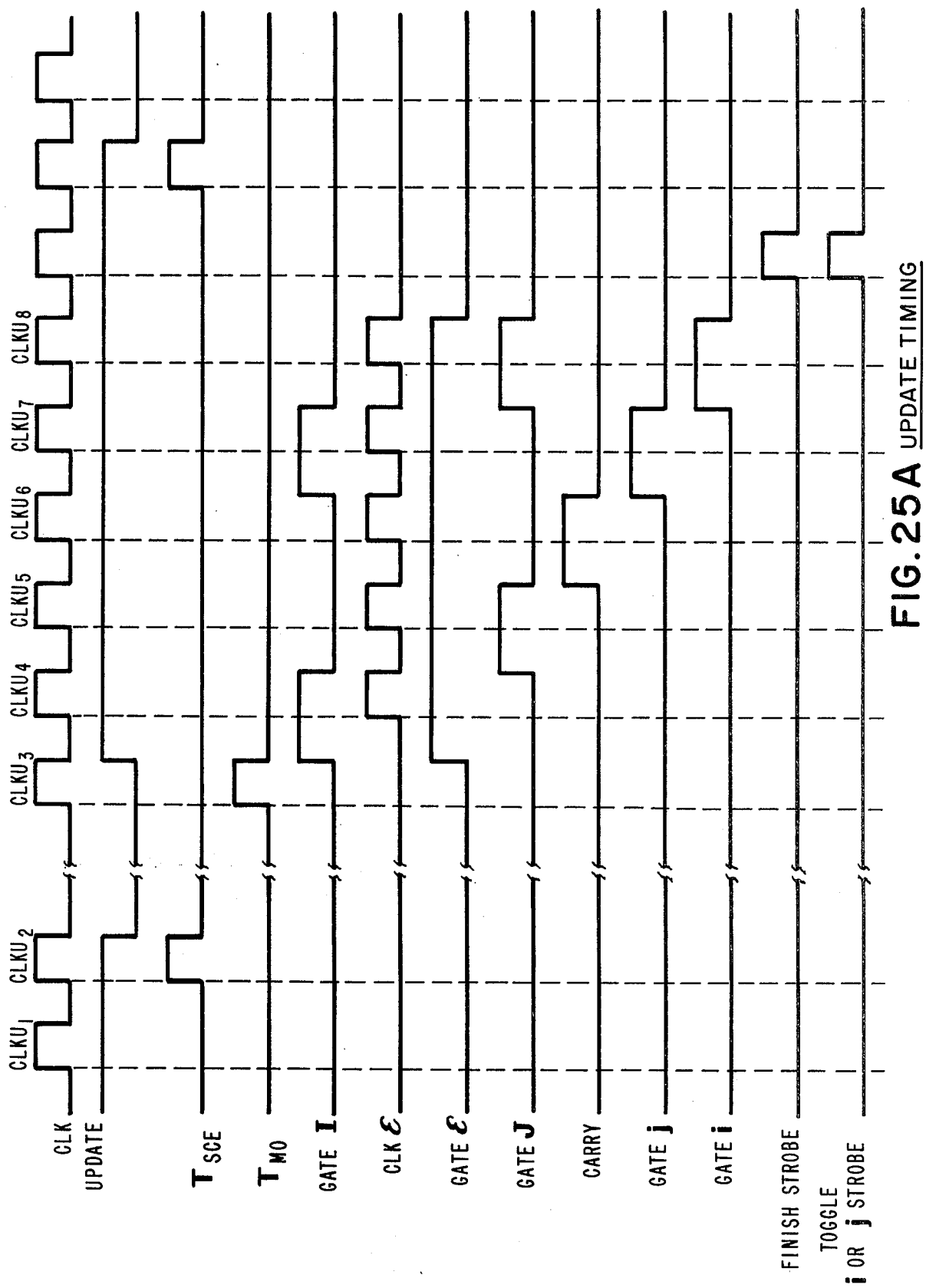
FIG. 25A UPDATE TIMING

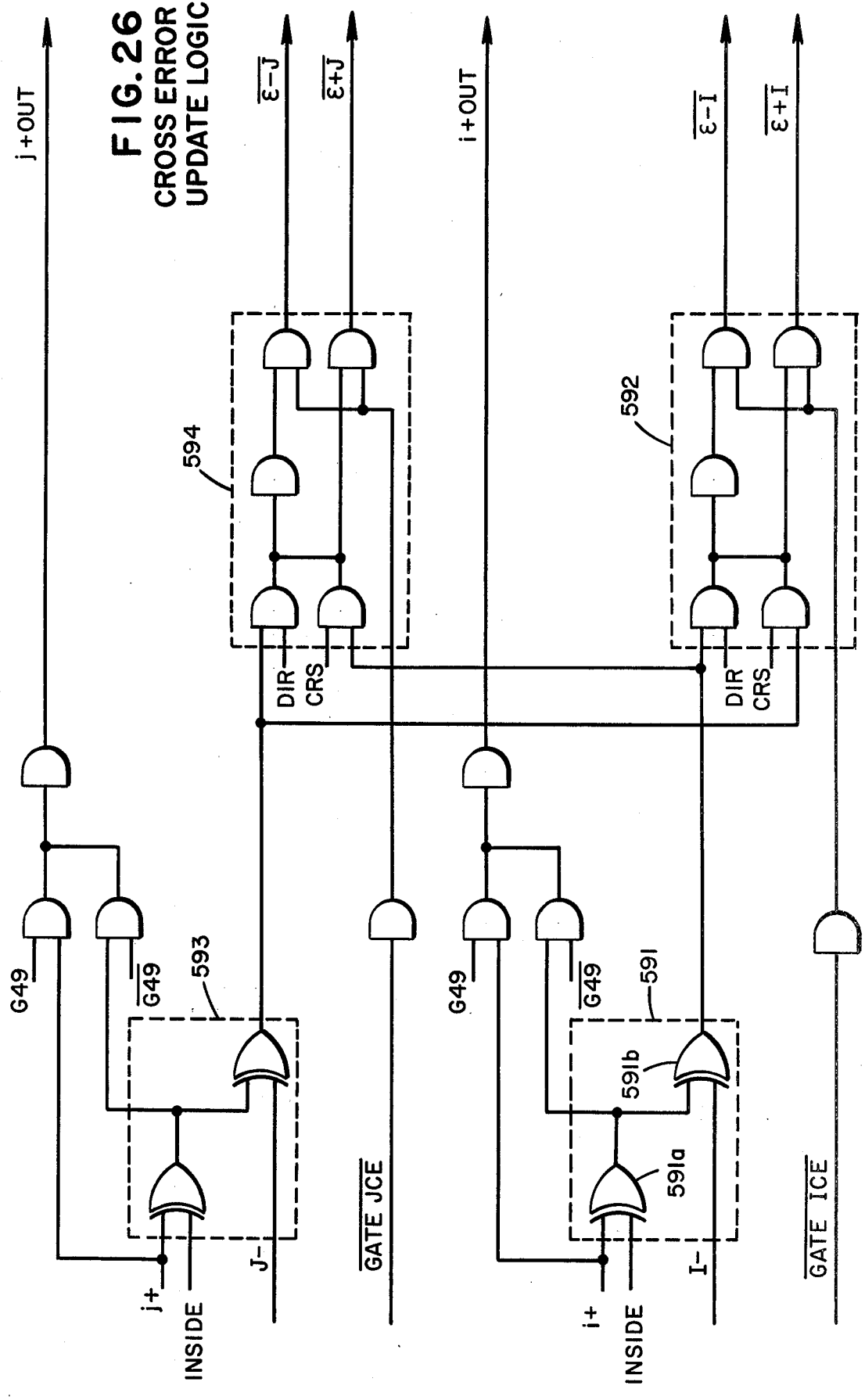
FIG. 26 CROSS ERROR UPDATE LOGIC

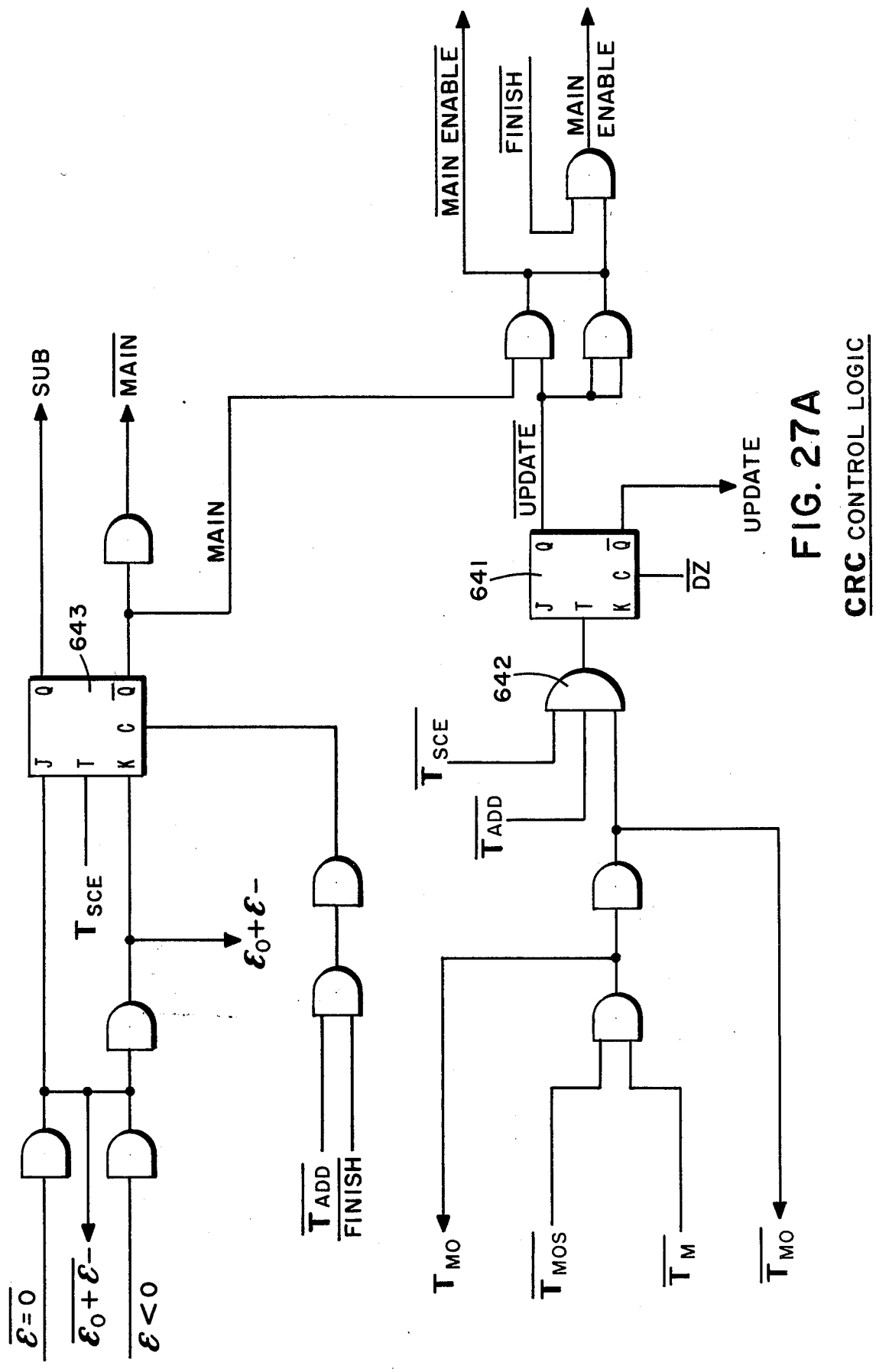
FIG. 27A CRC CONTROL LOGIC

ROTATE LOGIC

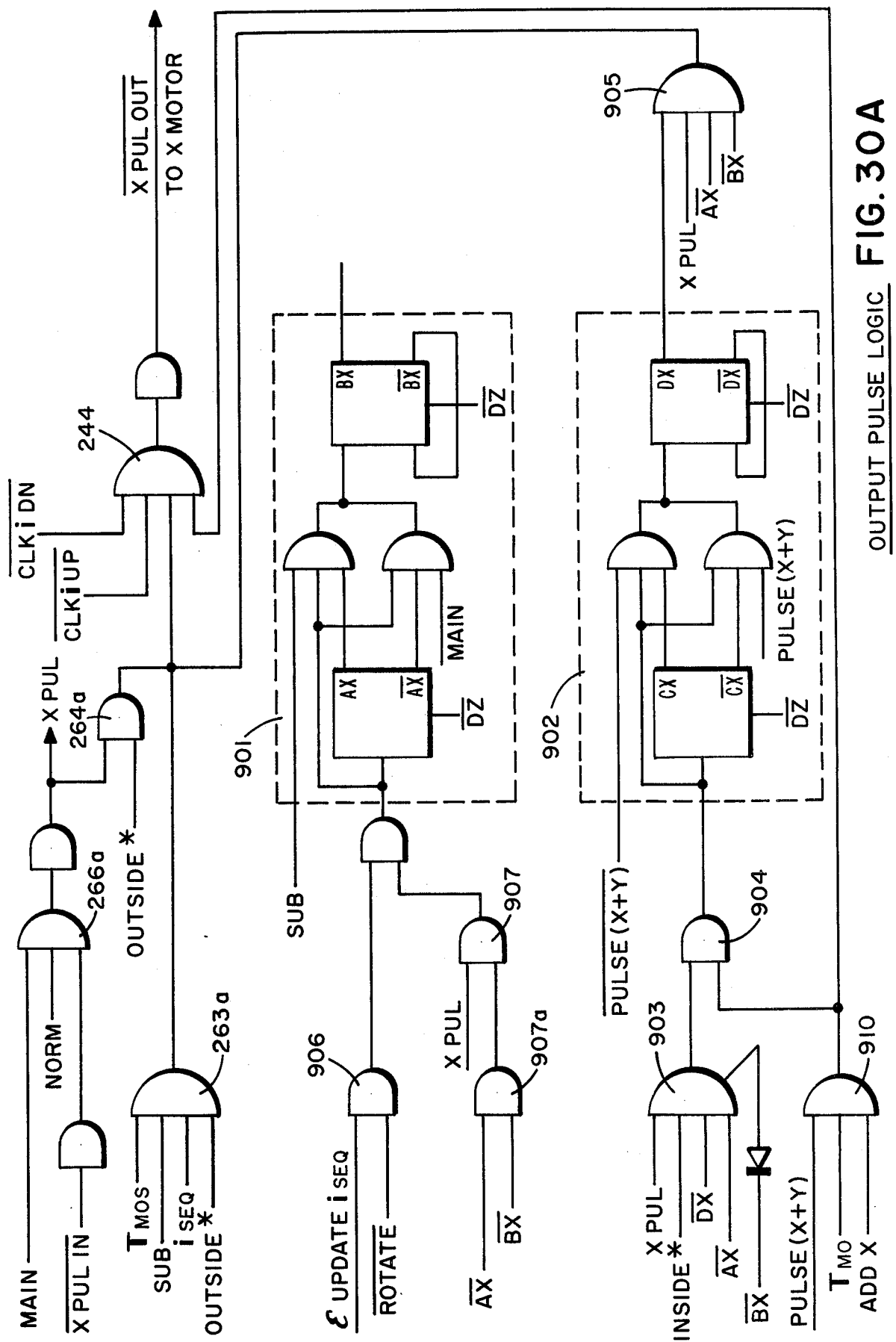

CONTOUR CONTROL SYSTEM INCLUDING CUTTER RADIUS COMPENSATION

BACKGROUND OF THE INVENTION

The invention relates to a method and apparatus for numerically controlled contouring systems. The invention is particularly directed to a system in which the size of the cutter element, especially the diameter thereof, is taken into consideration.

The prior art is replete with patents disclosing numerically controlled milling machines with cutter radius compensation. None of the prior art, however, describes a system in which the main contour control and the sub- or tool-contour control are interrelated and interdependent.

SUMMARY OF THE INVENTION

The system of this invention controls the relative positioning of a machining member, such as the cutting tool, and a workpiece support table by performing two contouring operations based on the length and direction of a main contour vector and a sub-contour vector. The main contour vector is coincident with the radius of the circle or arc to be contoured; the sub-vector is coincident with the radius of the tool. The main and subvectors are broken down into their components in two mutually perpendicular directions (e.g. the X and Y directions for a planar cutting table). These components are I and J for the main contour vector and $i$ and $j$ for the sub-contour vector.

Movement of the main contour vector is directly controlled by a main contour control logic and the movement of the sub-vector is controlled by a sub-contour control logic. The main and sub-contour control logics in turn operate under the direction of a cutter radius compensation control logic which enables either the main or the sub-contour control logic to operate depending upon whether the sub-vector is leading or lagging the main vector.

The main and sub-vector relationships are monitored by taking the cross product of the main and sub-vector components to determine a cross-error $E = Ij - iJ$. A sub-contour operation will be performed if the cross-error $E$ is greater than zero, indicating that the main vector is leading the sub-vector, and a main contour operation is performed if the cross-error is less than or equal to zero indicating that the main vector is even with or lagging the sub-vector. The cross-error is updated after each main or sub-contour operation to permit the cutter radius compensation (CRC) control logic to again enable the appropriate main or sub-contour control logic.

Additional features of this invention are set forth in the following description of the preferred embodiment with reference to the accompanying drawing figures.

BRIEF DESCRIPTION OF THE DRAWING

FIGS. 7A-7C are a block diagram of the CRC system;

FIGS. 10A-10C show the main contour timing logic;

FIG. 11 is a main contour logic timing diagram;

FIG. 16 is a sub-contour logic timing diagram;

FIG. 22 shows a part of the temporary register;

FIGS. 23A-23B show the cross-error register;

FIG. 25A is an update control timing diagram;

FIG. 26 shows the cross-error update computation logic;

FIGS. 27A-27B show the CRC control logic;

FIG. 28 shows the main and sub-vector relationships for an inside-to-inside cut with CRC; "

FIGS. 30A-30C show the output pulse logic;

DESCRIPTION OF THE PREFERRED EMBODIMENT

Figure 1:
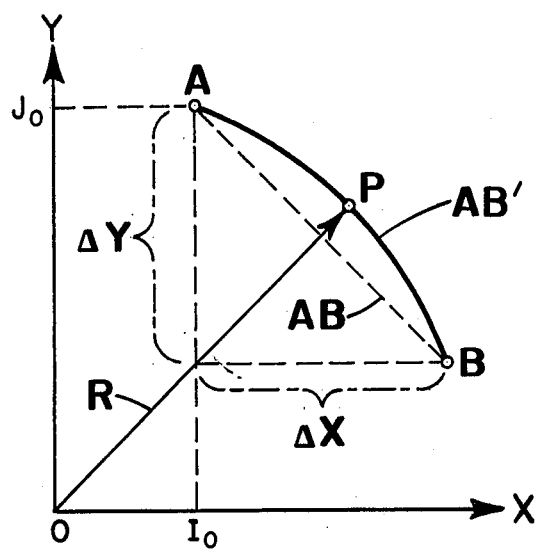
FIGS. 1-3 illustrate conventional contouring techniques.

In a conventional contouring system, the programmer enters the values of X, Y, $I_o$ and $J_o$ where X and Y represent the total excursions along the X and Y axes, respectively and $I_o$ and $J_o$ are the X and Y coordinates respectively of a radius vector R drawn from the center of rotation to the start point of the arc. These are illustrated for a first quadrant arc in FIG. 1. The algorithm in use within the logic of the control will cause point P to move from A to B, in such a manner that point P will always be contained within a tolerance band of $+/-$ one step deviation from the true arc.

Figure 2:
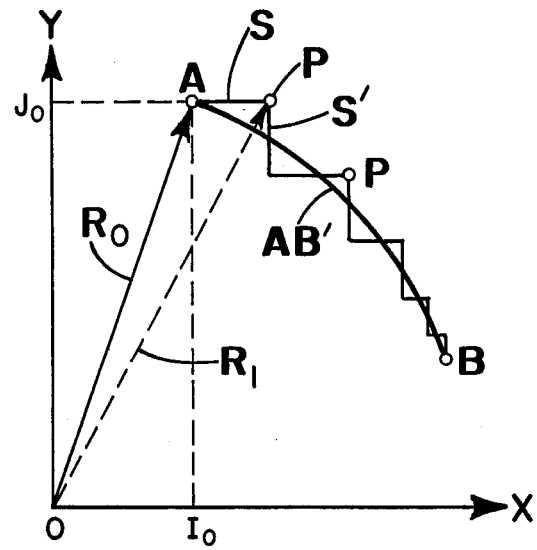

When moving a point P along the circular arc AB′ from A to B about a point "0" the coordinates of the start point A are $I_o$, $J_o$. As P moves along path AB′, the I coordinate in the X direction increases and the J coordinate in the Y direction decreases. Initially the square of the radius vector has a value of $R^2 = I^2_o + J^2_o$. If point P is displaced one step to the right of the arc AB′ (see FIG. 2), an error E in the square of the radius vector will result as follows:

$$E = R^2_1 - R^2_o = (I_o + 1)^2 + J^2_o - (I^2_o + J^2_o) = 2I_o + 1 \quad (1)$$

If instead, point P was displaced one unit below the arc, an error E′ in the square of the radius vector will result as follows:

$$E' = R^2_2 - R^2_o = I^2_o + (J_o - 1)^2 - (I^2_o + J^2_o) = -2J_o + 1 \quad (2)$$

In general, if point P is not on the arc, there is an error, and a step in the +X direction will cause this error to go positive by $2I + 1$, whereas a step in the −Y direction will cause the error to go negative by $2J − 1$ where I and J are the coordinates along the X and Y axes, respectively of point P prior to each move.

The above relationships suggest a way of determining how to move point P in the X-Y plane so that its path most closely follows the arc AB'. The initial values $I_o$ and $J_o$ of point A are given; see FIG. 2. Arbitrarily move horizontally in the X direction one step S to the right. In accordance with Equation (1) above, the error E will be $2I + 1$, which is positive. To reduce the error, point P must now move in the −Y direction one step S', following which the error will be reduced by $E' = 2J_o − 1$ (Equation (2) above). If the error is still positive, P is still above the arc AB', and further steps in the −Y direction are required. When the error becomes negative point P will be below the arc and steps will be required along the +X direction to bring the error to zero. Continuing in this manner, one sees that the point P staircases around the arc AB and is never more than one step away from the arc at any time.

Figure 3:
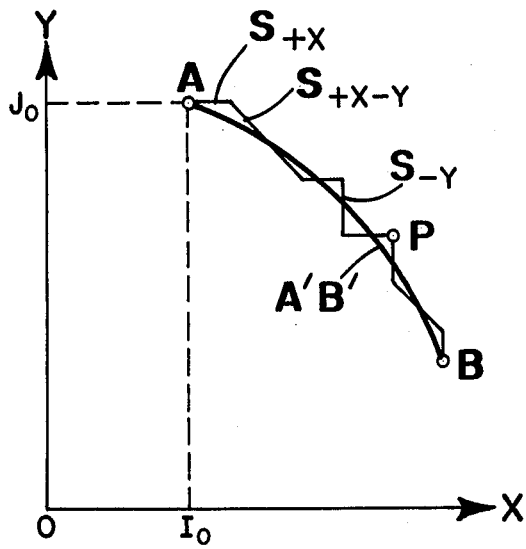

A significant improvement in this curve following scheme can be obtained if point P is allowed to step continuously in, for example, the +X direction and only in the −Y direction as required. Beyond the 45° point, when I becomes larger than J, point P will be allowed to step continuously in the −Y direction and only in the +X direction as required. Thus as shown in FIG. 3 during steps $S_{+x}$, point P moves continuously in the +X direction, while no movement occurs in the −Y direction. Step $S_{(+X, -Y)}$ involving movement in both X and Y directions occur only when required. Similarly, point P moves continuously in the −Y direction performing steps $S_{-y}$ and moves in both X and −Y directions simultaneously only when required. The resulting ramp staircasing more closely approximates the desired slope of arc A'B' in FIG. 3 than is possible by the method of FIG. 2. In addition, this technique greatly simplifies synchronization of a plurality of axes.

To implement the staircasing method of FIG. 3 as it is used in the present invention, it is desired to define a computational block as an interval of time between successive steps. As was noted, the steps could be along +X only, −Y only or +X and −Y simultaneously. At the beginning of each block, the logic must decide what steps will have to be taken at the end of the computational block to reduce the error accumulated thus far. As previously noted, it will be desirable to step along the +X axis whenever the error is negative or I is less than J. It is desirable to step along the −Y axis whenever the error is positive (or zero) or I is larger than or equal to J. Accordingly, one can define an I-Sequence (I Seq) as a series of operations which will be performed during a computational block as follows:

(1) Add the value of I to the present error
(2) Increment the value of I by 1
(3) Add the new value of I to the new value of the error
(4) Move P in the +X direction at the conclusion of the computational block.

A J-Sequence (J Seq) is defined as a series of operations which will be performed during a computational block as follows:

(1) Subtract the value of J from the present error
(2) Decrement the value of J by 1
(3) Subtract the new value of J from the new value of the error
(4) Move P in the −Y direction at the conclusion of the computational block.

If, at the beginning of a computational block, the logic calls for an I Seq and J Seq, the first three operations of an I Seq will be performed, then the first three operations of the J Seq will be performed and lastly a step will be taken along the +X and −Y axes simultaneously.

Figure 4:
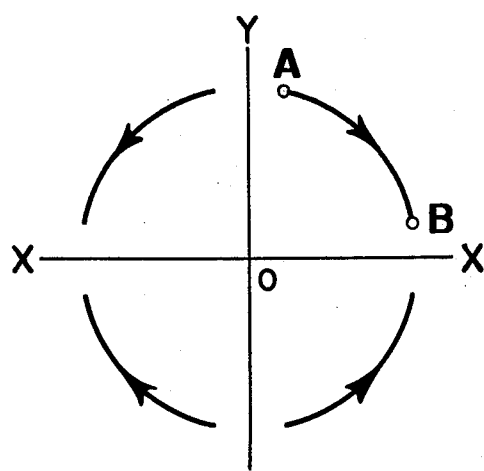
FIGS. 4-5 illustrate directional conventions used in this invention.
Figure 5:
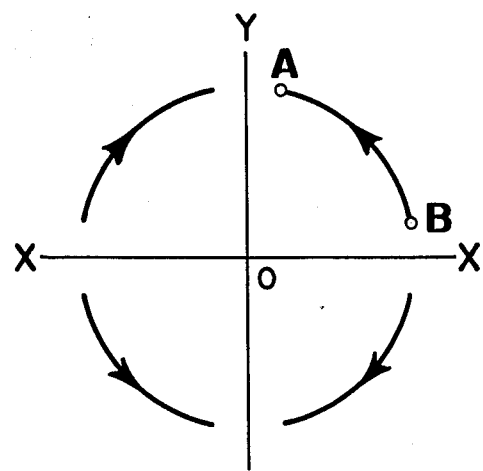

When programming motion in a circular arc, the magnitude and direction of length of the move along the X and Y axes and the X, Y coordinates of the starting point from the circle center, denoted as I and J, are inserted. By examination of the programmed signs of X and I, the logic determines whether the forthcoming problem is of a direct or a cross nature. A direct problem is defined as one where motion is away from the Y axis, toward the X axis. (See FIG. 4; motion from A to B is direct). A cross problem is defined as one where motion is away from the X axis toward the Y axis. (See FIG. 5; motion from B to A is cross). In order to utilize the same logic for both types of problems, advantage is taken of the symmetry of a circle. It can be seen that motion from B to A is the same as motion from A to B, with the roles I and J interchanged and the roles of X and Y interchanged. Therefore, in a cross problem, the values of I and J are crossloaded into the J and I registers, respectively. The logical decisions and operations of an I Seq and J Seq then will remain the same with the exception that an I Seq will culminate with a step along the Y axis whereas a J Seq will culminate with a step along the X axis.

To travel in a straight line from A to B, the magnitude of the move along the X and Y axes are inserted into the J and I registers, respectively. The identical logical decisions are then made to choose an I Seq or a J Seq as for the circular problem. The difference is that an I Seq or J Seq merely consists of operations (1) and (4) mentioned above. Operations (2) and (3), which account for the square terms in the equations of a circle, are not required. Except as specifically noted, the description of the preferred embodiment of this invention will be related primarily to circular interpolation problems of a direct nature and occurring in the first quadrant (X+, Y+).

When programming an actual part to be machined, the programmer must account for the size of the cutter which will be used. To machine the convex quarter circle shown in FIG. 6 requires the programmer to add the radius "r" of the tool to the total excursion along X and Y and to the coordinates I, J of the start point. If the desired machined part is concave, the values of X and Y and the coordinates of the start point must be reduced by the radius of the total being used. It is apparent that if the diameter of the tool chosen for cutting does not exactly agree with the size of the tool assumed in the program, the finished part will be over- or under-size. Accordingly, this invention resides in a system comprising cutter radius compensation (CRC) which enables machining programs to be developed that do not have to account for any particular tool radius. In fact, the size of the tool assumed in the program is zero. When the actual machining process is to begin, the tool chosen for the cutting operation is measured and its dimension is entered manually into the system.

Two contouring systems are in operation during the performance of a problem in which cutter radius compensation is invoked. One is concerned only with the movement of a point along the programmed path. This contouring system, referred to as the main contouring system, functions in the manner described previously. The second contouring system, designated the subcontouring system, uses a similar algorithm as the main contour system and is concerned only with the control of the path of a point rotating in a circle of a diameter equal to that of the tool chosen for the cutting operation. Consider now a line drawn from the center of rotation to the surface of the programmed part. This line, referred to as the main vector R (FIG. 6) will, at any instant of time, be perpendicular to the surface of the programmed point. Its length must lie within the +/− one-step deviation bands as dictated by the main contouring system. Consider further a second vector, referred to as the sub-vector $r$, whose tail is at the head of the main vector. The length of the sub-vector must be within +/− one step of the radius of the tool chosen and is controlled by the sub-contouring system.

The vector sum of the main and sub-vectors represents, at any instant of time, the location in the XY plane of the center of the tool relative to the center of curvature of the programmed part. Under idealized conditions, the length of the main vector is exactly equal to the radius of the programmed part, the length of the sub-vector is exactly equal to the radius of the cutting tool, and the main and sub-vectors are colinear. In a practical system, however, these conditions are met at specific points during execution of the program while at all other points the sub-vector leads or lags the main vector slightly.

In a conventional contouring system the total distances to be traversed along the X and Y axes are entered into the X axis counter and Y axis counter, respectively. As point P moves along the programmed path by taking discrete steps along the X and Y axes, the X and Y axis counters are effectively decremented. At the conclusion of the problem, both counters have been reduced at zero, point P having moved X steps along the X axis and Y steps along the Y axis. With CRC invoked the total distance transversed by the center of the tool must obviously be greater than the distances which were programmed. The additional steps are taken as dictated by the sub-contouring system. When sub-steps are taken, the X and Y axis counters are not decremented. For concave parts, where the total steps taken along the X and Y axes are less than the programmed lengths, sub-steps effectively cause the X and Y axis counters to be decremented while not taking an actual step.

During the time CRC is invoked, the CRC control logic is responsible for maintaining the sub and main vectors parallel or colinear. If at some instant the sub-vector is lagging the main vector, the control logic will direct the sub-contour system to be enabled and will continue to do so until the sub-vector has advanced to the point of being colinear with or leading the main contouring system. This process continues until the problem is completed.

Figure 7A:
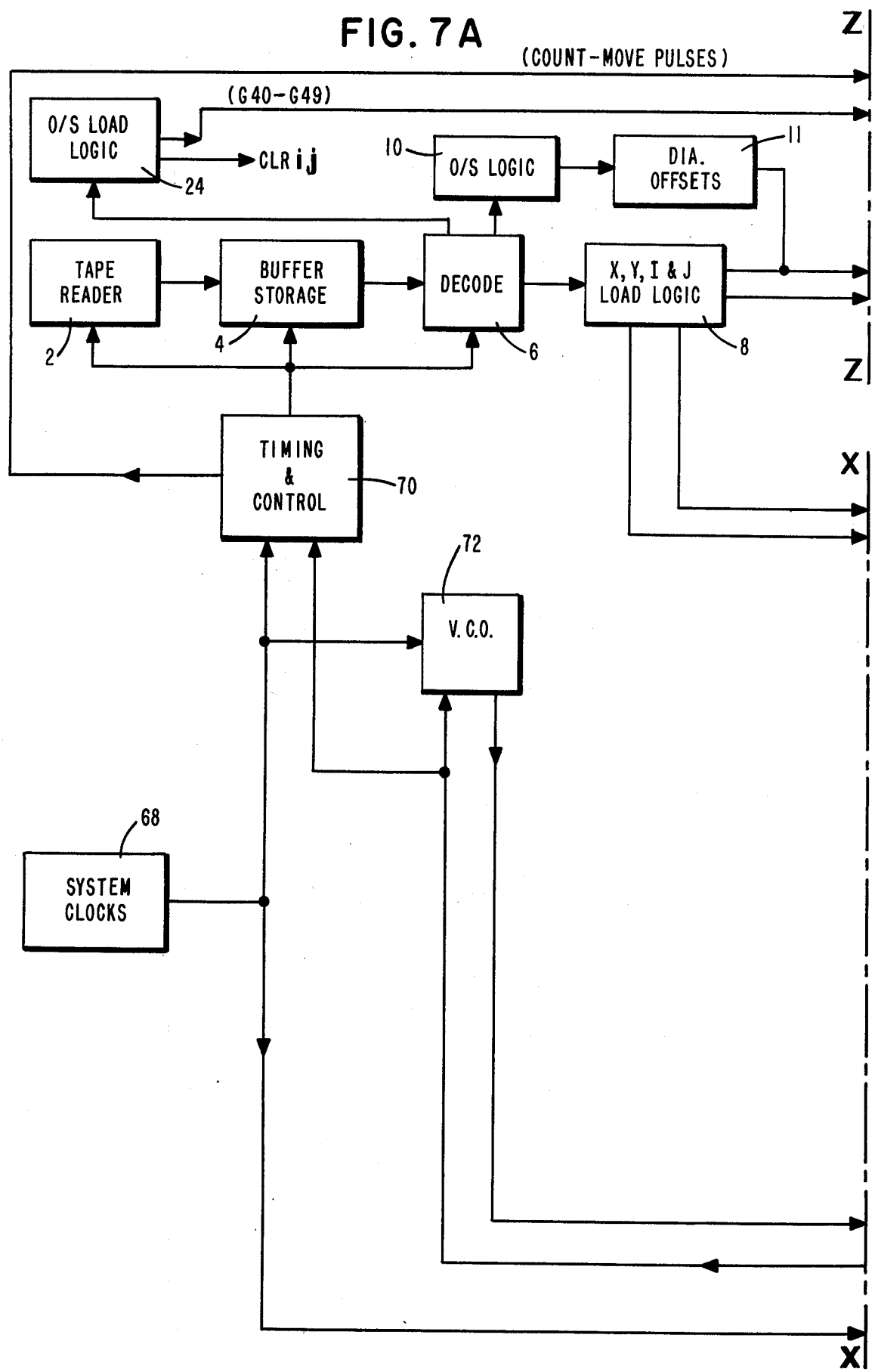
Figure 7B:
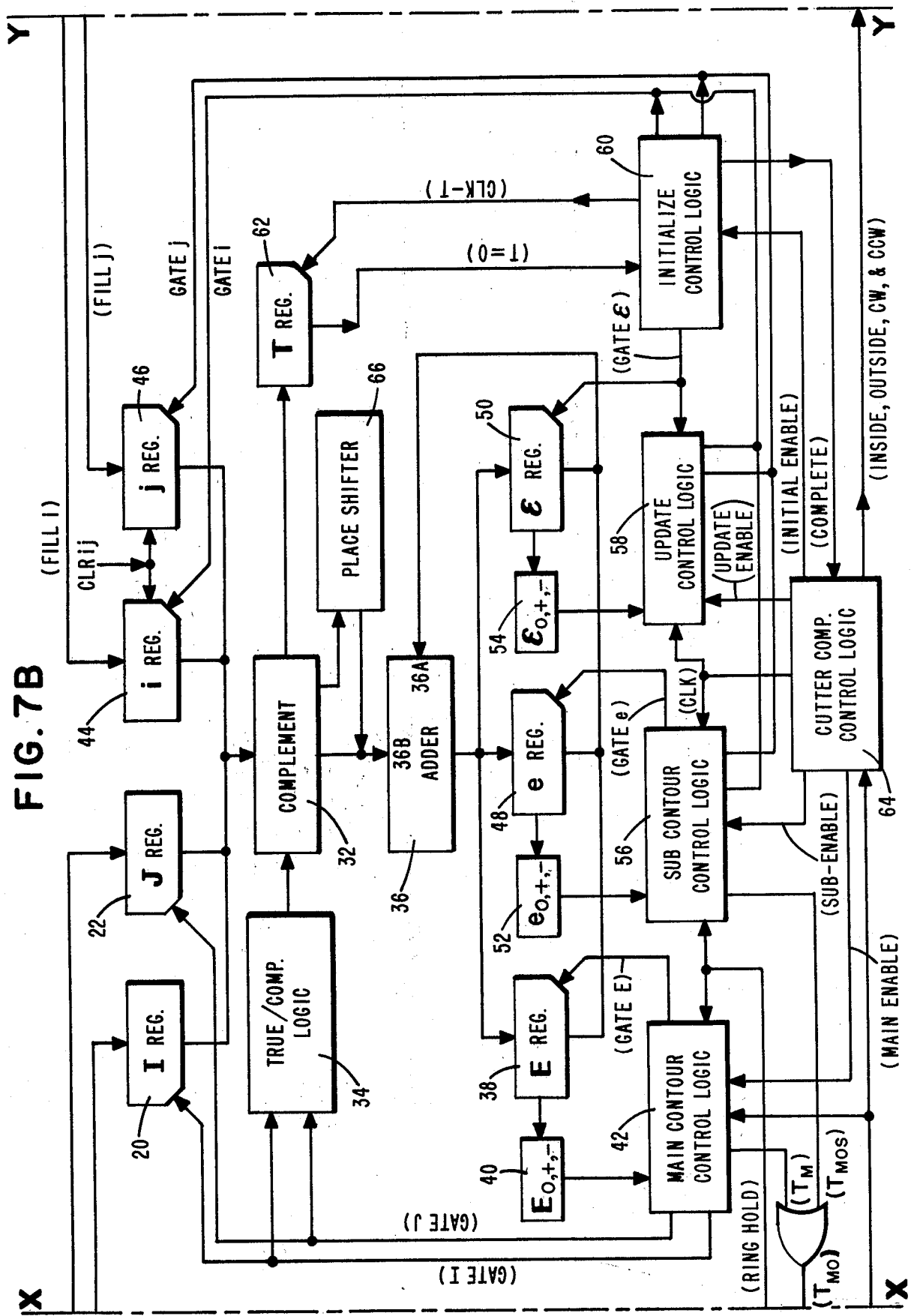

FIGS. 7A–7C show a block diagram of the cutter radius compensation control system of this invention. A TAPE READER 2 is connected through a BUFFER STORAGE 4 to a DECODER 6. These elements are all well known and are provided for the purpose of entering programmed data into the system at the beginning of each contouring problem. Such data includes the desired total excursion along the X and Y axes, the initial X and Y coordinates of a vector drawn from the center of rotation to the starting point of the arc to be machined ($I_o$, $J_o$), and the various preparatory functions required for cutter compensation; these prep functions are listed in Table A below with their respective codes.

TABLE A
LOAD LOGIC PREP CODES

| | |
|---|---|
| G06 | Compute initial cross-error |
| G07 | By-pass initial cross-error computation |
| G40 | No compensation |
| G41 | Counter-clockwise motion |
| G42 | Clockwise motion |
| G43 | Concave or inside cut |
| G44 | Convex or outside cut |
| G45 | Initial offset taken along the +X direction |
| G46 | Initial offset taken along the −X direction |
| G47 | Initial offset taken along the +Y direction |
| G48 | Initial offset taken along the −Y direction |
| G49 | Rotation required at a discontinuity or non-tangency |

An output of the decoder 6 feeds X, Y, I, J LOAD LOGIC 8 which gates the X, Y, I and J information to their respective storage locations. A second decoder output is connected to the input of OFFSET LOGIC 10 which decodes the numerical value of the offset diameter presently being invoked by the machine. The value of this offset is manually set by the operator by rotating thumbwheel switches 11 located on the front panel of the control board. The offset information may also include a cutter length offset value taken along the Z axis; this forms no part of the present invention and will therefore not be described further.

X axis information is supplied to an X-AXIS COUNTER 12 from the load logic 8. Cutter diameter offset information is also temporarily stored in the X axis counter 12 under the control of the offset logic. Y axis information is supplied to a Y-AXIS COUNTER 14 from the load logic 8.

The X and Y axis counters 12 and 14 are 5-digit, 20 bit counters which store the programmed value of the length of the move along the respective X or Y axis. These counters are, in effect, decremented toward zero as main counter computational blocks are performed. Pulses are not routed to the X and Y axis counters as a result of a sub-contour computational block. In a non-cutter compensation mode, the problem is over when both counters have, as determined by ZERO DETECT gates 16 and 18, reached zero. In the cutter compensation mode, the same conditions are essentially true with the additional constraint of a negative or zero cross-error being imposed before concluding the problem, as will be discussed in more detail below.

I and J information are supplied to an I REGISTER 20 and a J REGISTER 22, respectively, from load logic 8. The I register 20 is a 5-digit, 20 bit counter/register which stores the instantaneous value I of the X component of the main vector. The numerical value of I is stored in the I register in true form. The J register 22 is a 5-digit, 20 bit counter/register which stores the instantaneous value of the Y component of the main vector. The numerical value of J is stored in the J register in nines complement form.

OFFSET LOAD LOGIC 24 comprises the control logic which sets up and stores the necessary prep functions required for a cutter compensation problem. The output of the offset load logic 24 is supplied to the input of PULSE-OUT & STEERING LOGIC 26, comprising control logic which provides the necessary steering signals for controlling the direction of drive of the X and Y axis stepping motors. The particular steering signal generated for an axis is a function of the operation currently being performed. X axis motor control signals and Y axis motor control signals are supplied from steering logic 26 to X-AXIS MOTOR LOGIC 28 and Y-AXIS MOTOR LOGIC 30, respectively.

In addition to the I and J registers 20 and 22, provided to store values for the main vector components, an $i$ REGISTER 44 and a $j$ REGISTER 46 are provided to store values for the sub- or tool-vector components. The $i$ register 44 consists of a 4-digit, 16 bit counter/register which stores the instantaneous value $i$ of the X component of the sub-vector. The numerical value of $i$ is stored in the $i$ register in true form and may be increased or decreased by applying a clock signal to an appropriate clock input of the counter/register 44. The $j$ register 46 consists of a 4-digit counter/register which stores the instantaneous value $j$ of the Y component of the sub-vector. The numerical value of $j$ is stored in the $j$ register in tens complement form and may be increased or decreased by applying a clock signal to an appropriate clock input of the counter/register 46. The outputs of the I and J registers 20 and 22 and $i$ and $j$ registers 44 and 46 are gated to the input of a 5-digit complementer 32. The outputs of I and J registers 20 and 22 are gated by gating signals "(GATE I)" or "(GATE J)" applied to the gate inputs of the I and J registers, respectively; the outputs of $i$ and $j$ registers 44 and 46 are gated by signals applied on lines (GATE $i$) and (GATE $j$) to the gating inputs of registers 44 and 46, respectively.

The complementing function of the complementer 32 is controlled by TRUE/COMP LOGIC 34 which comprises a system of gates to determine whether the complementer should complement the input data or permit it to pass in its true form. A "TRUE" output from logic 34 will permit input data to be passed through the complementer without change. A "COMP" output will cause the complementer to output the nines complement of its input. If the COMP signal is present and the input number is already in nines complement form, the output will be in true form. The complement of a BCD number is required when it is desired to subtract one quantity from another. The complementer itself is available as a series of modular units such as the Motorola MC 14561.

Connected to the output of complementer 32 is input 36B of a 12-digit, 48 bit ADDER 36. The adder consists of 12 identical sections $\Sigma_1 - \Sigma_{12}$ connected one to the other by a carry line (FIG. 31).

A MAIN CONTOUR ERROR REGISTER 38 stores the value of the main contour error, defined as:

$$E = I^2 + J^2 - (I_o^2 + J_o^2)$$

Figure 31:
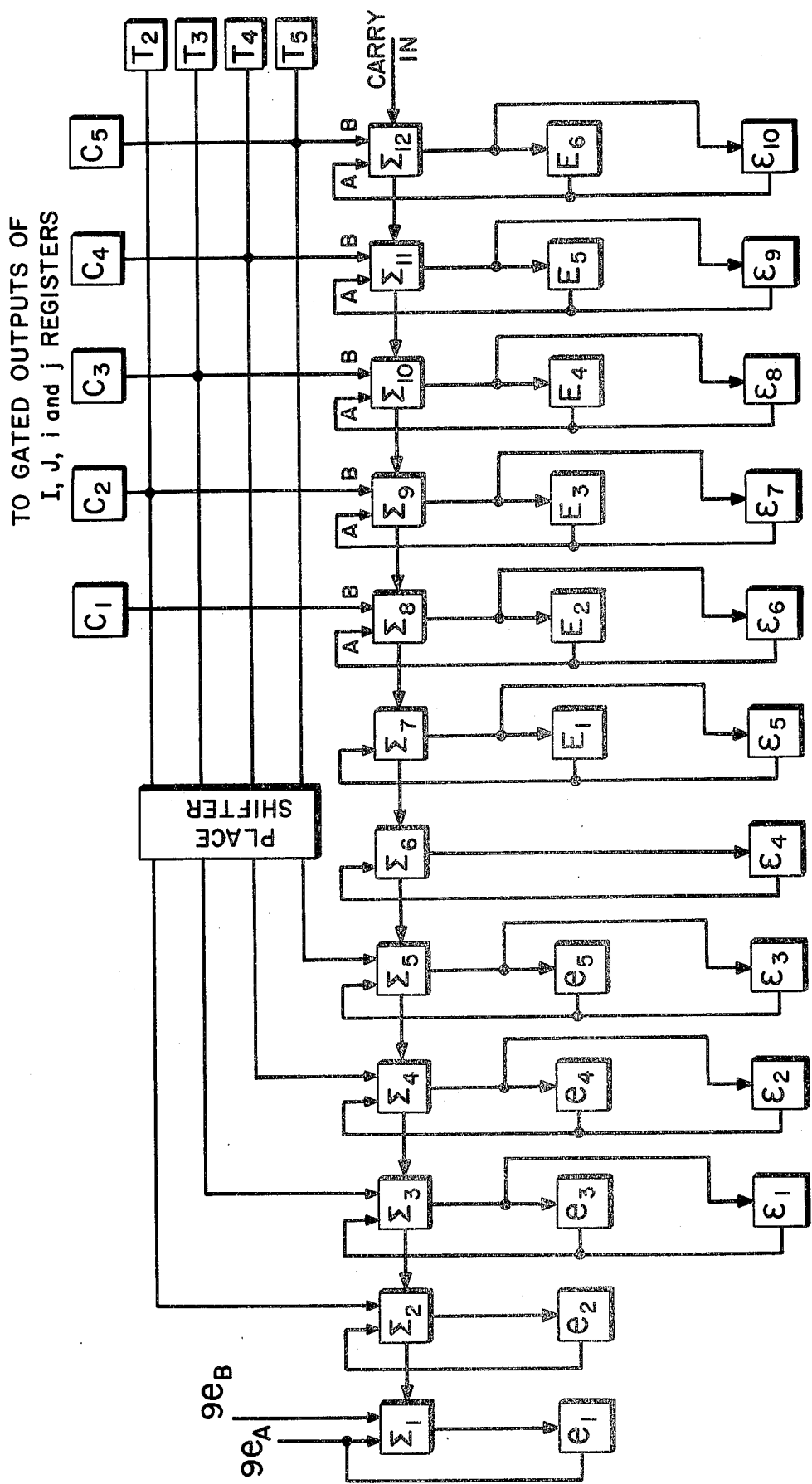
FIG. 31 shows the connections between the adder, the error registers and the complementer.

Error register 38 consists of 6 four-bit register stages $E_1-E_6$ (FIG. 31). The input of each register stage is connected to the output of a corresponding adder stage $\Sigma_7-\Sigma_{12}$, the output of each register stage $E_1-E_6$ is gated back to the A input of its associated adder stage. The value of the main contour error E is modified during the operation of the main contour system in a manner to be described in more detail below. Connected to the error register 38 is a series of gates, represented by sign decoder block 40, which determine the algebraic sign of the main contour error E.

The output of sign decoder 40 is connected to MAIN CONTOUR CONTROL LOGIC 42 which controls the performance of the main contour problem and steps the X and Y motors in a manner to drive the main contour error toward zero.

In addition to the main contour error register 38, a SUB-CONTOUR ERROR REGISTER 48 and a CROSS-ERROR REGISTER 50 are connected to the output of adder 36. The sub-contour error register 48 stores the value of the sub-contour error, defined as:

$$e = i^2 + j^2 - r_t^2$$

where $r_t$ is the radius of the tool being used. Register 48 consists of 5 four-bit stages $e_1 - e_5$ having inputs connected to outputs of adder stages $\Sigma_1 - \Sigma_5$ and outputs gated back to the A input of the corresponding adder stage.

The cross-error register 50 is a 10-digit, 40 bit register which stores the value of the cross-error $E$, defined as:

$$E = Ij - iJ.$$

The cross-error is proportional to the differences in the slopes of the main and sub-vectors. Register 50 consists of 10 four bit stages $E_1 - E_{10}$ having inputs connected to outputs of adder stages $\Sigma_3 - \Sigma_{12}$ and output gated back to the A input of the corresponding adder stage.

Connected to the sub-contour error register 48 is a series of gates represented by block 52 which determines the algebraic sign of the sub-contour error $e$. Connected to the cross-error register 50 is a series of gates, represented by block 54, which determines the algebraic sign of the cross-error $E$. A positive error indicates that the sub-vector is lagging the main vector and a negative error indicates that the sub-vector is leading the main vector.

The output of sub-contour error sign decoder 52 is applied to one input of SUB-CONTOUR CONTROL LOGIC 56 which contains the logic to control the sub-contour problem and direct steps to be taken along the X and/or Y axes in a manner to drive the sub-contour error to zero.

Cross-error register sign decoder 54 is connected to one input of UPDATE CONTROL LOGIC 58. Update logic 58 is responsible for updating the value of the cross-error after the initial cross-over has been computed. If the value of I or J changes during a main contouring computation, the value of the cross-error is updated by adding or subtracting the value of $i$ or $j$. If the value of $i$ or $j$ is changed during the performance of a sub-contour computation, the value of the cross-error is updated by adding or subtracting the value of I or J.

An INITIALIZE CONTROL LOGIC 60 is connected to and controls the update logic 58, cross-error register 50 and a TEMPORARY REGISTER 62. Logic 60 maintains control logic which is responsible for calculating the initial error in alignment between the present position of the tool vector and the new programmed main vector $E_i = I_oj - iJ_o$, where: $E_i$ is the initial cross-error, and $I_o$ and $J_o$ are the initial components of the main vector. The initial cross-error multiplications are obtained by performing successive additions and subtractions, as will be described in more detail below.

The temporary or T register 62 is a 4-digit, 16 bit register/counter used during the computation of the initial cross-error. To perform the product of $I_oj$, $j$ is loaded into the T register 62 from $j$ register 46 through complementer 32 and $I_o$ is added to $E$ while simultaneously decrementing the contents of the T register 62.

This process is continued until the contents of the T register 62 have been reduced to zero; in such a manner, $I_o$ is added to $Ej$ times. Following this, $i$ is loaded into the T register and the product of $J_o i$ is formed in the same way. The tens complement of $J_o$ is used; therefore this process effectively results in the subtraction of $J_o$ from $Ei$ times. Since $E = Ij$ (from the previous computation), the end result is $E = Ij - iJ_o$.

CUTTER RADIUS COMPENSATION (CRC) CONTROL LOGIC 64 contains the control logic which is responsible for the overall performance of the CRC system. As new data is established at the beginning of a problem, the control logic first enables the initialize control logic 60. Following the completion of the computation of the initial cross-error, the logic will, in accordance with the algebraic sign of the cross-error $E$, enable either the main contour control logic 42 (MAIN ENABLE) or the sub-contour control logic block 56 (SUB ENABLE). Following the performance of either a main or a sub-computational block, the control logic 64 will enable the update control logic 58 (UPDATE ENABLE) to update the cross-error to its new value. This process continues until the conclusion of the problem, at which time the control logic 64 will allow additional data to be read into the system to begin a new problem.

A PLACE SHIFTER 66 is included between the complementer 32 and adder input 36B. The outputs of the complementer 32 are in line with the least significant digits of the main contour error register and the least significant digits of the cross-error register 50. Place shifter 66 consists of a series of gates which shift the output of the complementer seven digits to the left during a sub-contour computation to enable $i$ or $j$ to be in line with the least significant digits of the sub-contour error register 48.

SYSTEM CLOCK 68 provides the clock pulses necessary to operate the various logic circuits. TIMING & CONTROL LOGIC 70 controls the timing of the various logic functions and particularly the timing of the data input section represented by tape reader 2, buffer storage 4 and decoder 6. Finally, block 72 represents a voltage controlled oscillator (VCO) which is a means for controlling the rate at which the workpiece table moves. The voltage to control the VCO is derived from a programmed feed rate (e.g. in inches per minute). One type of VCO which can be used in this invention without major modification is described in copending application Ser. No. 259,409 filed June 5, 1972 and entitled CONTOURING CONTROL SYSTEM EMPLOYING RAMP STAIRCASING OF POSITION POINTS.

In the discussion which follows, the various aspects of the overall circuit shown in FIG. 7 will be described separately in greater detail. In this description, the following conventions are observed:

(1) All gates are DTL NAND gates: a gate output is hi (logic "1") when at least one input is lo (logic "0"); the gate output is lo only when all inputs are hi.

(2) A single input gate is an inverter.

Figure 32:
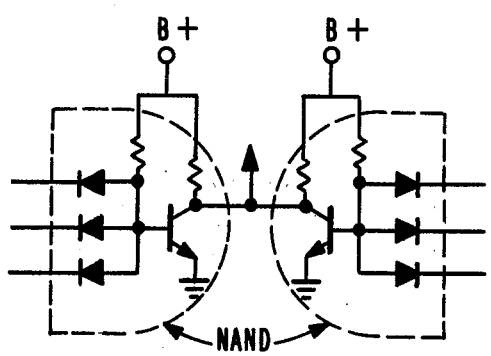
FIG. 32 shows two DTL NAND gates used in this invention connected in a "wired-OR" configuration.

(3) Two or more gate outputs are connected in a "wired-OR" configuration (see FIG. 32).

(4) All state changes of the several registers, counters, flip-flops, etc. occur on the falling or trailing edge of a state-change command pulse.

MAIN CONTOUR CONTROL SYSTEM (FIGS. 8-12)

The Main Contour System includes the I register 20, J register 22, sections $\Sigma_7 - \Sigma_{12}$ of adder 36, main error register 38, and main contour timing and control logic 42. The function of the Main Contour System is to control the end point of the main vector (the X and Y components of which and I and J) during a programmed linear of circular move. In addition, the main contour control logic enables the appropriate counting channel in the main logic and controls the VCO 72 so that the resultant motion, be it along the X axis, or both simultaneously, is of constant velocity throughout the problem.

The basic algorithm for circular contouring in the main contour system is similar to that used for the sub-contouring system; however, there are differences. Both systems utilize the components of their respective vector in the solution of the error equation. In the main system, I and J are programmed values and specifically are programmed in thousandths of an inch. In the sub system, $i$ and $j$ are not programmed but rather are extracted from the value of diameter chosen by the offset load logic. As such, the values of $i$ and $j$ are stored in the $i$ and $j$ registers in half-thousandths of an inch. It is desirable to perform contouring operations in half-thousandth increments. This occurs naturally in the sub-contour system; however, some manipulation is required in the main system. To accomplish half-thousandths computations in the main contour system. I Sequences and J Sequences are further broken down into first and second or odd and even I Sequences and J Sequences.

If an I Sequence is chosen, and the number of I Sequences performed thus far (including the current one) is odd, then the following is performed: Add the contents of the I 20 register to the contents of the main 38 error register and place the sum back in the main error register. Then repeat the operation. Diagrammatically, $E + I \rightarrow E$,
$E + I \rightarrow E$.

Similary, for an odd J Sequence:

$E - J \rightarrow E$,
$E - J \rightarrow E$.

For an even I Sequence, the following is performed:

$E + I \rightarrow E$,
$I + 1 \rightarrow I$,
$E + I + 1 \rightarrow E$.

For an even J Sequence:

$E - J \rightarrow E$,
$J - 1 \rightarrow J$,
$E - J + 1 \rightarrow E$.

From the bove it can be seen that following an odd and an even I Sequence (two half-thousandth steps), the net change in error is $4I_0 + 2$, where $I_o$ is the initial value of I at the start of the odd I Sequence. After succeeding odd and even J Sequences, the net change is $4J_o - 2$, is the initial value of J at the start of the odd J Sequence.

Figure 8:
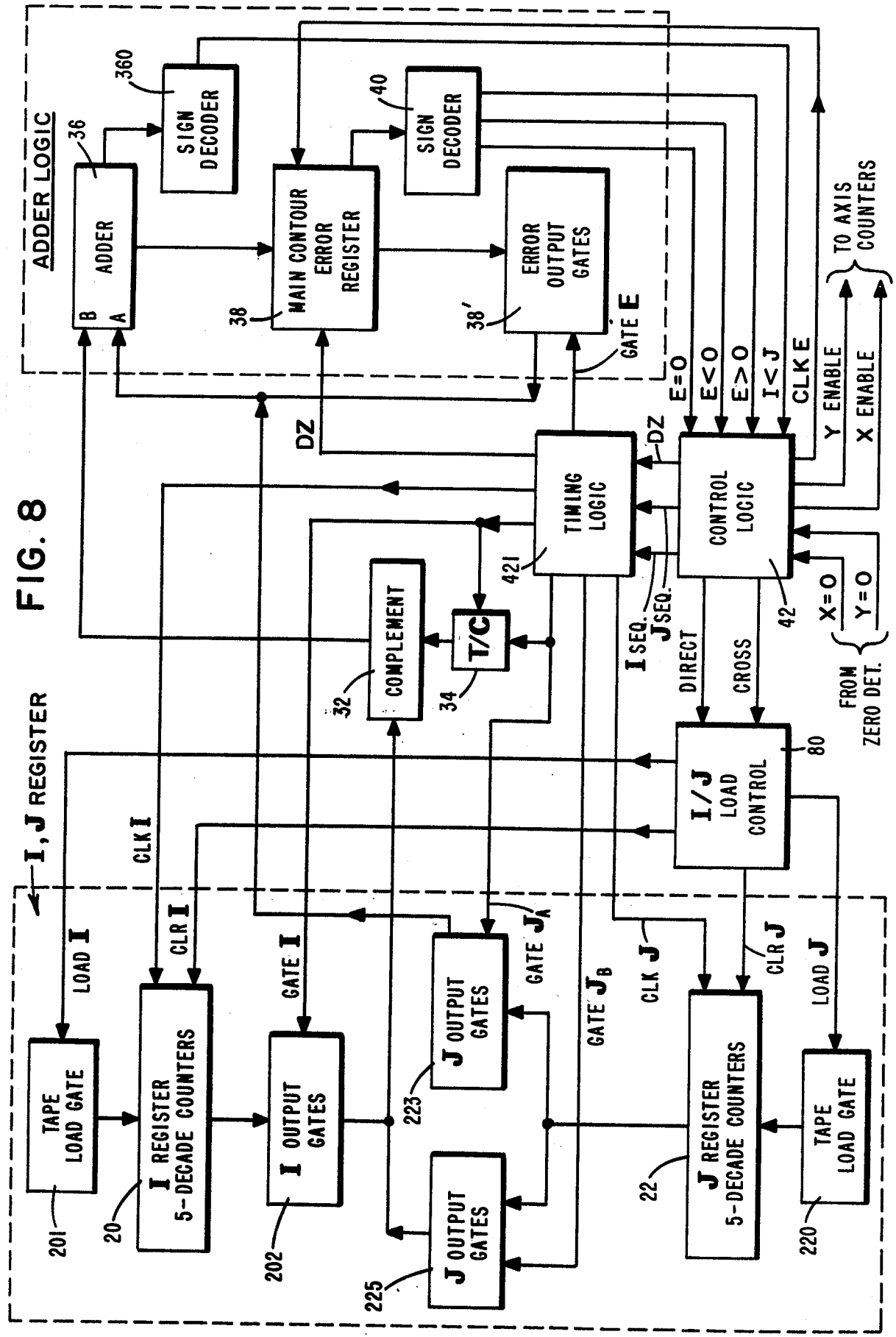
FIG. 8 is a block diagram of the main contour system.

Referring to FIG. 8, the logic control circuit has an I, J register section which includes I register 20 and J register 22. During a circular interpolation problem, the numerical value of J (or I if a cross problem is indicated) is loaded into the J register. The J register may be loaded manually via manual loading gates (not shown) or from the decoder logic 6 through TAPE LOAD GATES 220. Prior to loading, the J register 22 is cleared to "0" by applying a momentary "CLRJ" pulse from I/J LOAD CONTROL 80. The value of J is loaded directly into the J register in nines complement form through gates 220 sequentially, commencing with the most significant digit.

During a circular interpolation problem the value of J must be decremented, which is equivalent to incrementing the nines complement of J stored in the J register. The contents of the J register may be gated to either the inputs 36A or 36B of the adder 36 by applying a gating signal (GATE $J_A$ or GATE $J_B$) to J OUTPUT GATES 223 or J OUTPUT GATES 225, respectively.

The I register 20 may be loaded manually via manual loading gates (not shown) or from the tape reader 2-decoder 6 through TAPE LOAD GATES 201. During a circular interpolation problem, the numerical value of I (or J if a cross problem is indicated) is loaded into the I register. Prior to loading the I register from the tape, however, the I register is cleared to "0" by applying a momentary "CLRI" pulse from the I/J load control 80. Loading of the counters in the I register via tape is performed sequentially commencing with the most significant digit. The contents of the I register 20 are gated to inputs 36B of adder 36 by applying gating signal GATE I to I OUTPUT GATES 202.

Figure 9A:
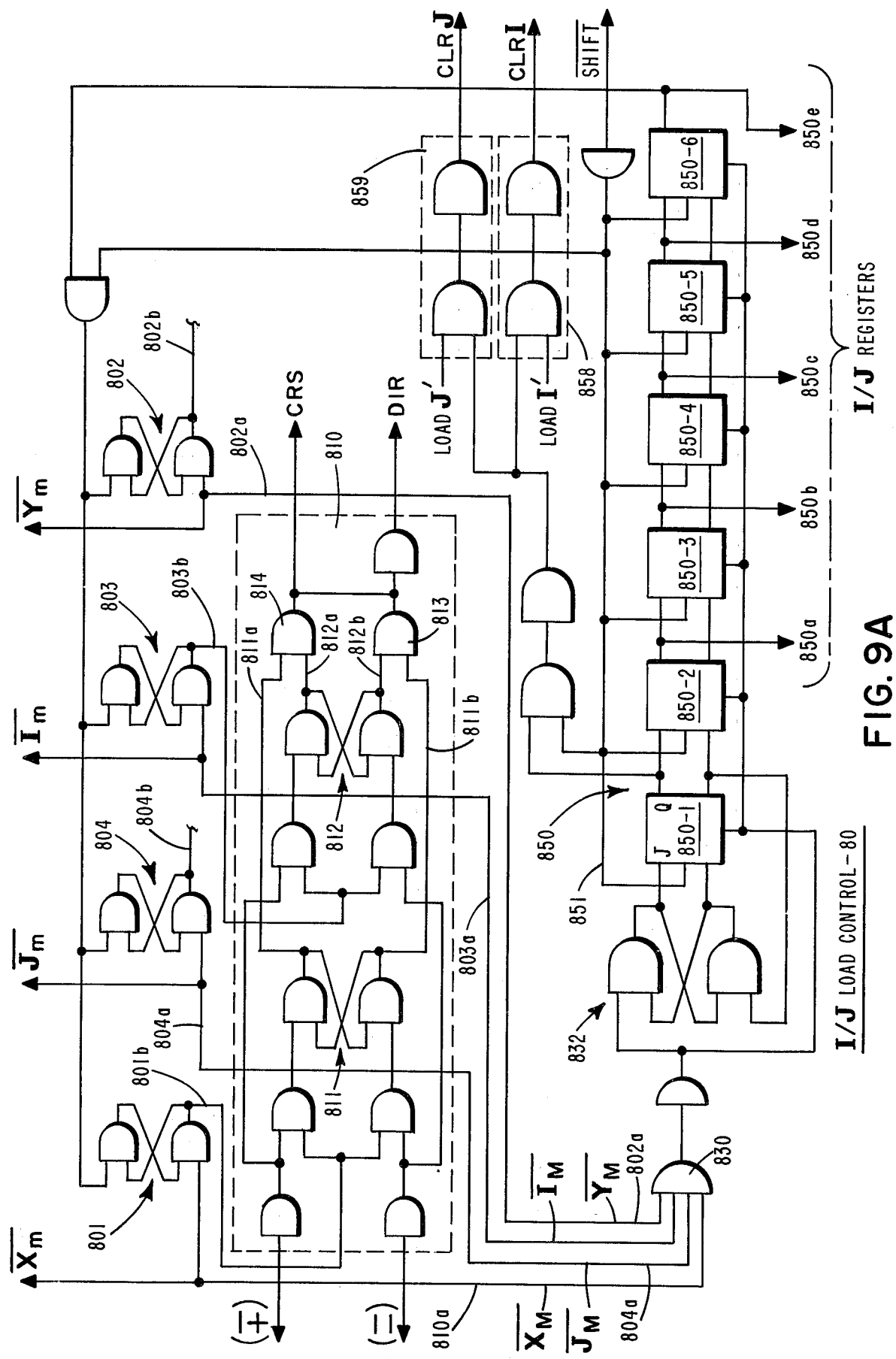
FIGS. 9A-9B show the main contour I/J load control logic.
Figure 9B:
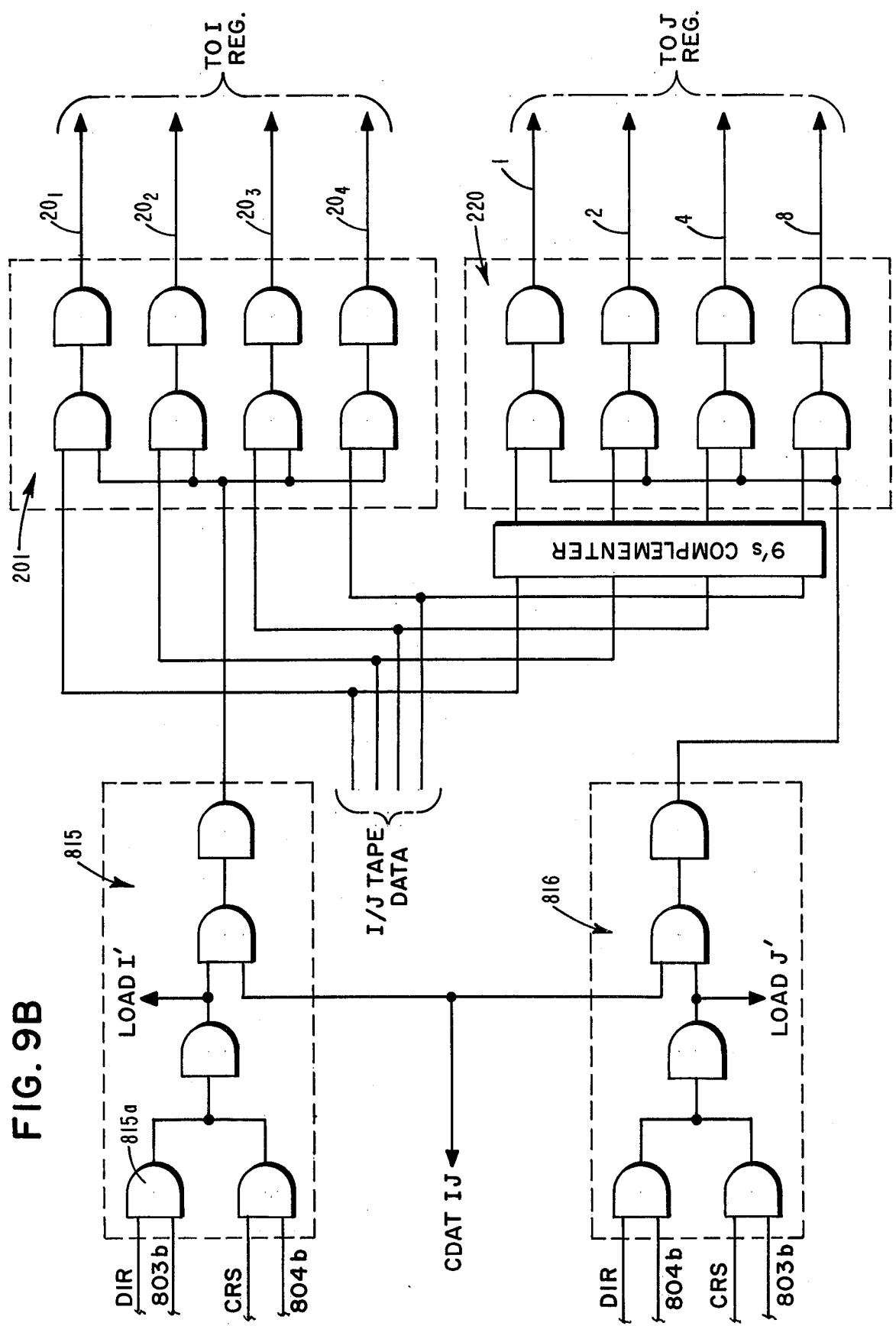

The I/J load control 80 in the main contour logic circuit determines what is to be loaded into the I and J registers when entering information via tape. The I/J load control (FIGS. 9A, 9B) includes flip-flop 801, 802, 803, 804, DIRECT/CROSS logic circuit 810, I, J DATA LOAD LOGIC gates 815 and 816 (FIG. 9B), and shift register 850. Decoding an I or J ($\bar{I}m$ or $\bar{J}m$ lo) will initiate a loading sequence at gates 815 and 816. To load the value of I and J into the appropriate registers, it is necessary to know whether the circular interpolation problem is of a direct or cross nature.

When motion is within one quadrant from the Y axis toward the X axis (direct), the algebraic signs of X and I agree. When motion is from the X axis toward the Y axis (cross), the signs of X and I disagree. These relationships are utilized to set the conditions for the direct/cross logic circuit 810. Following the decoding of X($\bar{X}m$ lo), the flip-flop 801 is set such that output 801b is hi. The decoder sign of X immediately following is set into a flip-flop 811 where the output 811a represents X+ and the output 811b represents X−. A similar arrangement is used to develop I+ or I− in the flip-flop 812. Decoding Im(Im lo) will set output 803b of flip-flop 803 hi; decoding the programmed sign of I will set output 812a of flip-flop 812 hi (I+) or output 812b hi (I−). The outputs of the two flip-flops 811 and 812 are then compared in gates 813 and 814. For X+ and I+, 811a will be hi and 812a will be hi, respectively. For X− and I−, 811b will be hi and 812b will be hi, respectively. For X+ and I+ or X− and I−, the output signal DIR will be hi and conversely output signal CRS will be lo. For and X+ and I−, or X− and I+ CRS will be hi and DIR will be lo. The state of the "DIRE" and "CRS" signals will now remain static for the balance of the loading process.

The DIR and CRS outputs of logic circuit 810 are connected to the indicated inputs of data load gates 815 and 816. I flip-flop output 803b and J flip-flop output 804b are connected to the corresponding indicated inputs to gates 815 and 816. A DIR hi (CRS lo) input will gate I data into the I register 20 and J data into the J register 22. A CRS hi (DIR lo) input will gate I data into the J register 22 and J date into the I register 20.

A gate 830 has inputs $\bar{X}m$, $\bar{Y}m$, $\bar{I}m$ and $\bar{J}m$ and an inverted output connected through a flip-flop 832 to shift register 850.

Decoding Xm, Ym, Im or Jm will cause the output of a gate 830 to go lo and set the J input of register stage 850-1 hi (logic "1") thereby setting output 850-1Q hi coincident with a clock pulse of SHIFT line 851. Subsequent pulses on the "SHIFT" line will propagate through the shift register 850 and successively enable lines 850a through 850e which go to the LOADI and LOADJ inputs of registers 20 and 22, respectively. Prior to loading I data, the I register 20 is cleared by a logic "1" on line CLRI hi output from gate circuit 858. Gate circuit 858 is enabled by coincident inputs 850-1Q hi, SHIFT hi and LOADI' hi, the latter from gate circuit 815. When line 850a goes hi, the input gates for the first digit of the I and J registers are enabled and are ready to accept the data on lines $20_1$, $20_2$, $20_4$ and $20_8$ going to I register 20 and on lines $22_1$, $22_2$, $22_4$ and $22_8$ going to J register 22 concident with the next data entry clock pulse on the line CDATIJ. The data on lines $22_1$, $22_2$, $22_4$ and $22_8$ will actually be the BCD nines complement of the numerical value of data to be entered into the J register.

To load I data (I data is always loaded before J data) for a direct problem, gate 815a is enabled, which in turn enables the common input to gates 201 from gate circuit 815. I data is fed to I register 20 in correspondence with pulses 850a-e. The lines $22l$, $22_2$, $22_4$ and $22_8$, however, will remain at logic "0" since the output of gate circuit 816 common to data load gates 220 is at logic "0"; thus no data will be entered into J register 22. Successive digits are loaded into I register 20 in a similar manner until line 850e resets the flip-flop 803 at the conclusion of the load. When a Jm($\bar{J}m$ lo) is decoded, the numerical value of J in nines complement is loaded into j register 22 in a similar manner.

The main contour error register 38 stores the value of the error accrued during the interpolation process. The sign of the main error, positive (including zero) or negative, is one of the necessary inputs to the main contour control logic. The error register 38 may consist of 24 flip-flops (representing 6 four-bit digits) and associated "clock" and "clear" gating, sign decoder 40 and output gates 38' (FIG. 8). The error register 38 is cleared prior to the start of each new problem by a decade zero pulse DZ. DZ is generated whenever both X and Y counters are at zero, indicating the end of a computational problem, to set all appropriate counters and registers to zero. The outputs of adder sections $\Sigma_7 - \Sigma_{12}$ are connected to the main contour error register inputs. Information present at the adder outputs is clocked into error register 38 by applying a momentary "CLKE" signal ($\overline{CLKE}$ lo). The contents of the error register 38 are gated to input 36A of adder 36 by applying a GATE E signal ($\overline{GATE\,E}$ lo) from timing logic 421. Numbers are stored in error register 38 in BCD tens complement form. Positive values of error have a numerical value of zero through four in the most significant digit of error register 38, whereas negative values of error have a numerical value of five through nine. Accordingly, the state of the first digit is decoded in decoder 40 to ascertain the error sign. An error of zero is ascertained by examining the state of each digit. Positive values of error include a zero error. A typical decoder for this purpose is descirbed in detail below with respect to the cross-error sign decoder 54.

The main contour timing logic 421, shown in detail in FIGS. 10A-10C, generates all the necessary timing signals and clock pulses, which in conjunction with signals from the control logic 42, controls the basic operations performed during a main contour interpolation problem.

A timing cycle or computational block required to perform the main contour problem is broken into ten equally divided timing segemts through the use of a five stage twisted ring counter 422, composed of J-K flip-flops. serially coupled together with the last stage output cross coupled to the input of the first stage. Following turn-on and at the completion of each problem, the counter is reset to zero, by decade zero pulse DZ applied on line 422R. An input from clock 68 is gated with inputs from the cutter radius compensation (CRC) control logic 64 (MAIN ENABLE) and VCO 72 ($\overline{\text{RING-HOLD}}$) to control the advance of the ring counter 422 through all of its states. The $\overline{\text{RINGHOLD}}$ signal generated by the VCO 72 synchronizes the timing of the various operations with the clock signal generated by the VCO. Each state of the ring counter may be uniquely defined by decoding only two flip-flop states. (See Table B below).

TABLE B

UNIQUELY DEFINED COUNTER STATES

| Unique State Combination | | Counter Output States | | | | |
|---|---|---|---|---|---|---|
| 5-Stage Counter | 4-Stage Counter | A | B | C | D | E |
| $\overline{A}\ \overline{E}$ | $\overline{A}\ \overline{D}$ | 0 | 0 | 0 | 0 | 0 |
| A $\overline{B}$ | A $\overline{B}$ | 1 | 0 | 0 | 0 | 0 |
| B $\overline{C}$ | B $\overline{C}$ | 1 | 1 | 0 | 0 | 0 |
| C $\overline{D}$ | C $\overline{D}$ | 1 | 1 | 1 | 0 | 0 |
| D $\overline{E}$ | A D | 1 | 1 | 1 | 1 | 0 |
| A E | | 1 | 1 | 1 | 1 | 1 |
| $\overline{A}$ B | $\overline{A}$ B | 0 | 1 | 1 | 1 | 1 |
| $\overline{B}$ C | $\overline{B}$ C | 0 | 0 | 1 | 1 | 1 |
| $\overline{C}$ D | $\overline{C}$ D | 0 | 0 | 0 | 1 | 1 |
| $\overline{D}$ E | | 0 | 0 | 0 | 0 | 1 |

Assuming the MAIN ENABLE and $\overline{\text{RINGHOLD}}$ inputs to gate 423 to be "hi"](logic "1"), the trailing edge of the first clock pulse $CLKM_1$ (See FIG. 11) sequences the ring counter 422 from state (00000) to state (10000). During this latter state, the conditions under which the balance of the computational cycle will operate (I Sequence, or both) is set. Among the informatin required for this decision is the relative magnitudes of I and J. This can be obtained by subtracting the value of J from the value of I and determining the sing of (I − J). The subtraction of J and I can be performed by adding the tens complement of J to the true value of I. The result will be in tens complement form. Since J is stored in nines complement form, the tens complement can be obtained by adding one to the nines complemented value of J.

Figure 12:
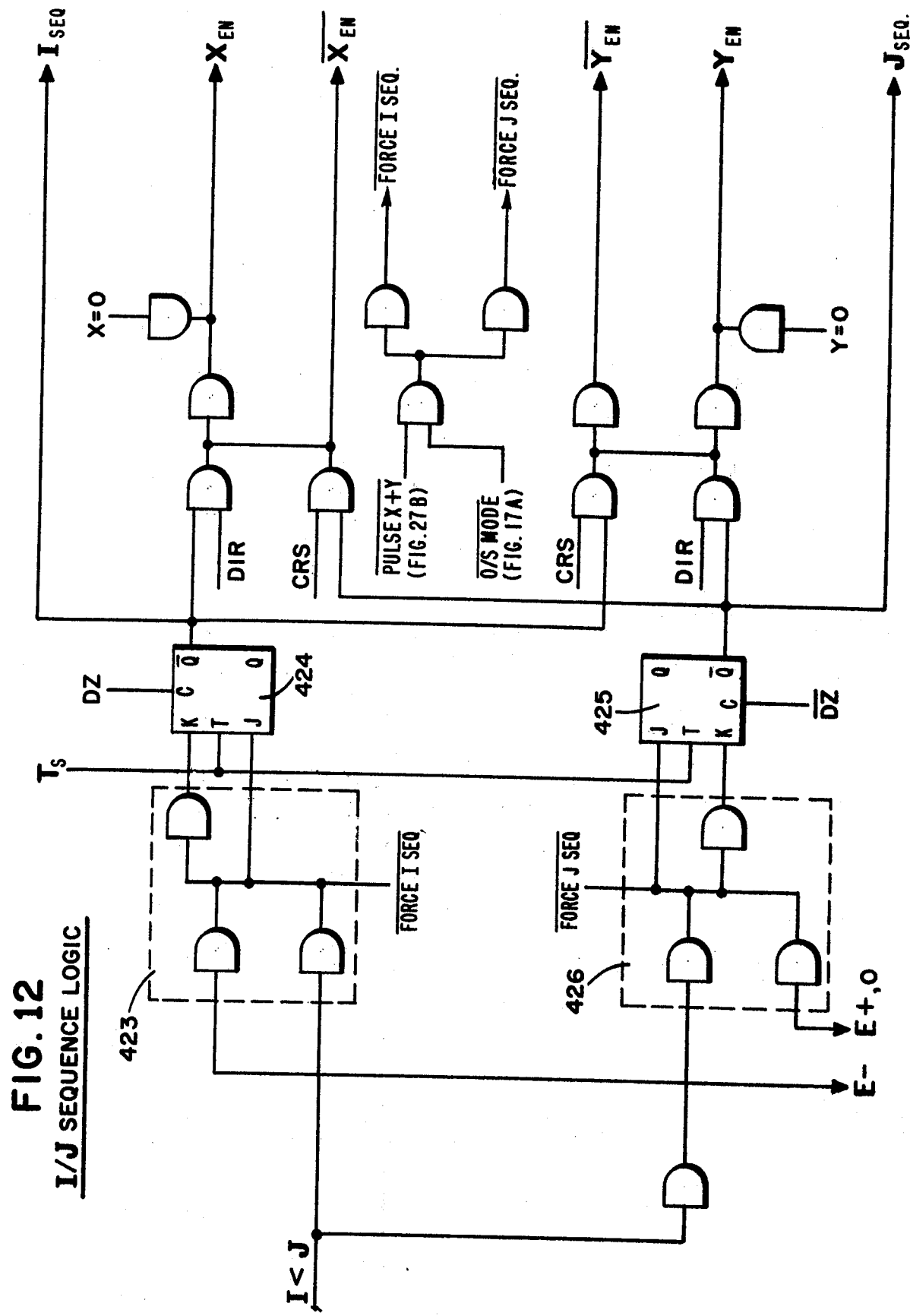
FIG. 12 shows the main contour I/J sequence selection logic.

Ring counter state (10000) enables a gate 428 which generates a signal GATE $J_A$ ($\overline{\text{GATE }J_A}$ lo) to gate the contents of J register 22 to adder inputs 36A, a signal GATE 1 ($\overline{\text{GATE I}}$ lo) to gate the contents of I register 20 to adder inputs 36B, and a signal CIN ($\overline{\text{CIN}}$ lo) to add a one to the contents of the adder to thereby obtain the tens complement of J. Decoding the most significant digit of the adder in sign decoder 360 indictes whether I is less than or greater than J. The next clock pulse $CLKM_2$ generates a pulse TS to permit an I/J SEQUENCE CONTROL LOGIC (FIG. 12) to enable an I Sequence (I SEQ) and/or a J Sequence (J SEQ) for the remainder of the ring cycle. The trailing edge of pulse CLKM sequences ring counter 422 to state (11000).

An I Sequence is desired under the following conditions: (a) the numerical value of I is less than J, or (B) the main error E is negative, A J Sequence is desired if (a) the numerical value of I is larger than or equal to J, (b) the error E is positive or, (c) the error E is zero. These conditions are sampled during ring counter state (10000) in the manner described above and the decoded relative magnitudes of I and J and the decoder sign of E are gated through gate circuits 423 and 426 to set the I SEQ flip-flop 424 and/or the J Seq flip-flop 425 at the conclusion of the TS pulse.

In an I Sequence, the following steps are performed:
First (or odd) I SEQ
 E + I → E,
 E + I → E.
Second (or even) I SEQ
 E + I → E,
 I + 1 → I,
 E + I + 1 → E.
Similarly, for a J Sequence:
First (or odd) J SEQ
 E − J → E,
 E − J →E.
Second (or even) J SEQ
 E − J → E,
 J − 1 → J,
 E − J + 1 → E.

If an ISEQ has been indicated, the next ring state (11000) enables a gate 429 which generates a GATE I ($\overline{\text{GATE}}$ lo) signal to gate the contents of the I register 20 to adder inputs 36B and a GATE E signal ($\overline{\text{GATE E}}$ lo) to gate the contents of the error register 38 to adder inputs 36A to perform an E + I operation. The next clock pulse $CLKM_3$ generates an output CLKE ($\overline{\text{CLEK}}$ lo) which clocks the output (E + I) of the adder 36 into the error register 38; the trailing edge of pulse $CLKM_3$ sequences the counter to its next state.

In the following ring state (11100), gate 430 (FIG. 10B) is enabled. The output of gate 430 will set a flip-flop 430a from its reset state ($\overline{\text{C}-\text{I}}$ hi) to state C−I hi ($\overline{\text{C}-\text{I}}$ lo) by the trailing edge of clock pulse $CLKM_4$. Setting flip-flop 430a will permit a CLKI hi pulse to be generated during the second (even) I Sequence when ring counter 422 is agains cycled to state (11100) this will increment the contents of the I register 20 by one (I + 1 operation).

The next ring state (11110) enables gate 431 and essentially duplicates the steps performed in state (11000) to again perform an E + I operation. For an even I Sequence only, the previous ring state (11100) will have reset flip-flop 430a to state $\overline{\text{C}-\text{I}}$ hi; gate 432 is therefore enabled to generate CIN ($\overline{\text{CIN}}$ lo) and increment E + I by 1, to thereby complete the odd + even I Sequence outlined above.

The following four ring states control the performance of a J SEQ. In ring state (11111), gate 433 is enabled to gate the contents of The E register 38 to the adder inputs 36A ($\overline{\text{GATE E}}$ lo) and the contents of the J register 22 to adder inputs 36B ($\overline{\text{GATE }J_B}$ lo). The desired adder output is E − J, which is obtained by adding the tens complement of J to E. The value of J is stored in the J register in nines complement form; therefore a one must be added to obtain the tens complement. This is accomplished by applying a CIN ($\overline{\text{CIN}}$ lo) to the carry input of the adder. Coincident with the next clock pulse $CLKM_6$, the contents of the adder are clocked into error register 38 ($\overline{\text{CLKE}}$ lo). In the next state (01111), set by the trailing edge of pulse $CLKM_6$, gate 434 is enabled to set a flip-flop 434a from its reset state ($\overline{C-J}$ hi) to state, (C−J) hi ($\overline{C-J}$ lo) by the trailing edge of clock pulse CLKM$_7$. This will permit a CLKJ hi to be generated during the next (even J Sequence in ring state (01111) to increment the contents of the J register by one (the value of J is decremented). In the following state (00111), gate 435 is enabled to gate the contents of the error register ($\overline{\text{Gate E}}$ lo) and the contents of the J register ($\overline{\text{GATE J}_B}$ lo) to the adder, at the same time incrementing the adder ($\overline{\text{CIN}}$ lo) to get the tens complement of J. Coincident with the next clock pulse CLKM$_8$, this sum is clocked into the error register ($\overline{\text{CLKE}}$ lo). During the next state (00011) gate 436 is enabled for an even J Sequence only to gate the contents of the error register 38 to adder inputs 36A ($\overline{\text{GATE E}}$ lo) while a carry signal ($\overline{\text{CIN}}$ lo) is gated to the carry-in input of the adder. The sum (E − 1) is clocked into the error register 38 coincident with the next clock pulse CLKM$_9$ ($\overline{\text{CLKE}}$ lo). During the final state (00001), gate 437 is enabled to generate an output pulse TM ($\overline{\text{TM}}$ lo) to command a move along the X axis if an I Sequence had been performed and/or a move along the Y axis if a J Sequence had been performed. The TM pulse also causes the signal "MAIN ENABLE" to go lo which inhibits the main contour ring 422 from advaincing any further.

SUB-COUNTER SYSTEM (FIGS. 13-16)

The sub-counter system tracks the movement of the tool vector and is called into operation when the cross error $e$ is determined to be greater than zero (the main contour control system is called into operation when the cross error $e$ is found to be less than or equal to zero).

Figure 6:
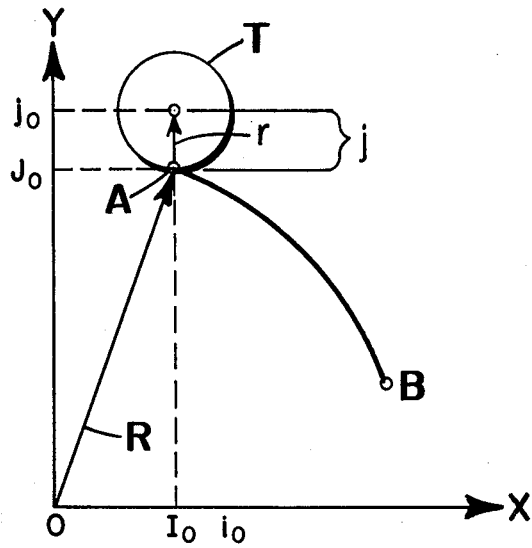
FIG. 6 illustrates the contouring technique employing CRC.

The sub-contour system includes $i$ register 44, $j$ register 46, complementer 32, adder sections $\Sigma_1$–$\Sigma_5$, sub-contour error register 48, sub-contour error sign decoder 52 and sub-contour control logic 56. The function of the sub-contour system is to control the end point of the sub vector (the X and Y components of which are $i$ and $j$) as it rotates in a circle whose radius is the specified tool radius. The development of the basic algorithm is as follows. Consider a sub vector rotating clockwise in the first guadrant (FIG. 6). If a sub-contour error ($e$) is defined as $3 = i^2 + j^2 - r_t^2$, then a one-step change in $i$ to $i + 1$ will result in an error change of $+2i + 1$. A one-step change in $j$ to $j - 1$ will result in an error change of $-2j + 1$. Accordingly, the sign of the sub error could be monitored and $i$ be allowed to step if it is negative whereas $j$ be allowed to step if the error is positive. An error of zero indicates that the end point of the sub vector is exactly on the circle of radius $r_t$. One possible refinement to this scheme is to continually enable $i$ to step as long as $i$ is less than $j$ and only allow $j$ to step when the error is positive. Beyond 45° where $i$ is larger than $i$, $j$ steps are continually enabled and $i$ is allowed to step only when the error is negative. This is very similar to the algorithm developed for the main contour control; thus details of the development of the sub-contour algorithm may be had by reference to the above-described development of the main contour conrol algorithm.

Figure 13:
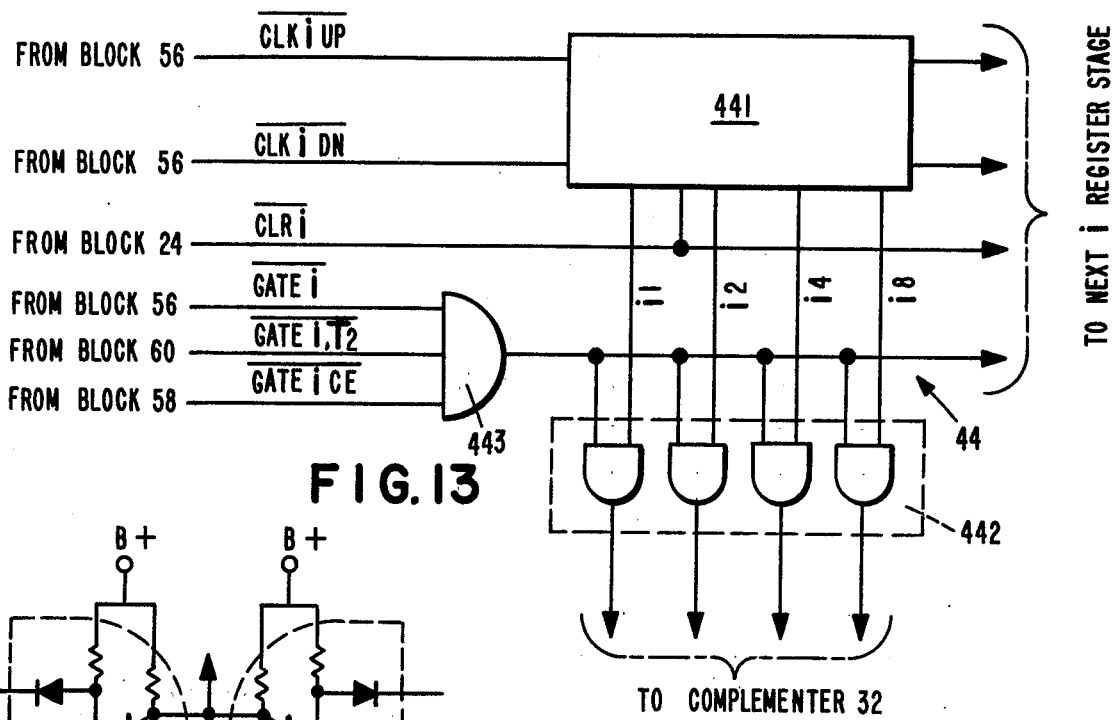
FIG. 13 shows a part of the sub-contour $i$ register logic.

The $i$ register 44 is a 4-digit (4-bit per digit) counter/register which stores the X component of the sub or tool vector; the numerical value of $i$ is stored in tru form. The $i$ register contains four substanially identical sections, each representing one digit, the least significant digit section being shown in detail in FIG. 13. Each register stage 441, like all register stages used in this embodiment, consists of a 4-bit counter (available as a unit from Texas Instruments, Inc., as Model 74192). The contents of the $i$ register are incremented by a signal "CLKiUP" ($\overline{\text{CLKiUP}}$ lo) or decremented by a signal "CLKiDN" ($\overline{\text{CLKiDN}}$ lo) applied to appropriate register inputs from the sub-counter control logic 56. At the start of each problem, the contents of the $i$ register are cleared to zero by a signal "CLRi" ($\overline{\text{CLRi}}$ lo). The $i$ register outputs are gated to corresponding inputs of complementer 32. Each output bit $i1$, $i2$, $i4$, $i8$ of counter 441 is connected to one corresponding input of a gate circuit 442. A second input of each gate is connected in common to the output of a 3-input gate 443. The inputs to this gate are derived from appropriate outputs of the sub-contour control logic 56, initialize control logic 60 and update control logic 58. The outputs of gates 442 are connected to corresponding inputs of complementer 32.

It is also necessary to determine when the contents of the $i$ register are zero. For this purpose, the outputs from each register stage are gated together to generate a logic "zero" when the contents of the $i$ register 44 are zero ($\overline{i=0}$ lo).

Figure 14:
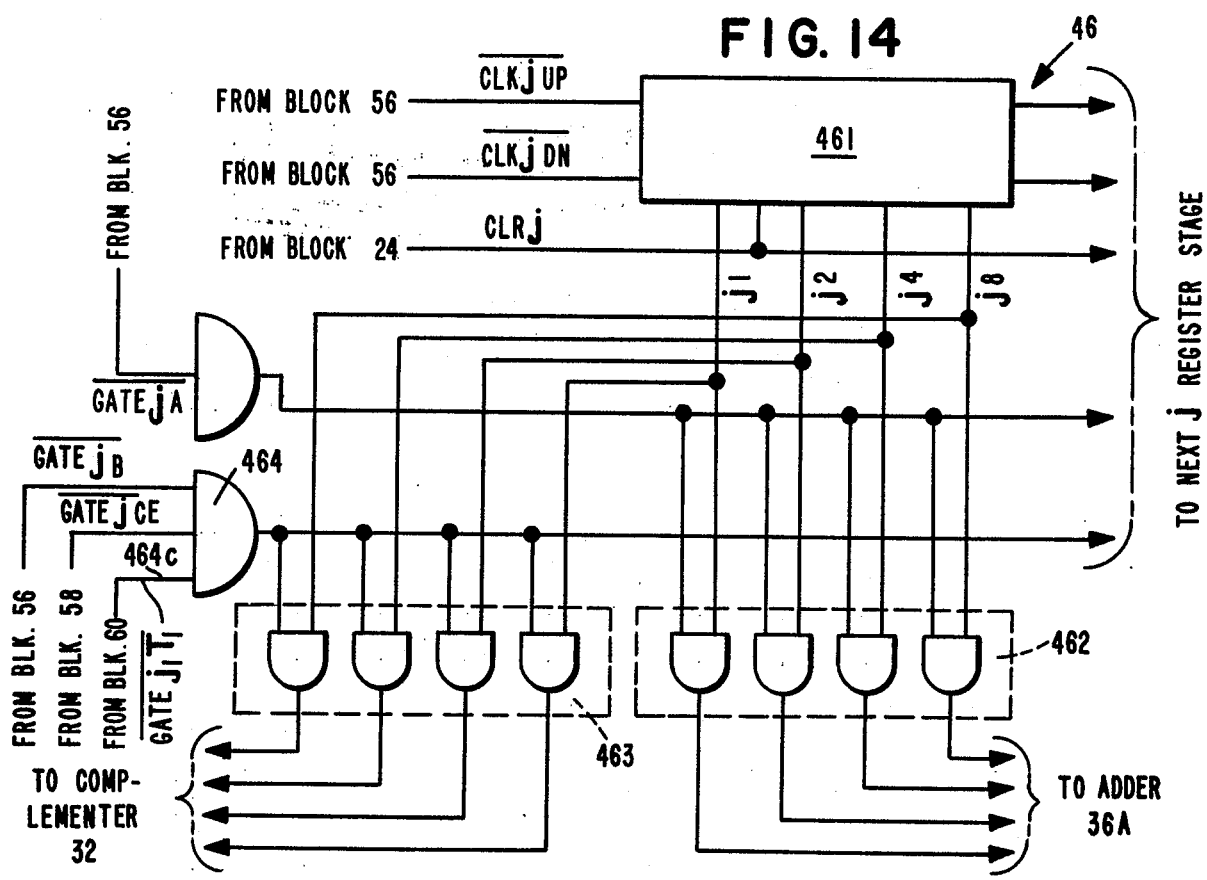
FIG. 14 shows a part of the sub-contour $j$ register logic.

The $j$ register 46 is basically similar to the $i$ register described above and also consists of a 4-digit (4-bit per digit) register/counter and associated gating, the least significant digit stage of which is shown in FIG. 14. Again, a counter 461 (e.g. TI Model 74192) may be clocked up or down by logic signals "CLKjUP" ($\overline{\text{CLKjUP}}$ lo) or "CLKjDN" ($\overline{\text{CLKjDN}}$ lo) supplied from the sub-contour control logic 56. The $i$ register and the $j$ register are cleared at the beginning of each computation cycle by signals "CLRi" and "CLRj" from the offset load logic 24.

The $j$ register outputs $j1$, $j2$, $j4$, $j8$ are gated through gates 462 to the A inputs of adder stages $\Sigma_2$ - $\Sigma_5$ by a "GATE j$_A$" signal ($\overline{\text{GATE j}_A}$ lo) from the sub-contour control logic 56. Alternatively, these outputs may be gated to the complementer 32 by gating signals "GATE j$_B$" ($\overline{\text{GATE j}_B}$ lo), "GATE j$_{CE}$" ($\overline{\text{GATE j}_{CE}}$ lo), or "GATE j$_1$T$_1$" ($\overline{\text{GATE j}_1 \text{T}_1}$ lo) from the sub-contour control logic 56, update control logic 58 or initialize control logic 60, respectively, which are coupled in common to one set of inputs of gates 463 through gate 464.

Figure 15A:
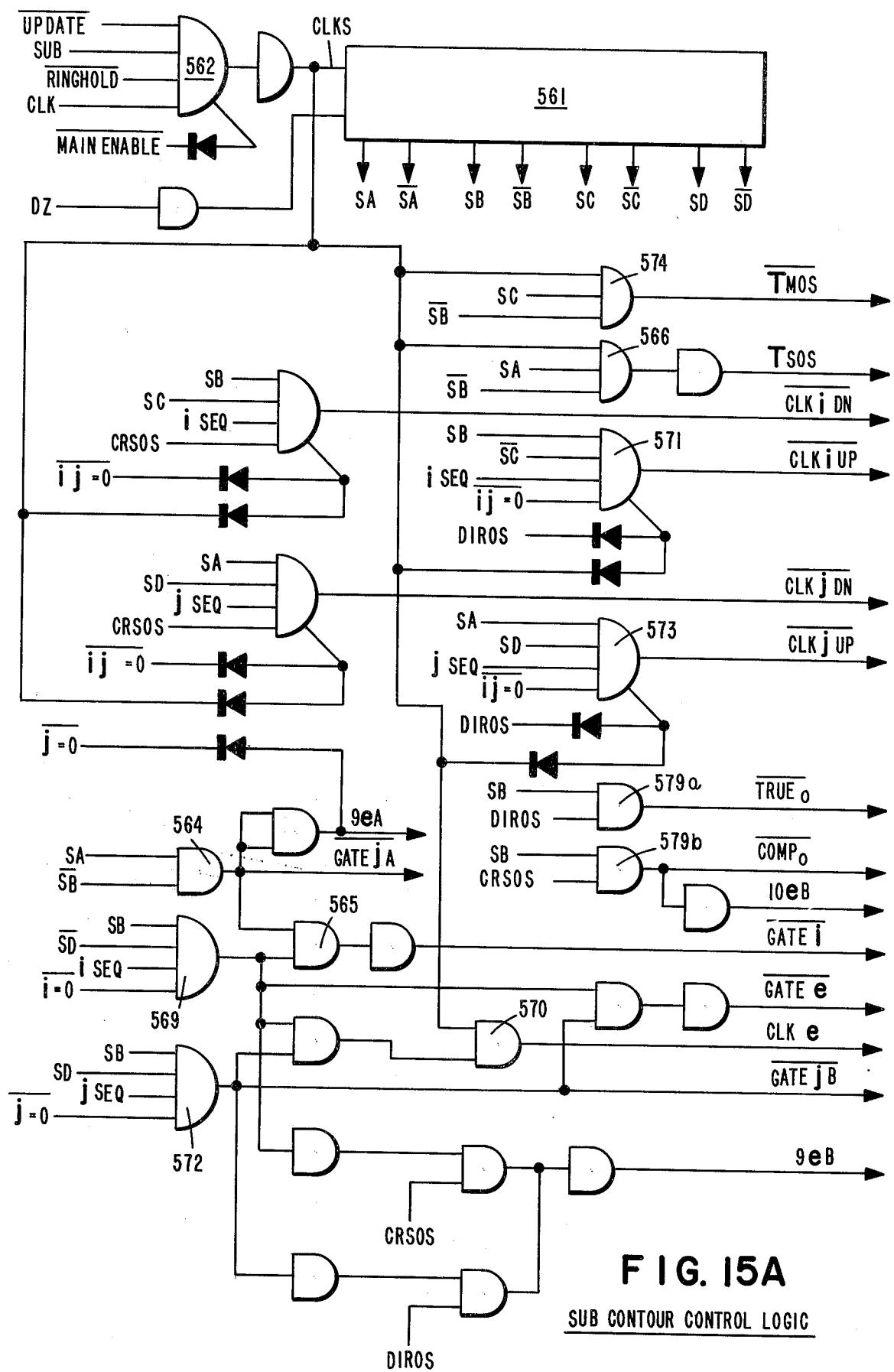
FIGS. 15A-15C show the sub-contour system timing and control logic, $i/j$ sequence selection logic, and direct/cross logic.
Figure 15B:
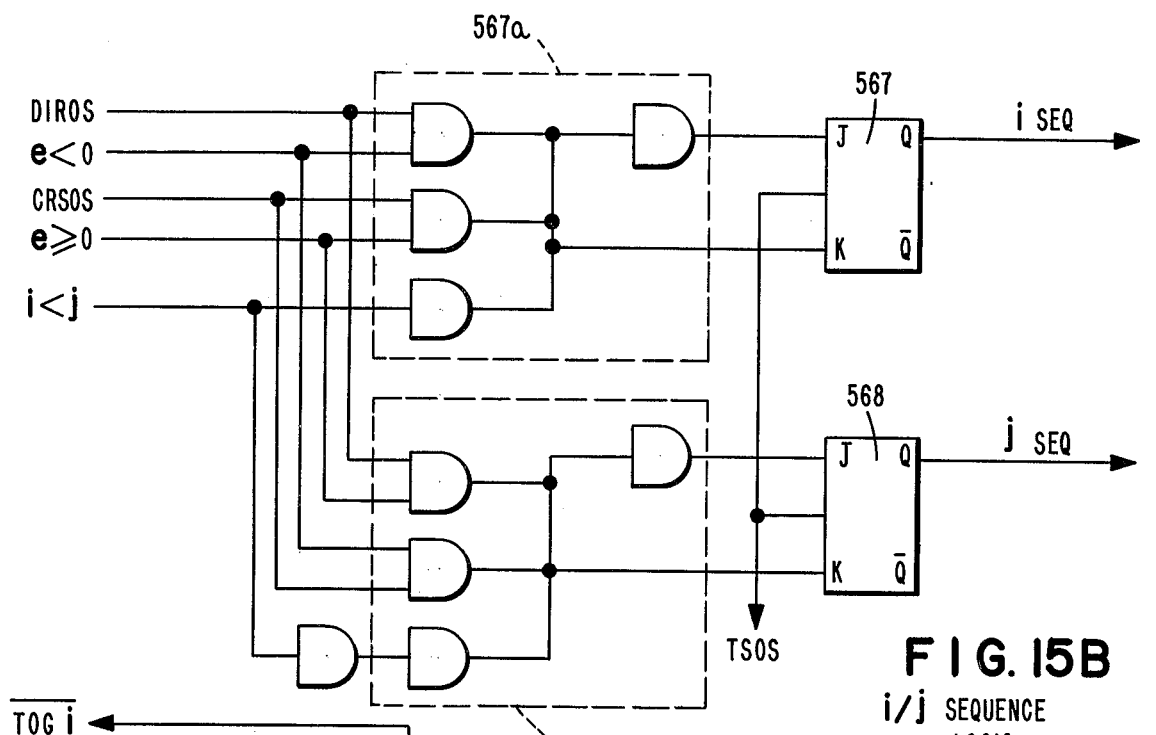
Figure 15C:
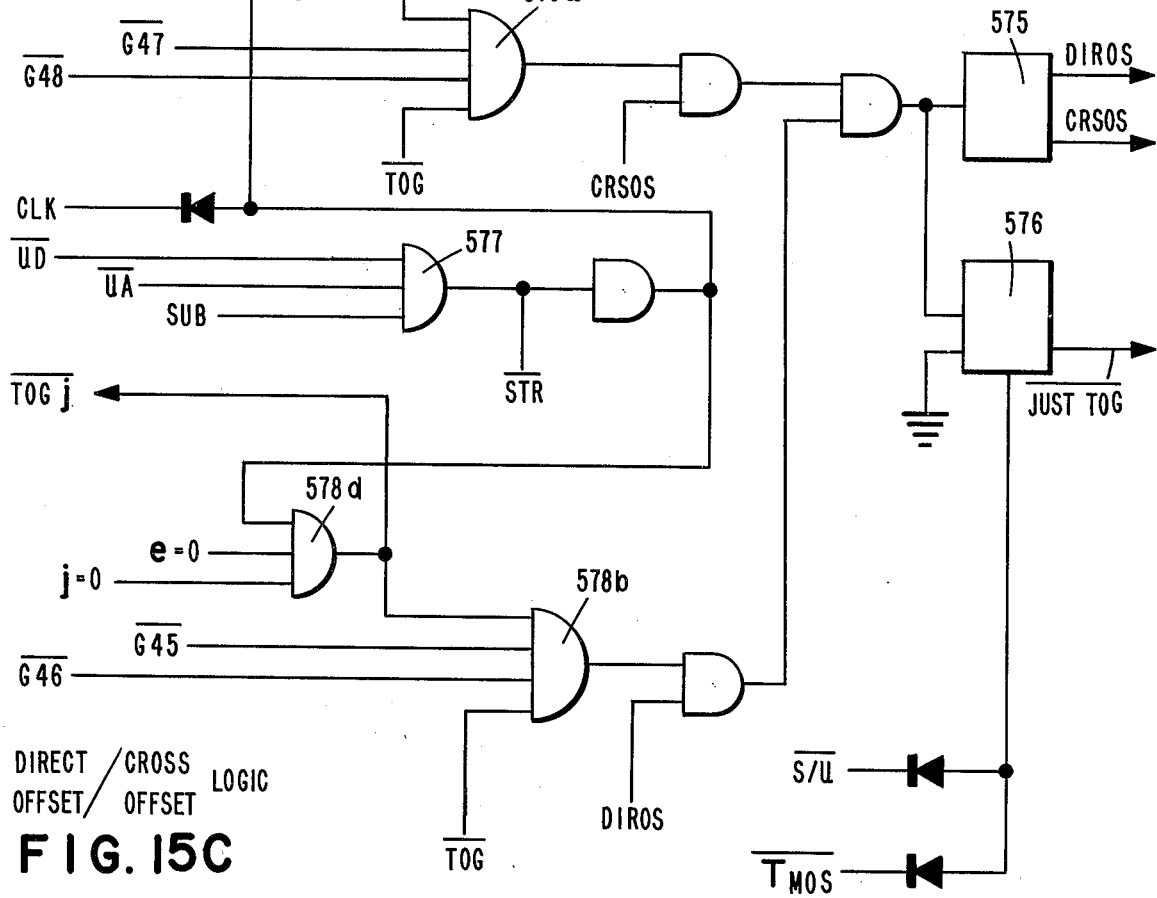

The sub-contour timing and control logic is shown in detail in FIGS. 15A–15C. The sub-contour timing logic which controls the timing of the various operations performed by the sub-contour system is shown in FIG. 15A. In order to perform a sub-contour computation, the system must determine whether the problem is a direct or a cross-problem; the circuit for accomplishing this determination is shown in FIG. 15C. Also, the system must decide, on the same basis as the main contour system, whether an $i$ sequence of a $j$ sequence or both is to be performed; the logic circuit for choosing the appropriate $i$ and/or $j$ sequence is shown in FIG. 15B.

The sub-contour timing circuit includes a 4-stage twisted ring counter 561, similar to the 5-stage counter 422 of the main contour timing logic. Input signals CLKS shift the ring counter 561 through 8 states in sequence, each of which can be uniquely defined by one pair of outputs SA, SB, SC and SD and their complements, $\overline{\text{SA}}$, $\overline{\text{SB}}$, $\overline{\text{SC}}$ and $\overline{\text{SD}}$, respectively (See Table B). An input from clock 68 (CLK) is gated with inputs from the CRC control logic 64 (SUB, $\overline{\text{MAIN ENABLE}}$), update control logic 58 ($\overline{\text{UPDATE}}$), and VCO 72

(RINGHOLD) through gate 562 to advance the ring counter 561 through its states. The sub-contour cycle is allowed to proceed as long as the update logic 58 is not performing an update operation (i.e., updating the cross-error $e$ after a move in the X and/or Y directions).

Following turn-on and at the completion of each problem (X axis and Y axis counters at zero), the counter 561 is reset to zero by decade zero pulse DZ.

Assuming the CRC logic has called for a sub-contour sequence (SUB hi, $\overline{\text{MAIN ENABLE}}$ hi), the update logic is not performing a cross-error update ($\overline{\text{UPDATE}}$ hi) and the timing is synchronized ($\overline{\text{RINGHOLD}}$ hi), the trailing edge of clock pulse CLKS$_1$ (see FIG. 16) sets the ring counter 561 from the (0000) to the (1000) state. In this state (defined by decoded counter outputs SA, $\overline{\text{SB}}$), both inputs to gate 564 go "hi" causing the output, to go "lo" and generate a signal "GATE j$_A$" ($\overline{\text{Gate j}_A}$ lo); the output of gate 565 one input of which is coupled to the output of gate 564 therefore goes "hi", to generate a "GATE i" signal ($\overline{\text{GATE i}}$ lo). The result of this operation is to gate the contents of the $i$ register to the adder inputs 36B and the contents of the $j$ register to adder inputs 36A. At the same time, a signal 9eA will be generated to gate a leading BCD9 into the most significant adder digit $\Sigma_1$. This is necessary to account for the fact that $i$ and $j$ occupy only adder section $\Sigma_2$-$\Sigma_5$ whereas the sub error register 48 utilizes section $\Sigma_1$ as well. Adding a leading 9 to the most significant digit(s) of a complement is equivalent to adding a leading zero to the true value.

The value of $i$, stored in the $i$ register in true form, is gated through the complementer unchanged. The value of $j$, stored in tens complement form in the $j$ register, is gated directly to the adder inputs 36A; adding $i + j_{10}$ is equivalent to subtracting $j$ from $i$. Sign decoder 360 at the output of adder 36 indicates whether $i$ is less than or greater than $j$.

The next clock pulse CLKS$_2$ enables gate 566 to generate a pulse TSOS which (analogous to main contour pulse TS) permits triggering $i$ seq flip-flop 567 and $j$ seq flip-flop 568 to thereby enable an $i$ sequence and/or a $j$ sequence for the remainder of the ring cycle.

FIG. 15B shows the $i/j$ sequence logic by which the sub-contour will enable $i$ and $j$ sequences. An $i$ sequence will be enabled for a sub-contour computation under the following conditions: $i$ is less than $j$; $e$ is less than zero for a direct offset problem; or $e$ is greater than zero for a cross offset problem. A $j$ sequence will be initiated for any of the following conditons: $i$ greater than or equal to $j$; $e$ is less than zero for a cross offset problem; or $e$ is equal to or greater than zero for a direct offset problem. These input conditions, derived from the outputs of sign decoders 360 and 52 are gated through gate circuits 567a and 568a to set flip-flops 567 and 568 appropriately.

The trailing edge of clock pulse (CLKS$_2$) will sequence ring counter 561 to its next state (1100). If the sub-contour control logic has initiated an $i$ sequence and if $i$ is not equal to zero ($\overline{i = 0}$ hi) gate 569 will be enabled to gate the contents of $i$ register 44 to adder inputs 36B ($\overline{\text{GATE i}}$ lo) and to gate the contents of sub-contour error register 48 to adder inputs 36A ($\overline{\text{GATE e}}$ lo). The output of adder 36 ($e + i$) is clocked into $e$ register 48 coincident with the next clock pulse (CLKS$_3$) through gate 570 ($\overline{\text{CLKe}}$ lo). Simultaneously, for a direct offset problem (assumed to be the case througout the principal description of this embodiment) and when $i$ and $j$ are both not zero ($\overline{ij = o}$ hi), the contents of the i register will be incremented by 1; this is accomplished by generating a "CLKiUP" signal, ($\overline{\text{CLKiUP}}$ lo) at the output of gate 571. This completes the $i + 1$ computational step.

Ring counter 561 is then stepped by the trailing edge of clock pulse CLKS$_3$ to state (1110). In this state, gate 569 is again enabled to gte the contents of $i$ register 44 to adder inputs 36B ($\overline{\text{GATE i}}$ lo) and to gate the contents of e register 48 to adder inputs 36A ($\overline{\text{GATE e}}$ lo) to obtain ($e + i$). The next clock pulse (CLKS$_4$) enables gate 570 ($\overline{\text{CLKe}}$ lo) to gate the contents of adder 36 ($e + i$) back to $e$ register 48. At the conclusion of an $i$ sequence, the contents of $e$ register 48 will contain $e + 2i_o + 1$.

The trailing edge of clock pulse CLKS$_4$ will sequence the ring counter to state (1111). If a $j$ sequence is indicated by the sub-contour logic, gate 572 will be enabled to gate the contents of the $j$ register 46 to adder inputs 36B ($\overline{\text{GATE j}_B}$ lo) /and the contents of e register 48 to adder inputs 36A ($\overline{\text{GATE e}}$ lo). At the same time, a signal "9eB" will be generated to gate a BCD9 to the most significant digit of the adder. The output of the adder will be $e - j$ ($e + j_{10}$) which is clocked into the $e$ register 48 coincident with the next clock pulse (CLKS$_5$). Also coincident with clock pulse CLKS$_5$, gate 573 will generate a "CLKjUP" signal ($\overline{\text{CLKjUP}}$ lo) to increment the contents of the $j$ register by 1; this is equivalent to decrementing the value of $j$ by 1 since, as was noted, the value of $j$ is stored in the $j$ register in tens complement form.

The trailing edge of clock pulse CLKS$_5$ will sequence ring counter 561 to its next state (0111). Gate 572 will again be enabled to gate the $j$ register contents to adder intputs 36B ($\overline{\text{GATE j}_B}$ lo) and e register contents to adder inputs 36A ($\overline{\text{GATE e}}$ lo) to perform an $e + (-j)$ computation. The output of the adder ($e - 2j_o + 1$) is clocked back into $e$ register 48 ($\overline{\text{CLKe}}$ lo) coincident with the next clock pulse (CLKS$_6$), the trailing edge of which will shift ring counter 561 to its next state (0011). Coincident with the next clock pulse CLKS$_7$, gate 574 will generate pulse "TMOS" ($\overline{\text{TMOS}}$ lo) which shifts $\overline{\text{UPDATE}}$ "lo" to inhibit the further advance of the sub-contour ring counter 561, thereby concluding a sub-contour computation cycle.

Throughout the past discussion, it has been assumed in the development of the algorithm that the value of $i$ was increasing whereas the value of $j$ was decreasing. Such would be true if the sub vector were rotating from the Y axis toward the X axis. This is referred to as direct offset motion (DIR$_{os}$). The opposite case, cross offset motion (CRS$_{os}$), is invoked when the sub vector is rotating from the X axis toward the Y axis. In this situation, the value of $i$ decreases while the value of $j$ increases. Accordingly, the logic must account for this by performing operations such as ($e - 2i + 1$) for an $i$ sequence and ($e + 2j + 1$) for a $j$ sequence. FIG. 15C shows the portion of the sub-contour logic which determines whether a Direct or a Cross problem is indicated. The initial state of the DIR$_{os}$ - CRS$_{os}$ flip-flop 575 is set by the initial programmed conditions (G45, G46, G47, G48). Thereafter, it will change state automatically as the sub vector rotates through the cardinal axes. The X axis is crossed when the sub-counter error is equal to zero ($e = o$) and the value of $j$ is equal to zero ($j = o$). Likewise, the Y axis is crossed at the simultaneous occurence of $e = o$ and $i = o$. Either situation, upon application of a strobe signal ($\overline{\text{STR}}$) generated by the output of a gate 577 or by the rotate logic, will cause the DIR$_{os}$-CRS$_{os}$ flip-flop 575 to switch state, or toggle. The outputs of gates 578c and 578d($\overline{TOGj}$ and $\overline{TOGj}$ respecitvely) are connected to corresponding inputs of SIGN $i$ flip-flops 253 and SIGN $j$ flip-flop 254 (FIG. 18B) to toggle the signs of $i$ and $j$.

The sub-contour computation sequence for a direct offset problem is shown in Table C.

TABLE C
SUB-CONTOUR COMPUTATION SEQUENCE

| RING STATE | SYSTEM CONDITION | INSTRUCTION | OPERATION |
|---|---|---|---|
| 0000 | — | — | — |
| 1000 | + 1 clk pulse | GATE jA; GATE i<br>TSOS | $\Sigma i - j$<br>start sub computation |
| 1100 | i seg; $\overline{i = o}$<br>+ 1 clk pulse | GATE e; GATE i | $\Sigma e + i$<br>$\Sigma e + i \rightarrow e$ |
|  | DIRos; i seg; $\overline{ij = o}$ | clkiup | $i + 1$ |
| 1110 | i seg; $\overline{i = o}$<br>+ 1 clk pulse | GATE e; GATE i | $\Sigma e + i$<br>$\Sigma e + i - e = e_o + 2i_o + 1$ |
| 1111 | j seq; $\overline{j = o}$<br>+ 1 clk pulse | GATE jB; GATE e; 9eB | $\Sigma e + j*$<br>$\Sigma e + j* \rightarrow e$ |
|  | DIRos; j seq; $\overline{ij = o}$ | clkjup | $j* + 1$ |
| 0111 | j seq; $\overline{j = o}$<br>+ 1 clk pulse | GATE jB, GATE e; 9eB | $\Sigma e + j*$<br>$\Sigma e + j* - e = e_o - 2j_o + 1$ |
| 0011 | + 1 clk pulse | TMOS | END SUB COMPUTATION |

*j = 10's complement of j

During a direct offset problem, the contents of the $i$ and $j$ registers will be gated through the complementer 32 unchanged by a signal TRUE$_o$ ($\overline{TRUE_o}$ lo) generated at the output of a gate 579a; a cross problem causes gate 579b to generate a COMP$_o$ signal ($\overline{COMP_o}$ lo) to complement $i$ and $j$.

From the above description, it can be seent that the computations performed by the sub-contour system are substantially the same as those performed by the main contour system, except that, since the sub-counter date is originally, stored in half-thousandth steps, the odd and even determinations required in a main contour computation are unnecessary in the sub-contour computational cycle. It is a feature of this invention that the main and sub-contour computational cycles, each of which result in an appropriate axis command (although not necessarily a move) in the X and/or Y directions, are never performed simultaneously. Rather, the main or sub-contour operations are enabled by the CRC control logic 64 as a function of the magnitude of the cross error.

OFFSET LOGIC/OFFSET LOAD LOGIC 24 (FIGS. 17A–17B)

When programming an actual part to be machined, the programmer must account for the size of the cutter which will be used. Thus, he must be able to enter the diameter of the tool so that the CRC system can determine the initial offset to then provide the necessary compensation during a contouring problem. In one embodiment of this invention, the programmer is able to store at least 8 different tool diameters which are loaded by thumbwheels (represented in FIG., 7A by diameter offset block 11). The offset logic 10 must therefore be able to ascertain the particular tool diameter called for by the program. Moreover, if more than one cutting tool is employed during various stages of the contouring operation, the system must be able to adjust the offsets accordingly.

The offset locig decodes and stores the programmed offset information. In the preferred embodiment of this invention, offset information is programmed as pairs of numbers. Thus, for an eight offset pair control, the offset codes are programmed as codes T01–T08 to represent the eight offset diameters read in on thumbwheel switches 11. Two additional codes are also programmed: T00 represents a programmed stop which causes the present offset to be removed, after which the control system goes into a stop mode; and T09 is and instruction to remove the present offset without necessarily going into the stop mode. The offset pair numbers are stored in the offset logic 10 in BCD form and are decoded to yield the single outputs 01–08 which in turn enable selection of the desired diameter offset stored in the corresponding thumbwheel switch set.

Figure 17A:
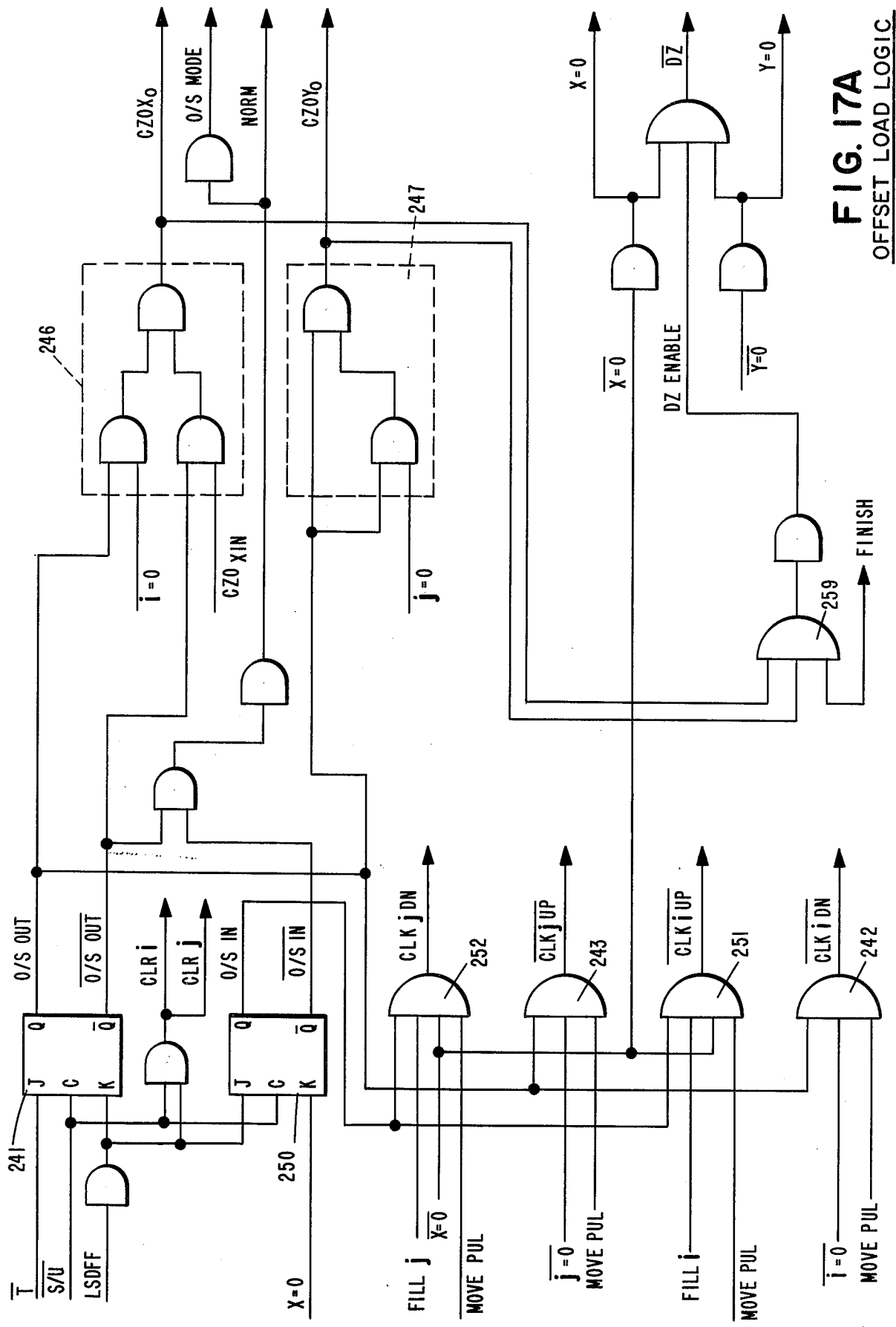
FIGS. 17A-17B show the offset load logic.

A contour problem has been defined as the movement of the cutter relative to the workpiece about an arcuate path between points A and B, the total excursion being defined as the distances moved along the X and Y axes, respectively. Among the information which must be programmed at the start of each new problem is the offset code representing the tool diameter. Before inserting new offset information, however, offset information stored in the $i$ and $j$ registers at the end of the just completed contour proglem must be removed. Upon decoding the character T, the OFFSET OUT flip-flop 241 (FIG. 17A) is set and generates and O/S OUT signal which, in conjunction with $\overline{i = o}$ hi and "MOVE PUL" pulses (the latter from timing circuit 70), will generate output pulses at gate 242 to count $i$ down to zero ($\overline{CLKiDN}$ lo); similarly, in conjunction with "$\overline{j = o}$" hi and "MOVE PUL" signals, O/S OUT hi will generate an output signal at gate 243 to count $j$ up to zero ($\overline{CLKjUP}$ lo).

Figure 30B:
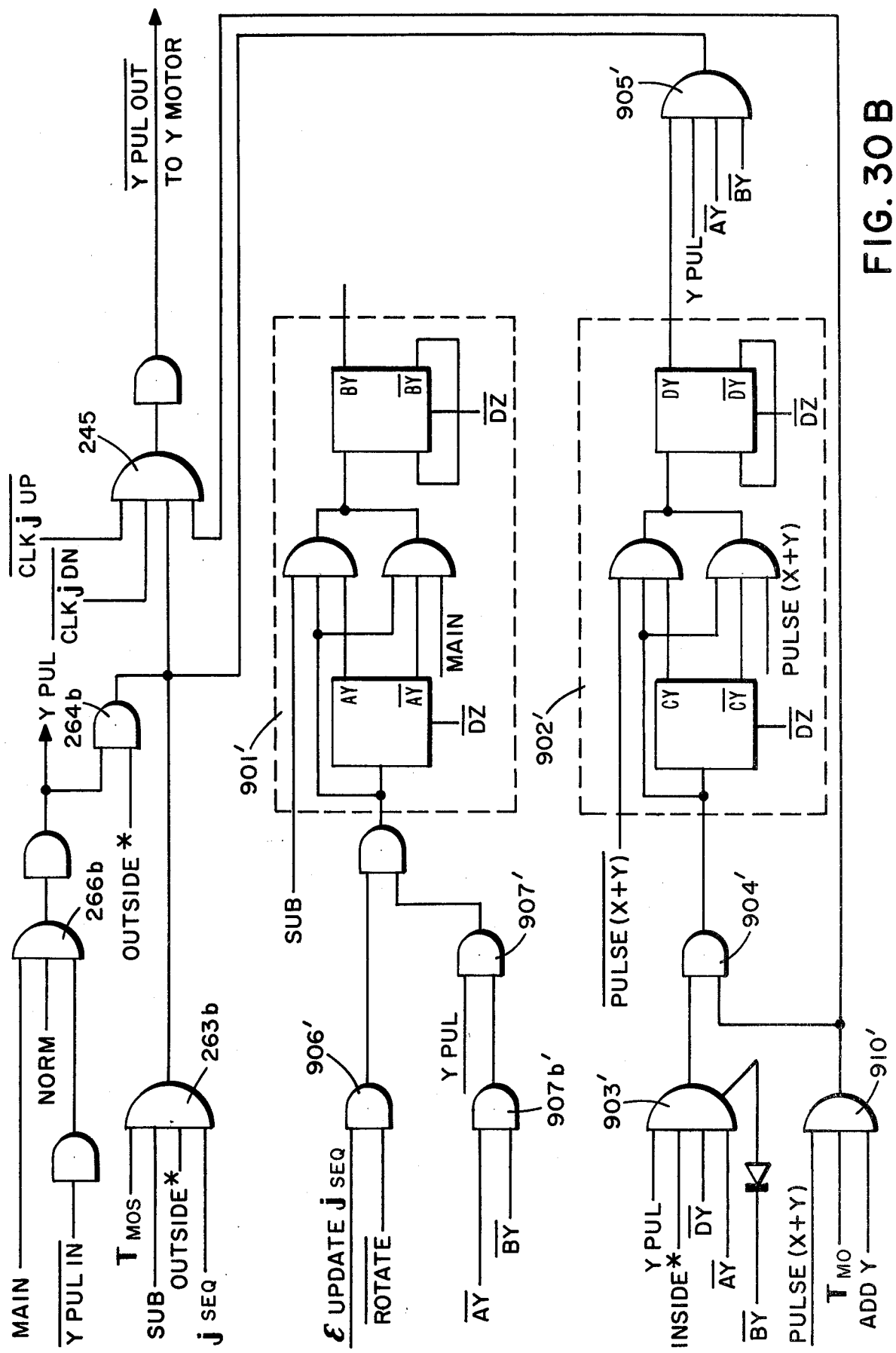

As the $i$ and $j$ registers are being counted down to zero (by clocking $i$ down and clocking $j$ up), pulses are being generated ($\overline{X PUL OUT}$ lo and $\overline{Y PUL OUT}$ lo) through gates 244 and 245 to initiate stepping of the X and Y motors, respectively (FIGS. 30A and 30B). When the $i$ and $j$ registers have been clocked to zero, inputs "$i = o$" and "$j = o$" to gate circuits 246 and 247 go "hi" and generate signals CZOX$_o$, CZOY$_o$, respectively, which are supplied to the timing logic 70 to continue reading in programmed information concerning the new problem.

The next two characters following the T are read into the offset logic 10 to decode the location of the corresponding diameter offset set into switches 11; this offset is entered into the X axis counter 12; during this phase the X axis counter is used as a temporary storage area and its contents will be clocked into either the $i$ or $j$ register as a function of the G code chosen.

Figure 17B:
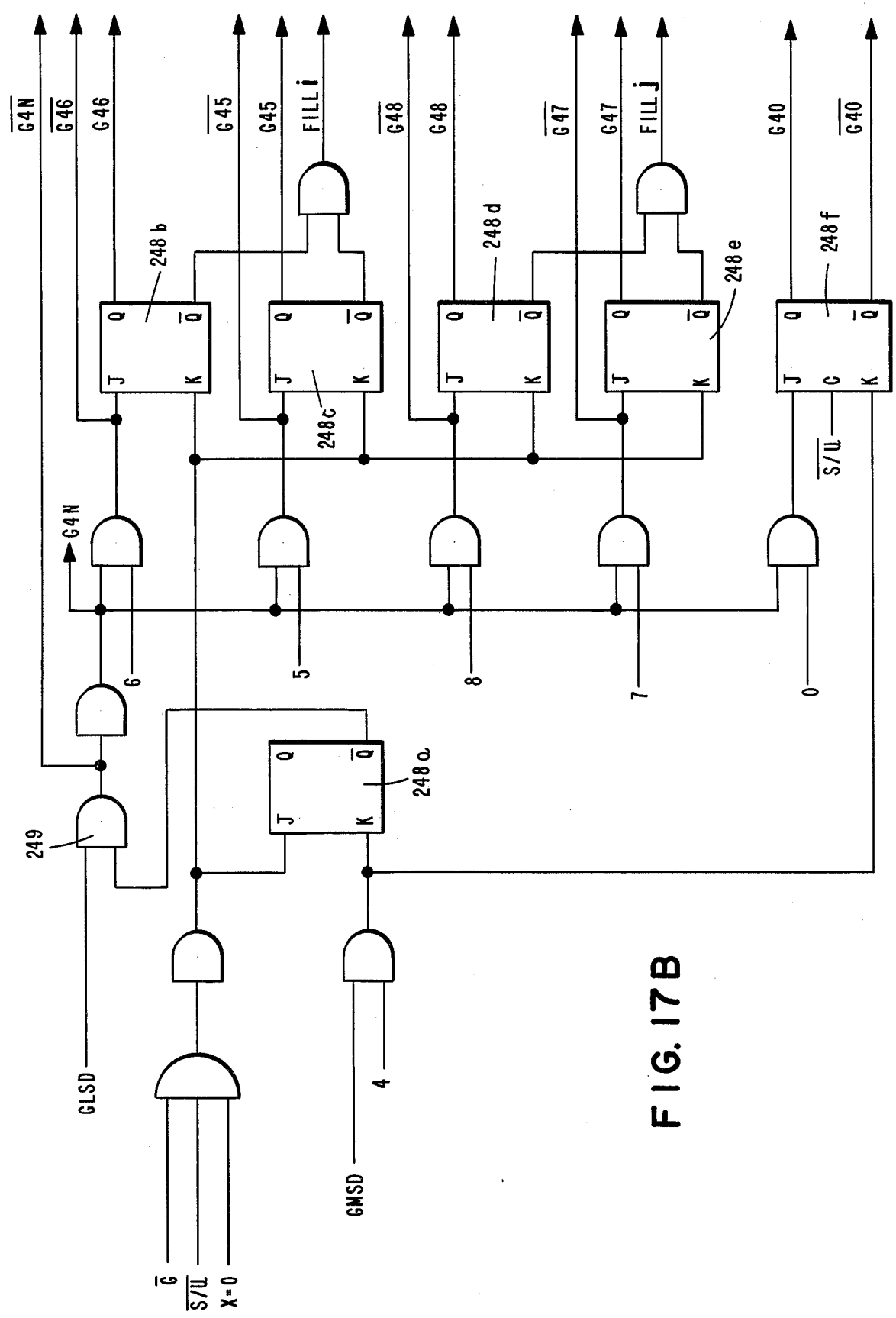

Decoding the next character, G, results in output signals GMSD and GLSD being generated coincident with the next two characters immediately following the G (FIG. 17B). Decoding a G ($\overline{G}$ lo) also resets G flip-flops 248a–248f. If the next character decoded is a 4, the G4 flip-flop 248a will be set to generate a G4N signal coincident with signal GLSD, both of which are applied to the inputs of gate 249. The following number, if it is a 5, 6, 7, or 8, will set the corresponding flip-flop 248b, 248c, 248d, or 248e to set output G45, G46, G47 or G48 hi. a G45 code indicates that the tool radius offset is to be entered along the +X direction, G46 indicates the radius offset is in the −X direction, G47 is in the +Y direction, and G48, the −Y direction. G45 and G45 signals generate a "fill i" signal whereas G47 or G48 codes cause a signal "fill j" to be generated.

At the completion of the offset out phase, the offset logic generates a signal LSDFF which resets the offset out flip-flop 241 and simultaneously sets an OFFSET IN flip-flop 250. When this flip-flop is set, a signal "O/S IN" is generated and applied in common to one input of gates 251 and 252. Depending upon whether a "fill i" signal is generated (G45 or G46) or a "fill j" signal is generated (G47 or G48), the offset value stored in the X axis counter will be clocked by a signal CLKiUP ($\overline{CLKiUP}$ lo) into the i register or by a signal CLKjDN ($\overline{CLKjDN}$ lo) into the j register. The CLKiUP and CLKjDN signals are applied to gates 244 and 245, respectively to commence a corresponding movement in either the X or the Y direction, the direction of movement being controlled by the steering logic. When the X axis counter has been clocked to zero (indicating that the diameter offset has been fully entered into either the i or j register) flip-flops 248a and 250 are reset by signal X = 0 ($\overline{X} = 0/0$) which also enerates signal DZ (DZ/o) at the output of (gate 258 around gate 258. With the offset-in flip-flop 250 and offset-out flip-flop 241 both reset, a signal "NORM" goes "hi". The "NORM" signal indicates that offset is neither being put in nor taken out and the remainder of the program is now ready to run. Following the offset programming, the main contour information is read into the system through the load logic 8.

SIGNS & STEERING LOGIC 26 (FIGS. 18A–18C)

The steering logic provides the necessary signals to the X and Y axis motor logic to drive the X and Y motors in the + or − directions and the signs logic output is used to set the TRU/COMP logic appropriately.

Figure 18A:
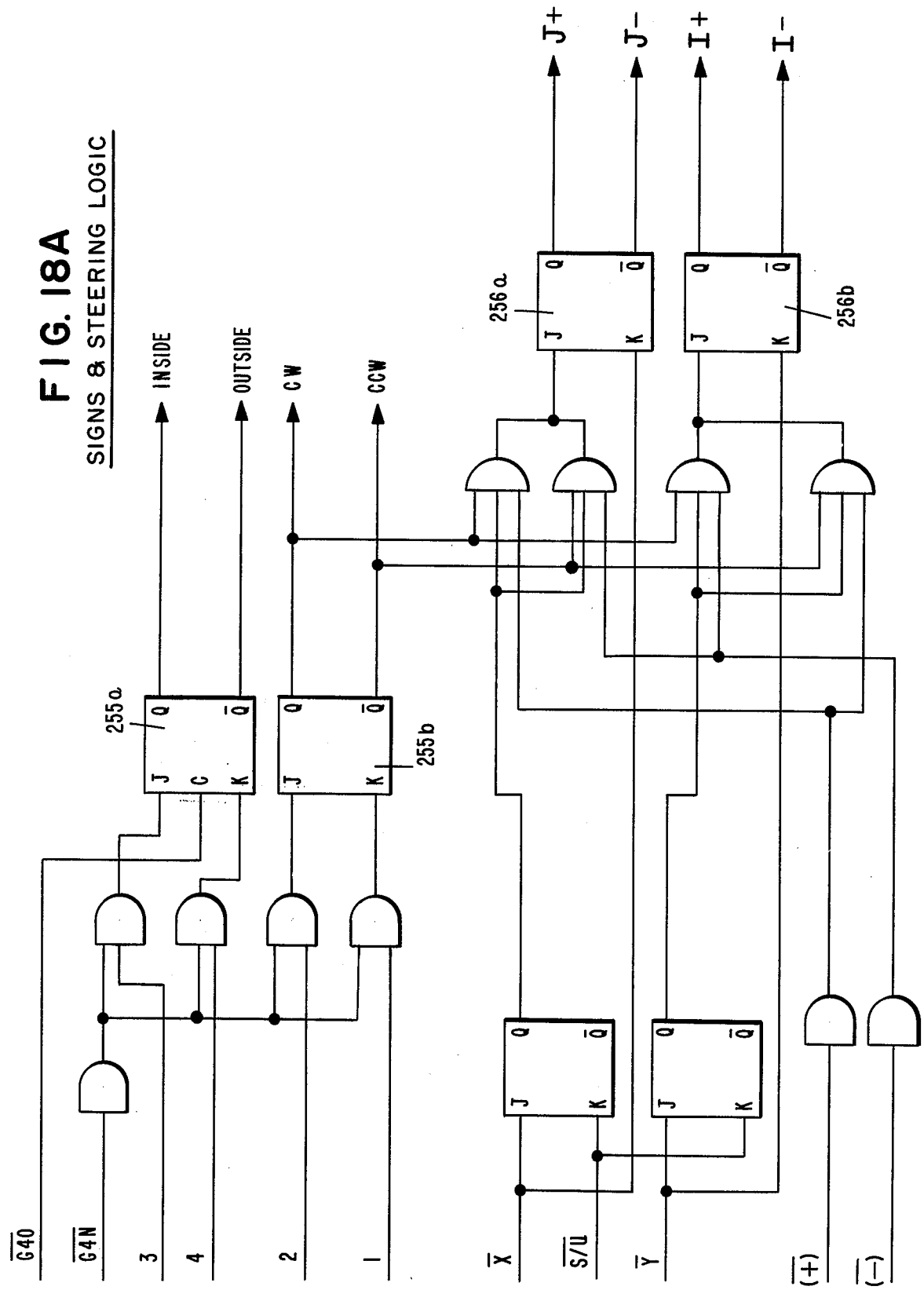
FIGS. 18A-18C show the signs and steering logic.

FIG. 18A shows the logic by which the programmed information is decoded to determine whether a cut is to be an inside or an outside cut, motion is to be in the clockwise (CW) or counter-clockwise (CCW) direction and whether I and J are positive (+) or negative (−). Inputs $\overline{G40}$ and $\overline{G4N}$ are obtained from the load logic circuit of FIG. 17B. Inputs 3, 4, 2, 1, $\overline{X}$, $\overline{Y}$, ($\overline{+}$) and ($\overline{-}$) are decoded by decoder 6 from the programmed information. A G40 instruction ($\overline{G40}$ lo) will always reset IN/OUT flip-flop 255a (OUTSIDE hi) to indicate an outside cut. A G43 or G44 instruction is gated to flip-flop 255a to set the appropriate output INSIDE hi or OUTSIDE hi, respectively. Similarly, a G41 or G42 instruction will set CW/CCW flip-flop 255b output CCW hi or CW hi, respectively.

A decoded X input ($\overline{X}$ lo), indicating the presence of programmed X excursion data, and its corresponding decoded sign are gated with the outputs of flip-flop 255b to set SIGN J flip-flop 256 a to "J+" hi if X is positive and motion is clockwise (G42) or X is negative and motion is counter clockwise (G41). Otherwise, the "J−" output of flip-flop 256a will be set hi. Similarly, a decoded Y input ($\overline{Y}$ lo) indicating the presence of programmed Y excursion data, and its decoded sign are gated with the outputs of flip-flop 255b to set SIGN I flip-flop 256b to "I+" hi if Y is negative and motion is clockwise or if Y is positive and motion is counterclockwise. Otherwise, the "I−" output of flip-flop 256b will be set hi.

The initial signs of i and j are determined by the programmed G codes and are strobed into i SIGN flip-flop 253 and j SIGN flip-flop 254, respectively, coincident with a decoded EOB signal (EOB lo). EOB indicates that all programmed information for the present problem has been entered into the appropriate logic locations. The i sign flip-flop 253 is set to "i+" hi by a programmed G45, by a "CW" and a programmed G47, or by a "CCW" and a programmed G48. The flip-flop 253 is set to "i−" hi by a programmed G46, by a "CW" and a programmed G48, or by a "CCW" and a programmed G47. The j sign flip-flop 254 is set to "J+" hi by a programmed G47, or by a "CW" and a programmed G46, or by "CCW" and a programmed G45. The flip-flop 254 is set to "j−" hi by a programmed G48, by a "CCW" and a programmed G46, or by a "CW" and a programmed G45.

Figure 19A:
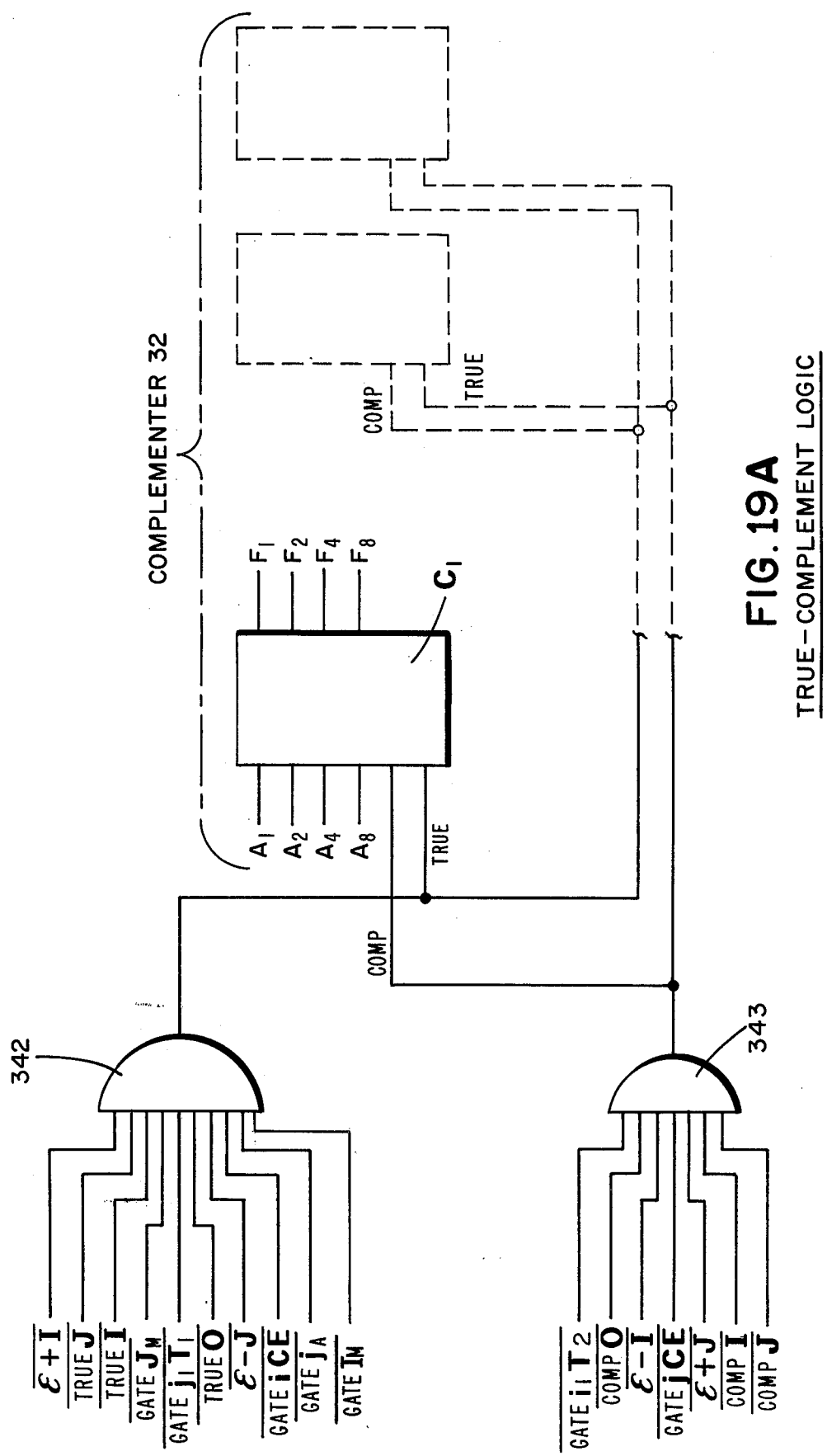
FIGS. 19A-19B show the true-comp logic.
Figure 19B:
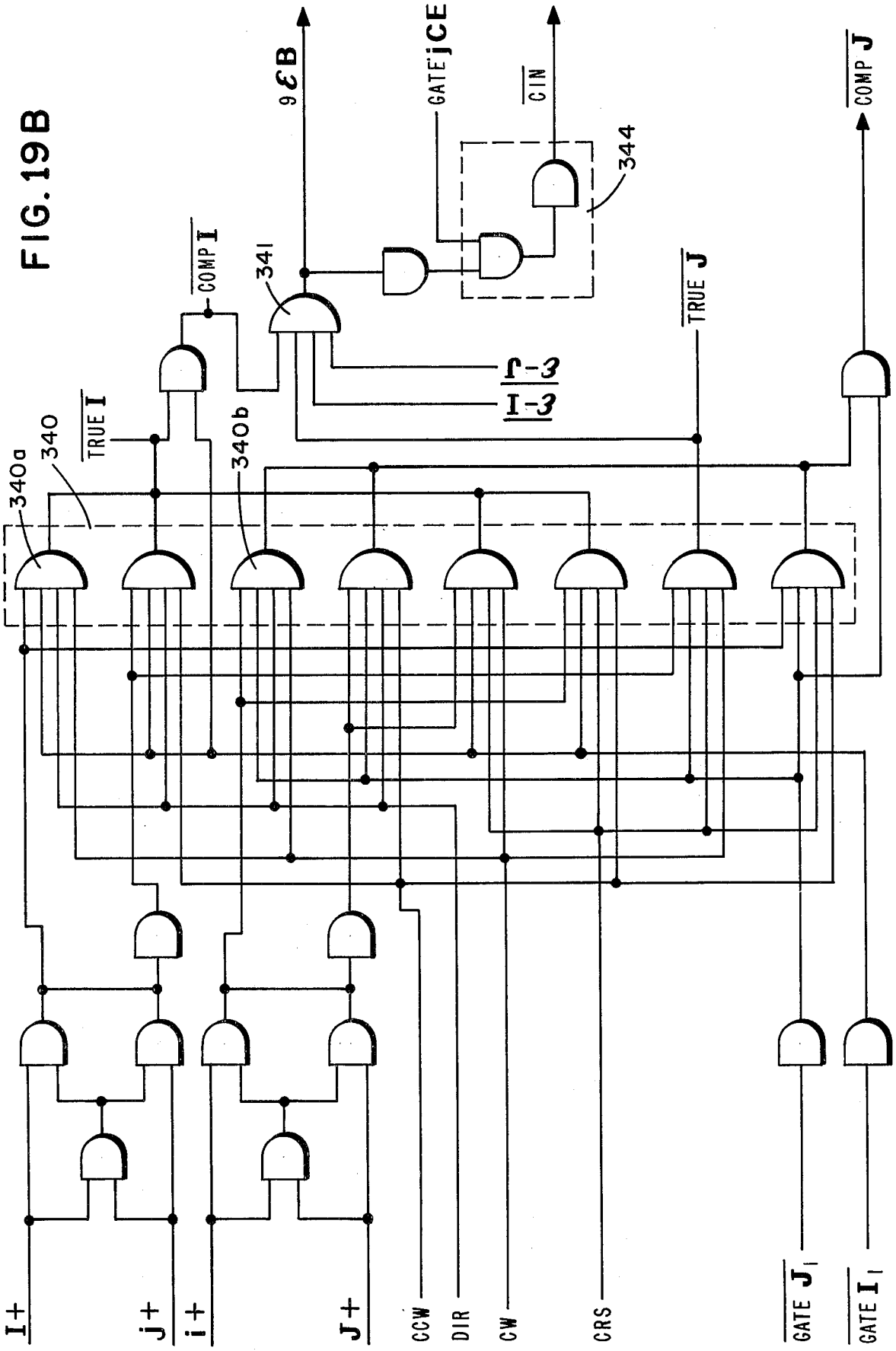

The outputs of flip-flops 253, 254, 255b, 256a and 256b are supplied to the indicated inputs of true/comp logic 34 (FIGS. 19A–19B).

During the running of the CRC problem the sign i flip-flop 253 will toggle ($\overline{togi}$ lo) as the offset vector crosses the Y axis. Similarly, the sign j flip-flop 254 will toggle ($\overline{togj}$ lo) as the offset vector crosses the X axis. As the offset vector crosses a cardinal axis, the sense of the sub problem, direct (DIRos) or cross (CRSos), also changes.

The initial state of the DIRos-CRSos flip-flop 575 (FIG. 15C) is set by the programmed G codes. The flip-flop 575 is set to DIRos by a decoded G47 ($\overline{G47}$ lo) or G48 ($\overline{G48}$ lo). The flip-flop is set to CRSos by a decoded G45 ($\overline{G45}$ lo) or G46 ($\overline{G46}$ lo). During a vector rotation (see Rotate Logic discussion below) the flip-flop 575 can also be toggled by the rotate logic via the signal TOG ($\overline{TOG}$ lo). Whenever the DIRos-CRSos flip-flop 575 is toggled, the just toggled flip-flop 576 is set ($\overline{Just\ Toggled}$ lo). This flip-flop is reset with the first sub-contour output pulse $\overline{TMos}$ or by a system start up reset pulse ($\overline{S/u}$ lo).

The steering logic (FIG. 18C) consists of a set of gates 261 which control steering in the X direction and a set of gates 262 which control steering in the Y direction. These gates are connected to outputs from the offset load logic 24 (NORM, O/S IN, O/S OUT), the CRC control logic 64 (MAIN, SUB), the signs logic i+, i−, j+, j−) and the rotate logic (SW*, CCW*). The steering logic will generate an output to command steeping in the +X direction (+X STEER hi) for any of the sets of conditions CW*, j+, NORM and SUB: or CCW*, j−, NORM, and SUB; or MAIN, NORM, and +X STEER IN (generated by the X axis counter by a TM pulse); or i+ and O/S IN; or i− and O/S OUT. The corresponding indicated combination of inputs to gate circuit 252 will generate a steering command in the +Y direction (+Y STEER hi). Again, the +Y STEER IN input to gate circuit 262 is generated at the output of the Y axis counter by a main contour TM pulse.

TRUE/COMP LOGIC 34 (Figs 19A-19B)

The true/comp logic consists essentially of a number of gates which determine whether the contents of the I, J, $i$ or $j$ registers gated through complementer 32 to adder inputs 36B should be complemented or not. The true-comp logic will generate a "TRUE I" ($\overline{\text{TRUE I}}$ lo), a "TRUE J" ($\overline{\text{TRUE J}}$ lo), a "COMP I" ($\overline{\text{COMP I}}$ lo), or a "COMP J" ($\overline{\text{COMP J}}$ lo) signal, depending upon the logic level of the various input signals to gates 340. For example, the first partial computation of the initial cross-error computation (I$j$) includes the steps of gating the contents of I register 20 through the complementer 32 to adder inputs 36B. The value of I will either be complemented or not as it passes through the complementer. If I and $j$ are both positive (I+, $j$+), and a direct problem (DIR) is indicated (movememnt of the main vector from the Y axis toward the X axis), with the movement in a clockwise direction (CW), gate 340$a$ will be enabled and will generate a "TRUE I" signal which will be applied to one input of gate circuit 342. All of the inputs to gate circuit 342 consist of the complement of the indicated signal. The output of gate 342 will be TRUE lo until at least one input goes lo, at which time TRUE will go hi to gate information through the complementer 32 unchanged. Thus, for example, when TRUE I is hi ($\overline{\text{TRUE I}}$ is lo), the output of gate 342 will be "TRUE" ($\overline{\text{TRUE}}$ is lo).

The construction and operation of gate circuit 343, which generates the COMP and $\overline{\text{COMP}}$ signals, is analogous to gate circuit 342.

The output of gate circuit 342 is applied to the "TRUE" input of the 5-digit complementer 32 which may consist of 5 modular units such as the Motorola MC14561, each having 4 input bits $A_1$, $A_2$, $A_4$, $A_8$ and 4 output bits $F_1$, $F_2$, $F_4$, $F_8$. The output of gate circuit 343 is applied to the "COMP" input of the complementer 32.

Figure 24A:
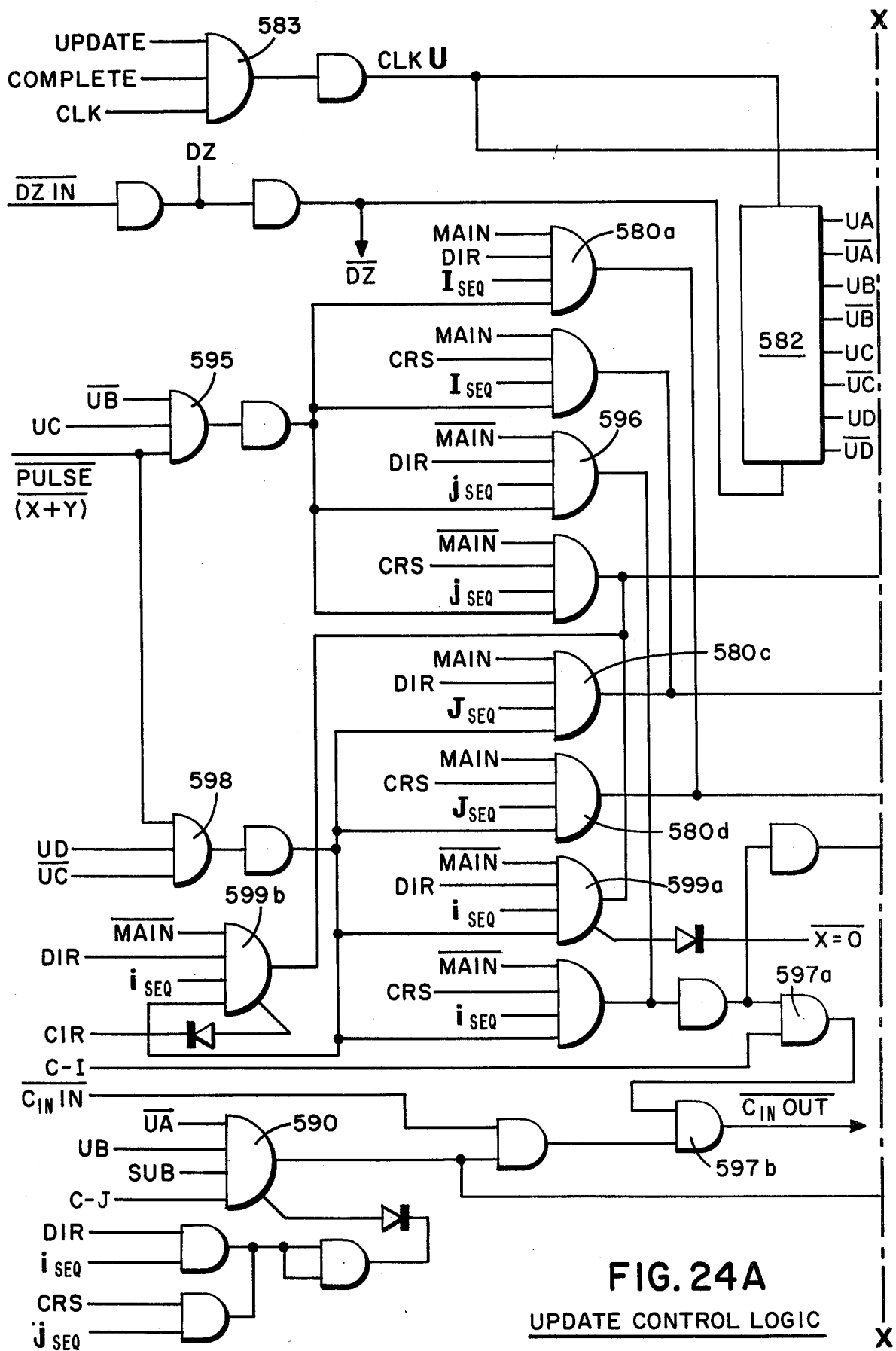
FIGS. 24A-24B show the update control logic.
Figure 24B:
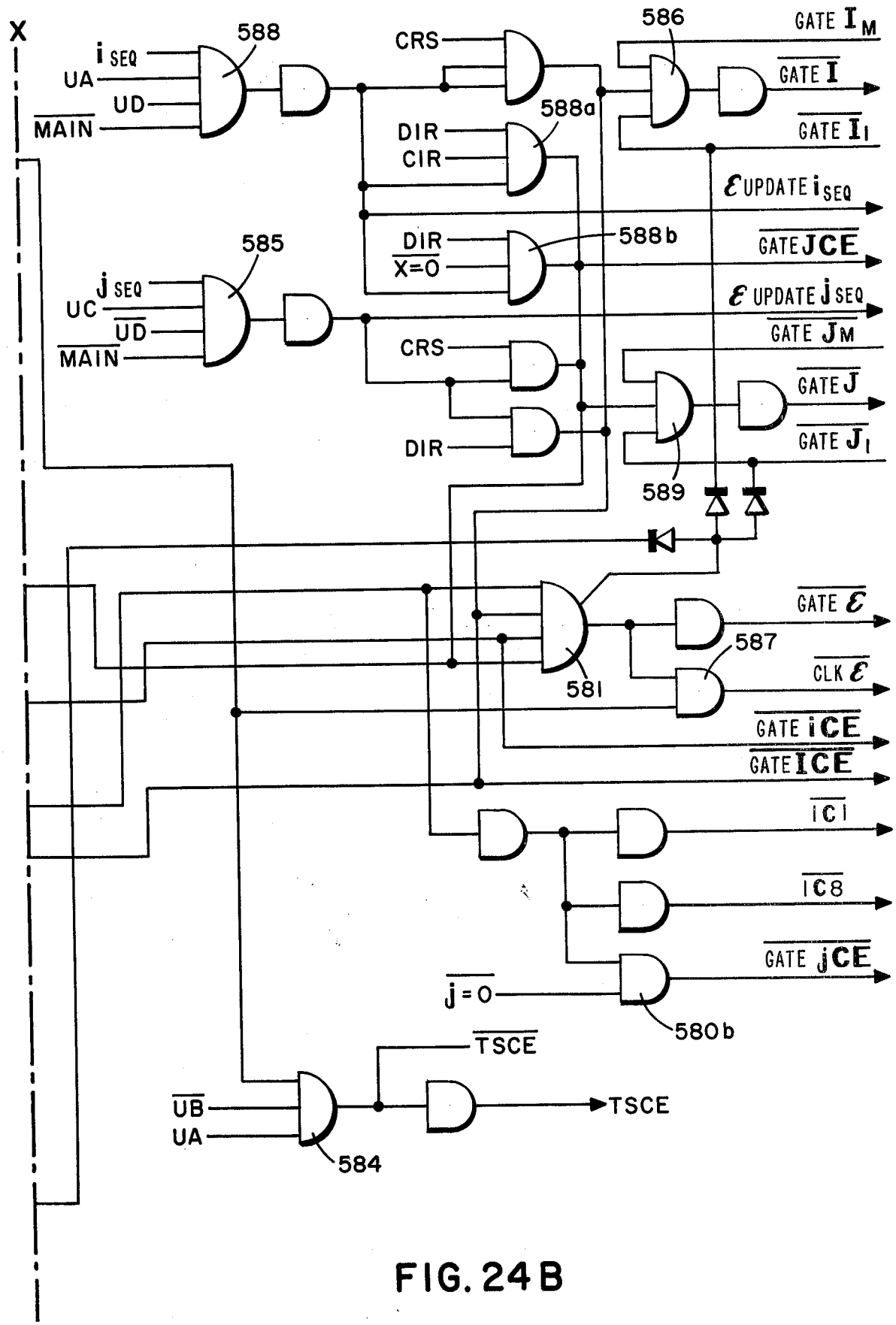
Figure 30C:
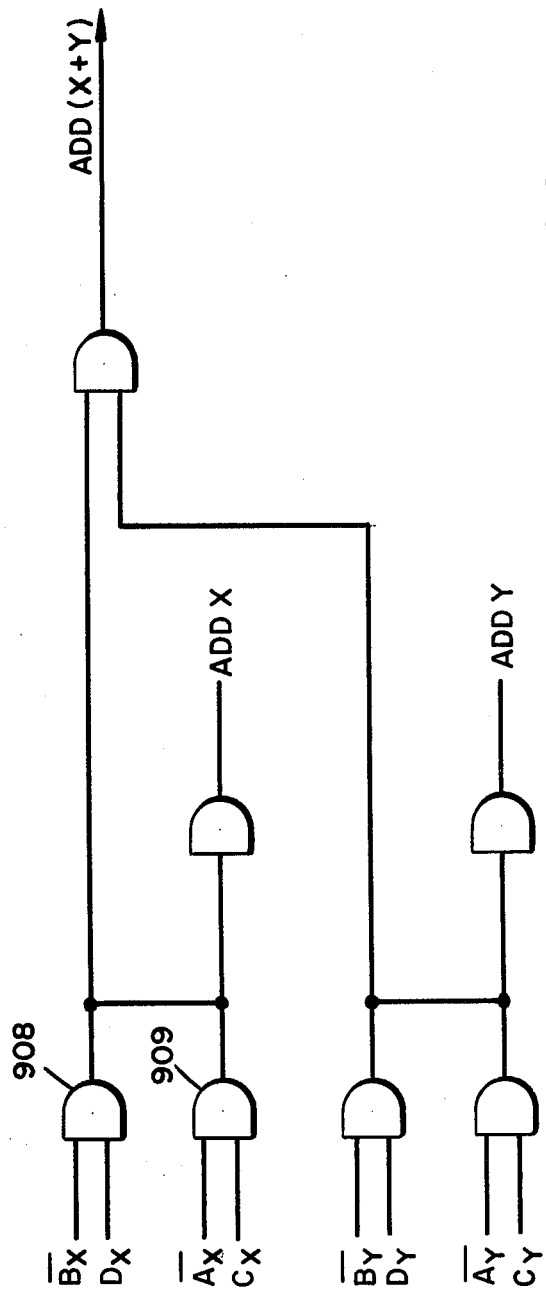

At this point it is appropriate to describe the purpose of signals 1C1 and 1C8 (FIG. 24) which are generated when either of gates 580$a$ or 580$d$ is enabled ($\overline{\text{1C1}}$ lo and $\overline{\text{1C8}}$ lo). Complementer 32 has 5 digit locations $C_1$, $C_2$, $C_3$, $C_4$, $C_5$ (FIG. 30) whereas $j$ register 46, for example, is a 4-digit counter register. The j register stages may be referred to as stages 2$j$, 3$j$, 4$j$ and 5$j$. These stages are gated to corresponding complementer stages C2, C3, C4, and C5, respectively. As has also been noted, the complementer 32 performs a nines complement transformation on all complementer stages irrespective of the source of the BCD numbers to be complemented. Since no $j$ register output is connected to complementer stage C1, it is necessary to provide this stage with a predetermined input, the complement of which will be zero. This is done here by applying logic "1" to complementer inputs $C_1$-1 ($\overline{\text{1C1}}$ lo) and $C_1$-8 ($\overline{\text{1C8}}$ lo) (i.e., inputs $A_1$, and $A_8$ of complementer stage $C_1$) which, when complemented, results in a binary zero in the BCD code. Obviously, any binary code could be used and the inputs to complementer stage C1 modified appropriately.

Another point should be noted with regard to the operation of complementer 32. A subtraction operation is performed by adding the tens complement of the contents of any of the I, J, $i$ and $j$ registers to the contents of the appropriate error register. When subtracting the vector values from the contents of either the 6-digit main contour error register or the 10-digit cross-error register, it is necessary to generate leading nines at the B inputs of the adder stages not supplied with complementer outputs. Leading nines are gated to the adder by the following signals: 9 & B (generate leading nines to the B inputs of adder stages $\rho_3$ - $\rho_8$ for a cross-error addition); 9eB (generate leading nines to the B input of adder stage $\Sigma_1$) for a sub-contour error register addition; 9EA (generate a leading nine at the A input of adder stage $\Sigma_7$); and 9eA (generate a leading nine at the A input of adder stage $\Sigma_1$; a leading ten at the input of adder stage $\Sigma_6$ is generated by signal 10eB to generate a carry into $\Sigma_5$.

INITIALIZE CONTROL LOGIC 60 (FIGS. 20-21)

The initialize control logic 60 performs the initial cross-error computation to determine which of the main or sub-contour control operations is to be performed first. A main contour operation is performed if the cross-error is less than or equal to zero and a sub-contour operation is performed if the cross-error is greater than zero. Main and sub-contour operations are never performed simultaneously. The initial cross-error must therefore be determined to ascertain which contour operation, main or sub, is to be performed first. After the initial cross-error computation, the update logic 58 and CRC control logic 64 control the performance of main and sub-contour operations for the remainder of the problem.

The initial computation logic utilizes temporary register 62 which consists of a 4-digit (4-bit per digit) counter/register, the most and least significant digit sections of which are shown in FIG. 22. The outputs from $i$ register 44 and $j$ register 46 are alternatively gated in parallel through the complementer 32 to the corresponding digit stages of temporary register 62.

The initial computation logic includes a 4-stage twisted ring counter 601 similar to ring counter 561 of the sub-contour control logic (FIG. 15A). The ring counter 601 is reset to its initial state (0000) by decade zero signal DZ. Also, prior to the start of an initial computation cycle, the temporary register 62 is cleared to zero by a signal "CLRT" generated by CRC logic circuit 64.

The initial cross-error, $E = I_oj - iJ_o$, is derived essentially as the result of a series of algebraic additions, wherein the value $I_o$ is added to the initial cross-error ($E_o = 0$) $j$ times, and thereafter the tens complement of $J_o$ is added to the contents of cross-error register 50 $i$ times (this latter set of additions being the equivalent of subtracting the actual value of J from $E$ $i$ times).

The ring counter 601 is stepped through its several stages sequentially by input signals generated through two sets of gates 602 and 603. Gate 603 is a 3-input gate having as one input the output of gate 602; a second input consists of a signal $\overline{\text{Gate I}}$, and a third input of a signal $\overline{\text{Gate J}}$. These latter inputs prevent clock signals from reaching the input of counter 601 during the Ij and iJ computational cycles to thereby prevent the ring counter from stepping to its next state until each of these computational cycles has been completed.

Gate 602 has as one input the "EOB" (End-of-Block) signal; this input remains hi ($\overline{\text{EOBN}}$lo) during the entire initial computation cycle. A further input signal "$\overline{\text{COMPLETE}}$" is derived from the gating circuit of the initial computation logic and remains hi until triggered lo by the last state of the ring counter 601. Input "$\overline{\text{FINISH}}$" is derived from the CRC control logic 64. Essentially, as long as $\overline{\text{FINISH}}$ is hi, the problem will not end even though the X and Y counters have been counted down to zero; the problem will end only when $\overline{\text{FINISH}}$ goes lo. The last input of gate 602 is a clock (CLK) input which will feed clock signals CLKI through the gate 602 as long as all of the other inputs are hi. The trailing edge of each clock pulse CLKI fed through gates 602 and 603 will cause counter 601 to sequence to its next state.

Figure 21:
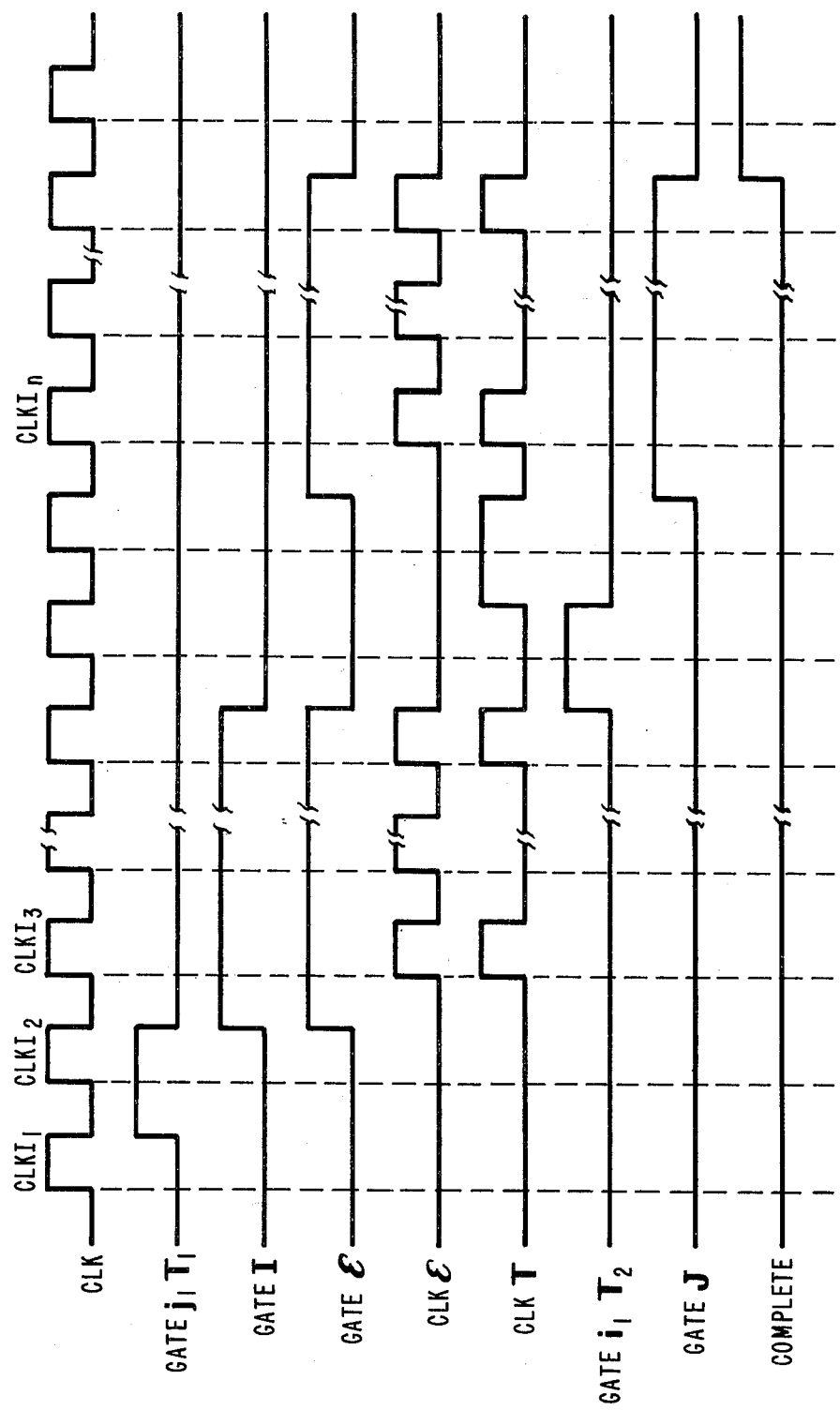
FIG. 21 is an initial computation timing diagram.

Initially, the EOB (EOB lo), $\overline{\text{COMPLETE}}$ and $\overline{\text{FINISH}}$ inputs to gate 602 are hi; similarly, inputs $\overline{\text{Gate I}}$ and $\overline{\text{Gate J}}$ to gate 603 are hi. The first clock pulse CLKI$_1$ (FIG. 21) will cause the ring counter 601 to sequence to its first state (1000). In this state, gate 604 is enabled if the contents of the Y-axis counter 14 are not zero ($\overline{Y = 0}$) to generate a signal GATE j$_1$T$_1$ ($\overline{\text{GATE j}_1\text{T}_1}$ lo), which is applied simultaneously to the true/-comp logic 34 and to the j register gate 464 (FIG. 14).

Since j is stored in tens complement form, signal "GATE j$_1$T$_1$" will gate the contents of the j register through the complementer unchanged. The next clock pulse CLKI$_2$ will generate a signal "GATE T" ($\overline{\text{GATE T}}$ lo) which is applied to the input of gate 621 to gate the j register contents into the corresponding portions of the temporary register. The trailing edge of pulse CLKI$_2$ will cause ring counter 601 to sequence to its next state (1100). Since the temporary register is no longer zero ($\overline{T = 0}$ hi), a gate 605 will be enabled to generate a "GATE I$_1$" signal ($\overline{\text{GATE I}_1}$ lo). This signal will cause the contents of the I register 20 to be gated through complementer 32. If I is positive (I+), if j is positive (j+), and rotation is away from the Y axis toward the X axis (DIR) in a clockwise direction (CW), the output of gate 340a (FIG. 19B) goes lo ($\overline{\text{TRUE I}}$ goes lo) and the output of gate 342 (FIG. 19A) goes hi (TRUE hi); the I register contents are therefore gated through the complementer unchanged. Simultaneously, the $\overline{\text{GATE I}}$ input to Gate 603 will go lo, thereby inhibiting further clock pulses from passing through gate 603 and preventing ring counter 601 from sequencing to its next state. The GATE I signal also causes one input of a gate 581 to go lo (see UPDATE CONTROL LOGIC FIG. 24B) to generate a GATE E signal ($\overline{\text{GATE E}}$ lo) to gate the contents of the cross-error register 50 to adder inputs 36A. Adder 36 thus performs the computation $E + I$.

The next clock signal CLKI$_3$ enables gate 606 to generate a CLKE signal $\overline{\text{CLKE}}$ lo) to clock the contents of the adder into the cross-error register 50.

The output of gate 606 is also connected to one input of a gate 607 through a Divide-By-Two circuit 608 to generate a CLKT pulse for every two CLKE outputs from gate 606. The CLKT signal is applied to the indicated input to the temporary register (FIG. 22); each CLKT pulse will increment the temporary register 62 toward zero by one. The Divide-By-Two circuit 608 is used for the following reason. By employing the Divide-By-Two circuit, the temporary register is incremented once for every two computations $E + I$ to account for the fact that the value of the offset is entered into thumbwheels 11 as a diameter whereas the values of I and J represent the radius of the main contour vector.

As long as the contents of the temporary register are not zero ($\overline{T = 0}$ hi), the initial computation logic will perform the operation $E + I$ for each clock pulse CLKI. Since the temporary register is decremented once for every two $E + I$ computations, the initial computation logic will have performed the operation $E = 2Ij$ when the temporary register has finally been clocked to zero ($\overline{T = 0}$ lo). When the temporary register is emptied, gates 605 and 606 will be disabled to prevent further $E + I$ computations. Also, gate 603 is enabled to pass clock pulses (CLKI) through to sequence ring counter 601 to its next state (1110).

In state (1110), the contents of i register 44 will be gated through the complementer 32 to temporary register 62. The value of i is stored in register 44 in its TRUE form, whereas the contents of the temporary register must be in tens complement form. Therefore, to perform the computation iJ correctly, it is necessary to complement the value of i; this is accomplished by applying the signal GATE i$_1$T$_2$ ($\overline{\text{GATE i}_1\text{T}_2}$ lo) to the indicated input of true/comp gate circuit 343 to generate an output signal "COMP". Complementer 32 performs only a nines complement transformation, however, and a tens complement of i is necessary. The tens complement can be readily obtained by adding one to the nines complement, and this is accomplished in the next state of the ring counter (1111). In this state, a gate 609 is enabled to generate a CLKT pulse which increments the contents of the temporary register by one.

It is noted that in the previous Ij computation, the temporary register was also incremented by one for each pulse CLKT. While this causes the register 62 to be incremented, in effect, since the contents of the register are in tens complement form, the value of j or i stored in register 62 is decremented. In essence, therefore, the temporary register counts up to zero. This is due to the fact that only "up-counters" were used in constructing the preferred embodiment of this invention, although it is obvious that appropriate modifications could be made to permit the use of "down-counters" or "up/down counters".

The next state of ring counter 601 (0111) enables a gate 610 to generate a $\overline{\text{GATE J}_1}$ signal (GATE J$_1$ lo), thereby inhibiting further clock pulses from passing through gate 603 and preventing the further sequencing of ring counter 601. At the same time, the contents of J register 22 are gated through the complementer to adder inputs 36B. Assuming i is positive (i+), J is positive (J+), the direction of rotation is clockwise (CW) and movement is away from the Y axis toward the X axis (DIR), GATE J$_1$ will cause the output of gate 340b to go lo ($\overline{\text{TRUE J}}$ lo) and the output of gate 342 to go hi (TRUE hi). Thus, J is gated through the complementer without change. The signal $\overline{\text{TRUE J}}$ lo also causes a carry signal to be generated at the output of gate circuit 344 ($\overline{\text{CIN}}$ lo) to add a one to the contents of adder 36. This effectively transforms the nines complement of J to its tens complement form to perform the ($E - iJ$) computation.

The signal GATE J$_1$ will also cause the indicated input to gate 581 to go lo and generate a "GATE E" signal ($\overline{\text{GATEE}}$ lo) to gate the contents of the cross-error register to adder inputs 36A. The adder thus performs the computation $E - J$. Coincident with the next succeeding clock pulse CLKI$_n$, gate 611 will generate a pulse CLKE ($\overline{\text{CLKE}}$ lo) to clock the contents of the adder into the cross-error register. Gate 611 is also connected to gate 607 through the Divide-By-Two circuit 608 to generate a CLKT pulse for every two CLKE pulses. The initial computation logic will continue to perform the computation $E - J$ as long as the contents of the temporary register 62 are not equal to zero (i.e., 2i times).

At the beginning of the $E - J$ computational cycle, the cross-error register contained the value $E = 2Ij$.

Therefore, at the conclusion of the $E - J$ computational cycle, the cross-error register will contain the value $E = 2 (Ij - iJ)$.

When the value of $i$ stored in the temporary register has been counted down to zero (i.e., the contents of register 62 having been incremented up to zero), $\overline{T = 0}$ goes lo and gate 610 is disabled ($\overline{\text{Gate } J_1}$ goes hi) and clock pulses are allowed to pass through gate 603 to sequence ring counter 601. The next ring counter state (0011) is not used. The last ring counter state (0001) causes gate 612 to be enabled to generate a signal COMPLETE ($\overline{\text{COMPLETE}}$ lo). Further clock pulses are therefore prevented from passing through gate 602 and the initial computation cycle has therefore been completed. Further clocking of ring counter 601 is inhibited until a new problem is presented.

In some cases, it is known in advance that the initial cross-error calculation will result in an answer $E = 0$. For example, if the contour of a circle is programmed, the initial values of the main vector will be $I_o = 0$, $J_o = R$, and the initial values of the sub vector will be $i_o = o$, $j_o = r_t$. Cross multiplication will therefore result in $E = 0$. In this case, since the final value of $E$ will be known, the initial computation cycle can be by-passed by programming a GO7 ($\overline{\text{GO6}}$) mode. A GO6 code tells the system to compute the cross-error each time whereas the GO7 code, which is the anti-modal condition of GO6, tells the system to by-pass the initial computation cycle. When contouring a circle, this GO7 instruction can be programmed when the main and sub-vectors both start at a cardinal or ordinal axis (i.e., when I and $i$ are both 0, or when J and $j$ are both 0).

CROSS-ERROR REGISTER 50 (FIGS. 23A–23B)

The cross-error register consists of a 10-digit (4-bit per digit) register. The most significant digit portion CE1 and its associated gating circuitry are shown in detail in FIG. 23A; the remaining sections are substantially identical to the portions shown in detail and are therefore shown only in block form. Each cross-error register input is connected to a corresponding output of .adder 36. The contents of the cross-error register are cleared to zero by a signal CLR$E$ from CRC logic 64 applied in common to each flip-flop of the cross-error register. The contents of the adder 36 are clocked into the cross-error register by a signal CLK$E$ ($\overline{\text{CLK}E}$ "lo"). The Q output of each flip-flop of digit CE1 is coupled to a corresponding input of a gate circuit 501-1. In a similar fashion, the outputs of register stages CE2--CE10 are connected to corresponding inputs of gate circuits 501-2 through 501-10. A second input of each gate is connected in common to line $\overline{\text{GATE}E}$. The contents of the cross-error register are thus gated to adder input 36A upon application of a GATE$E$ signal ($\overline{\text{GATE}E}$ lo) to the common input of Gates 501-1 through 501-10.

To determine whether a main or sub contour computation is to be performed, the CRC control logic 64 must know whether the cross-error $E$ is positive ($E$ greater than or equal to 0) or negative ($E$ less than 0). The sign of the cross-error is determined by a gate circuit 54, composed of two gates 541 and 542, the inputs of which are taken from the Q outputs of the most significant cross-error digit. The value of the cross-error is always stored in register 50 in tens complement form. In this notation, the value of the cross-error will be positive if the first digit is 0–4 and negative if it is 5–9. Thus by decoding only the first digit of the cross-error register, the sign of the cross-error can be readily determined. In this invention, the convention followed is that a positive error indicates that the sub vector is lagging the main vector. If the output of gate circuit 54 indicates the cross-error is less than or equal to zero, the CRC control logic 64 will enable the main contour logic whereas if the cross-error is indicated as being greater than zero, the CRC control logic will enable the sub contour logic. An indication that the contents of the cross-error register are zero ($E = 0$) is obtained by gating all the Q outputs of stages CEI-CEIO together; when all Q outputs are hi $E = 0$ is hi.

UPDATE CONTROL LOGIC (FIGS. 24–26)

The update control logic is responsible for updating the value of the cross-error after the initial cross-error computation has been performed under the control of initial computation control logic 60. The update control logic also controls the operation of the CRC control logic 64 which in turn is responsible for the overall performance of the CRC system. The update control logic 58 includes a 4-state twisted ring counter 582 which is substantially identical to the 4-state twisted ring counter 561 of the sub-contour logic 56 and the ring 601 of the initial computation logic 60. Ring counter 582 is clocked through its states sequentially by clock pulses CLKU derived from the output of gate 583.

Figure 20:
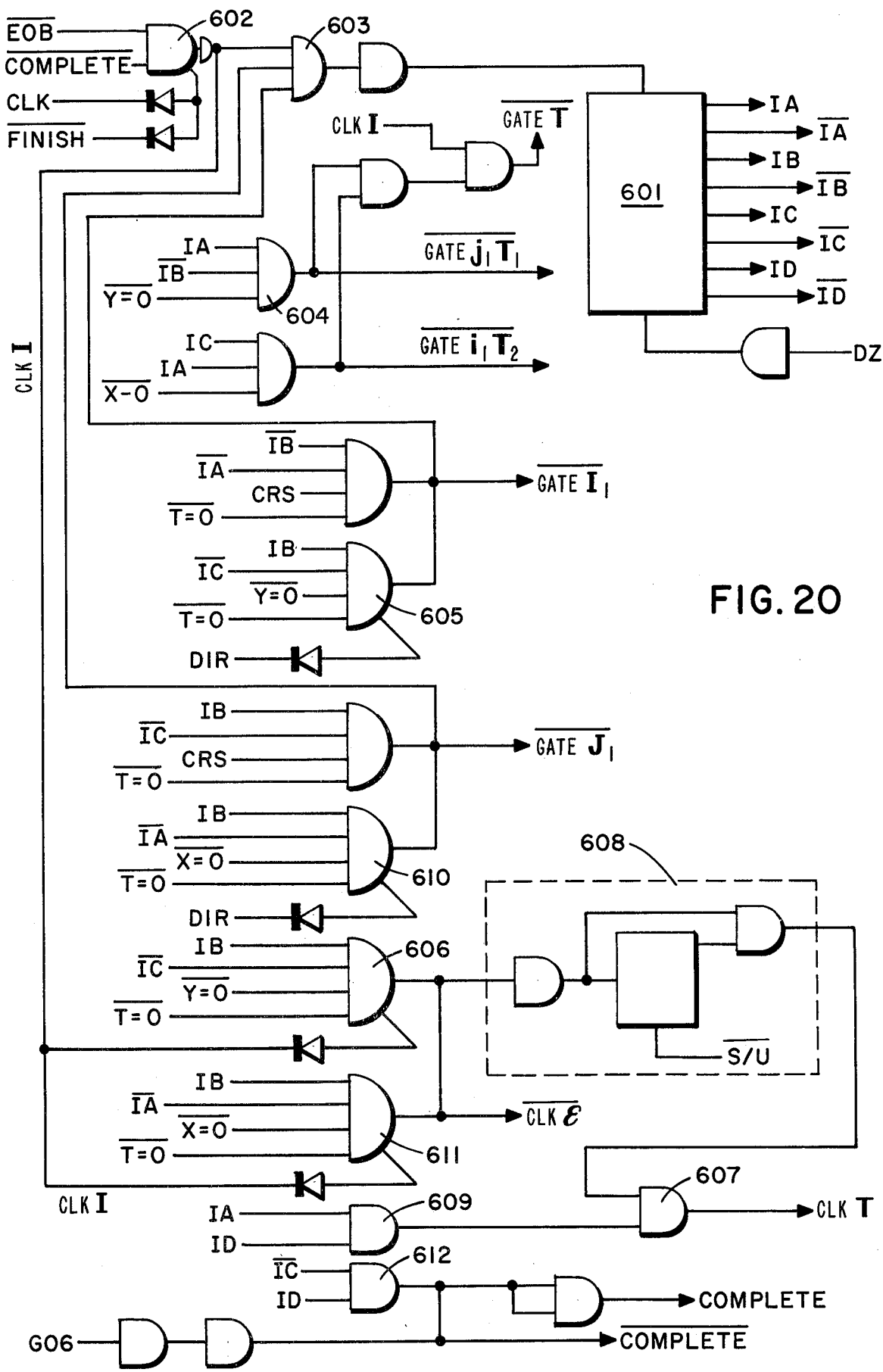
FIG. 20 shows the initialize control logic.
Figure 27B:
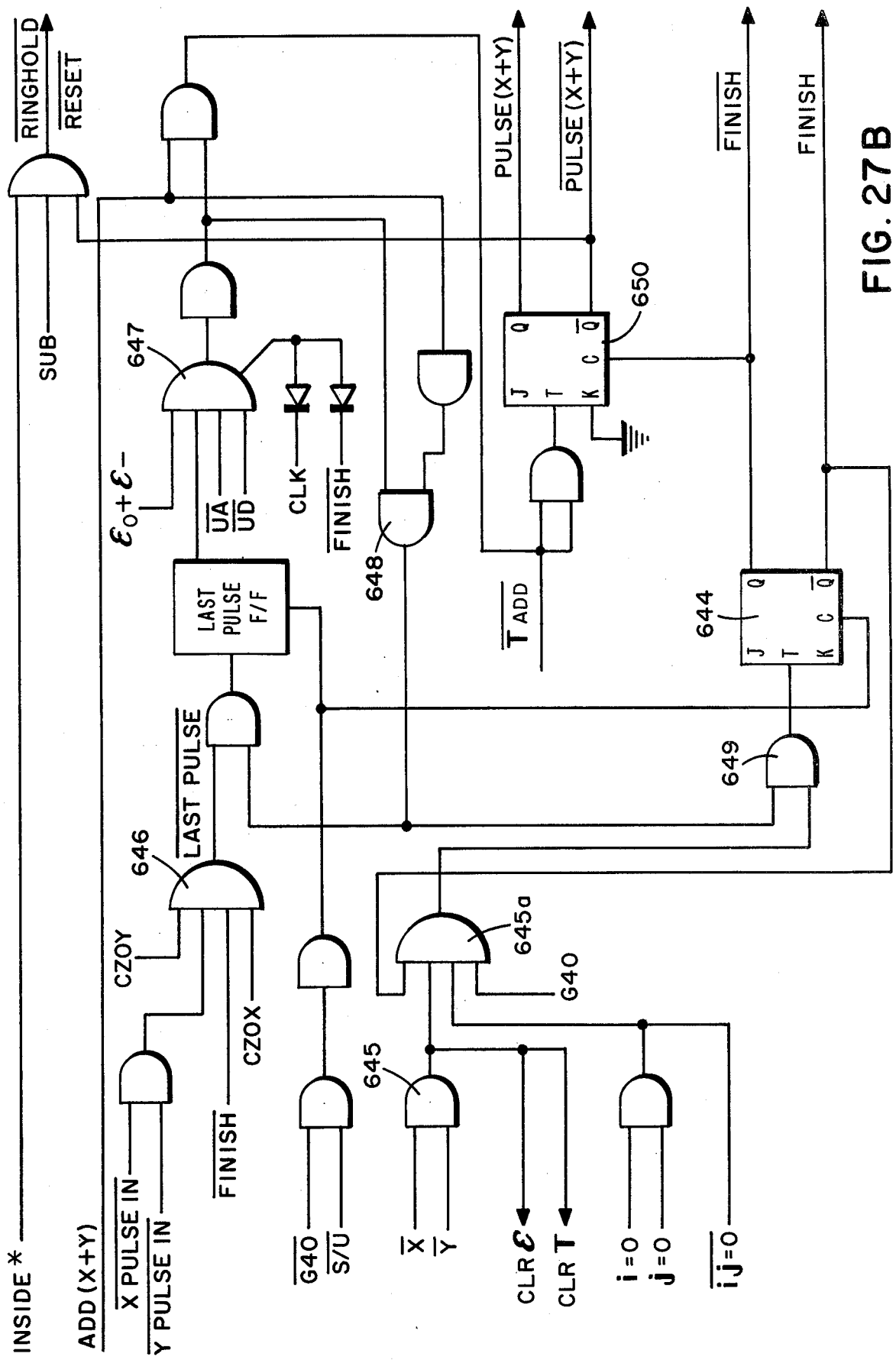

Gate 583 has three inputs: the UPDATE input is taken from the output of an update flip-flop 641 (FIG. 27A) which is reset to UPDATE hi ($\overline{\text{UPDATE}}$ lo) by a decade zero ($\overline{\text{DZ}}$ lo) signal; input signal COMPLETE is taken from the initialize control logic (FIG. 20) wherein a COMPLETE signal is generated during the last state (0001) of ring counter 601 to indicate the completion of an initial cross-error computation cycle; the third input CLK is a clock signal generated by clock circuit 68.

Ring counter 582 is initially set to the 0000 state by a DZ IN signal ($\overline{\text{DZ IN}}$ lo). During the initial computation period, COMPLETE will be "lo" and clock pulses CLK will therefore be prevented from passing through gate 583 to sequence ring counter 582. At the conclusion of the initial computation cycle, gate 612 will cause COMPLETE to go "hi" ($\overline{\text{COMPLETE}}$ goes "lo") and clock pulses begin to stream through gate 583. The trailing edge of the first clock pulse CLKU (FIG. 25A) will sequence ring counter 582 to state (1000). This state in conjunction with the next clock pulse $\text{CLKU}_2$ will cause the output of gate 584 to go "lo" ($\overline{\text{TSCE}}$ goes "lo") to thereby generate a pulse TSCE. Output $\overline{\text{TSCE}}$ of gate 584 is connected to one input of gate 642 of the CRC control logic 64 (FIG. 27A); when $\overline{\text{TSCE}}$ goes "lo", the output of gate 642 will go "hi" and set flip-flop 641 ($\overline{\text{UPDATE}}$ goes "hi" and UPDATE goes "lo"). Upon the setting of flip-flop 641, UPDATE goes "lo" and gate 583 is disabled to prevent further clock pulses from sequencing ring counter 582 to its next state. At the same time, pulse TSCE "hi" is applied to a MAIN/-SUB flip-flop 643 of the CRC control logic to set either the MAIN or the SUB output "hi" as a function of the input taken from the output of sign decoder 54.

The update logic will remain inhibited until update flip-flop 641 is reset. This will occur upon conclusion of the enabled main or sub contour control sequence. At the conclusion of the main or sub contour operation, a pulse TM or a pulse TMOS will be generated. The generation of either a TM pulse ($\overline{\text{TM}}$ "lo") or a TMOS pulse ($\overline{\text{TMOS}}$ "lo") will cause update flip-flop 641 to reset (UPDATE "hi", $\overline{\text{UPDATE}}$ "lo") to permit clock pulses to again pass through gate 583 to sequence counter 582. It will be recalled that the $\overline{\text{UPDATE}}$ output of flip-flop 641 is applied as one input to gate 562 (FIG. 15A) of the sub contour control ring counter. Thus when flip-flop 641 is reset ($\overline{\text{UPDATE}}$ "lo") to continue the update operation, gate 562 is disabled to prevent further sequencing of the sub contour ring counter.

As noted, the update flip-flop 641 will be reset (UPDATE "hi") at the end of a main or sub contour operation by a TM or TMOS pulse. The trailing edge of the next clock pulse CLKU$_3$ will cause ring counter 582 to sequence to its next state (1110). It is noted that ring counter 582 had sequenced to state (1100) by the trailing edge of clock pulse CLKU$_2$ coincident with the setting of flip-flop 641 ($\overline{\text{UPDATE}}$ "lo"). No action is taken by the UPDATE logic, however, during this ring counter state (1100).

From the discussions of the main and sub contour control operations, the following points will be recalled. X axis and Y axis motion signals are generated at the conclusion of an I Sequence and a J Sequence, respectively, in the main contour control system and at the conclusion of an $i$ Sequence and a $j$ Sequence, respectively, during a sub contour control operation. It will also be recalled that each sequence will cause the respective vector component to be incremented or decremented as appropriate by 1. Thus, during an I Sequence, the value I will increase to I + 1 and a J Sequence will cause J to decrease by J − 1; similarly, an $i$ Sequence will cause $i$ to increase to $i$ + 1 and a $j$ Sequence will cause $j$ to decrease by $j$ − 1. Substituting these incremental increases or decreases into the general cross-error equation E = $Ij$ − $iJ$, the relationships shown in Table D will be found to hold.

TABLE D
CROSS ERROR UPDATE OPERATIONS

|  |  |  |
|---|---|---|
| MAIN | I SEQ | I → I + 1 |
|  |  | E → E + j |
|  | J SEQ | J → J − 1 |
|  |  | E → E + i |
| SUB | i seq | i → i + 1 |
|  |  | E → E − J |
|  | j seq | j → j − 1 |
|  |  | E → E − I |

In ring counter state (1110), an update operation will be performed only if the just-performed contour sequence had been a sub-contour $j$ Sequence. Under these conditions, gate 585 will be enabled and will cause a signal GATE I ($\overline{\text{Gate I}}$ lo) to be generated at the output of gate 586 and a signal GATE $E$ ($\overline{\text{GATE }E}$ lo) to be generated at the output of gate 581. An additional condition is that the problem be direct (DIR hi). It is further noted that the relationships in Table D will hold true for all quadrants and directions as long as the sub-vector and the main vector are in the same quadrant. If the signs of I and $i$ do not agree, the cross error will be updated after a sub $j$ sequence by $E$ + I; if the signs of J and $j$ do not agree, the cross error will be updated after a sub $i$ sequence by $E$ + J. A sign comparison of the vector components is accomplished by the circuit shown in FIG. 26 and is performed during the time a signal GATE ICE is generated ($\overline{\text{GATE ICE}}$ lo), which, for the sub contour $j$ Sequence conditions noted above, occurs coincidentally with signals GATE I and GATE $E$. Specifically, cross-error update sequences $I + j$ and $E - J$ will occur only when $i$ and I have the same sign; similarly, cross-error updates $E + i$ and $E - I$ will occur only when $j$ and J have the same signs. Continuing with the example of an update sequence being performed after a sub-contour $j$ sequence, the signs of $i$ and I are compared in the EXCLUSIVE-OR gate circuit 591. Assuming $i$ is positive ($i$ + hi) and the program calls for an outside cut (INSIDE lo), the output of EXCLUSIVE-OR gate 591A will be hi; assuming that I is positive (I − lo), the output of EXCLUSIVE-OR gate 591B will also be hi. Assuming that movement is away from the Y axis toward the X axis (DIR hi), gate circuit 592 will generate an output signal $E - I$ ($\overline{E - I}$ lo). This output is applied to the indicated input of true/-comp logic gate 343 (FIG. 19A) to instruct the complementer 32 to perform a nines complement transformation of the value of I which is then gated to adder inputs 36B. Since the tens complement is required to perform the $E - I$ computation, the nines complement of I must be incremented by 1. This is accomplished by applying the signal $E - I$ ($\overline{E - I}$ lo) to the indicated input of true/comp logic gate circuit 341 to generate a CIN signal ($\overline{\text{CIN}}$ lo) at the output of gate 344. Adder 36 thus performs the computation $E - I$; this is clocked back into the cross-error register coincident with the next clock pulse CLKU$_4$ which generates a CLK$E$ signal ($\overline{\text{CLK}E}$ lo) at the output of gate 587.

If the signs of $i$ and I had not agreed (for example, if $i$ were positive and I were negative), the output of gate circuit 591 would have been lo, resulting in output $E + I$ ($\overline{E + I}$ lo) being generated at the output of gate circuit 592. Applying $E + I$ to the indicated input of true/-comp logic gate circuit 342 would thus have generated an output TRUE to the complementer to gate the I register contents through complementer 32 unchanged (i.e., in true form), resulting in a cross-error update computation $E + I$ in adder 36.

The trailing edge of clock pulse CLKU$_4$ will sequence counter 582 to state (1111). In this state, if a sub-contour $i$ sequence had been performed, gate 588 will be enabled and, again assuming a direct problem, a signal GATE J ($\overline{\text{GATE J}}$ lo) will be generated at the output of gate 589, a signal GATE JCE ($\overline{\text{GATE JCE}}$ lo) will be generated and a signal GATE $E$ ($\overline{\text{Gate }E}$ lo) will be generated at the output of gate 581. These output signals will be generated when the program calls for a circular interpolation (CIR "hi" to gate 588A) or X is not equal to zero (X = 0 hi to gate 588B), that is, when the contents of the X axis counter 12 are not equal to zero. These outputs will not be generated only for the case where a linear interpolation in the Y direction (parallel to the Y axis) has been programmed.

The signal GATE J is applied to J register 22 to gate the contents thereof through the complementer 32 to adder inputs 36B. The signal GATE $E$ is applied to the cross-error register 50 to gate the contents thereof to adder inputs 36A. In a similar manner as occurred for the $j$ Sequence cross-error update, the signals of $j$ and J are compared in EXCLUSIVE-OR gate circuit 593. Assuming the signs of J and $j$ agree (output of gate circuit 593 hi) and a direct problem is called for (DIR hi), gate circuit 594 will generate output signal $E - J$ ($\overline{E - J}$ lo). This signal is applied to the indicated input of true/comp logic gate 342 to generate a TRUE signal to gate the contents of J register 22 through the complementer without change. Since the numerical value of J is in nines complement form, it is necessary to add 1 to J to obtain the tens complement to correctly perform the computation $E - J$. This is accomplished by applying signal $E - J$ ($\overline{E - J}$ lo) to the indicated input of gate circuit 341 to generate a CIN ($\overline{CIN}$ lo) signal at the output of gate circuit 344 which will increment the contents of the adder by one. Adder 36 will thus perform the computation $E - J$ and coincident with the next clock pulse $CLKU_5$, gate 587 will generate a pulse CLKE ($\overline{CLKE}$ lo) to clock the contents of the adder 36 into cross-error register 50.

The trailing edge of clock pulse $CLKU_5$ will sequence ring counter 582 to its next state (0111). At this point, it is necessary to account for the fact that the value of J is decremented only during even J Sequences. If the last J sequence performed had been odd (output C-J of flip-flop 434a hi), it is necessary to increment the contents of the cross-error register 50 by one. This is accomplished in ring counter state (0111) by enabling gate 590 which will cause gate 581 to generate a GATEE signal ($\overline{GATEE}$ lo) to gate the contents of cross-error register 50 to adder inputs 36A. At the same time, a signal CIN OUT will be generated ($\overline{CIN\ OUT}$ lo) to increment the contents of adder 36 by one. The adder contents ($E + 1$) will be gated back to the cross-error register 50 coincident with the next clock pulse $CLKU_6$, the trailing edge of which will sequence ring counter 582 to its next state (0011).

This counter state will enable gate 595 and, assuming that a sub j Sequence had been performed (gate 596 is enabled), the contents of cross-error register 50 and the contents of I register 20 are again gated to adder inputs 36A and 36B, respectively, to perform the computation $E - I$ or $E + I$ in the manner described above with respect to ring counter state (1110). The resulting computation is again clocked into the cross-error register coincident with clock pulse $CLKU_7$, the trailing edge of which sequences the ring counter 582 to its next state (0001). As noted above, when complementing the contents of I register 20, it is necessary to add one to obtain the tens complement. However, if the last main contour I sequence had been odd (C − I hi), it would also be necessary to subtract one from the tens complement of I (equivalent to incrementing the value of I by one). The net result of adding and subtracting one to the complement of I is no change at all. To accomplish this net result, gate 597 is enabled by applying the output C − I hi of flip-flop 430a (FIG. 10B) to one input of gate 597a. This resuls in a lo output applied to the indicated input of gate 597b which results in signal $\overline{CIN\ OUT}$ hi (no carry applied to the adder).

Figure 18B:
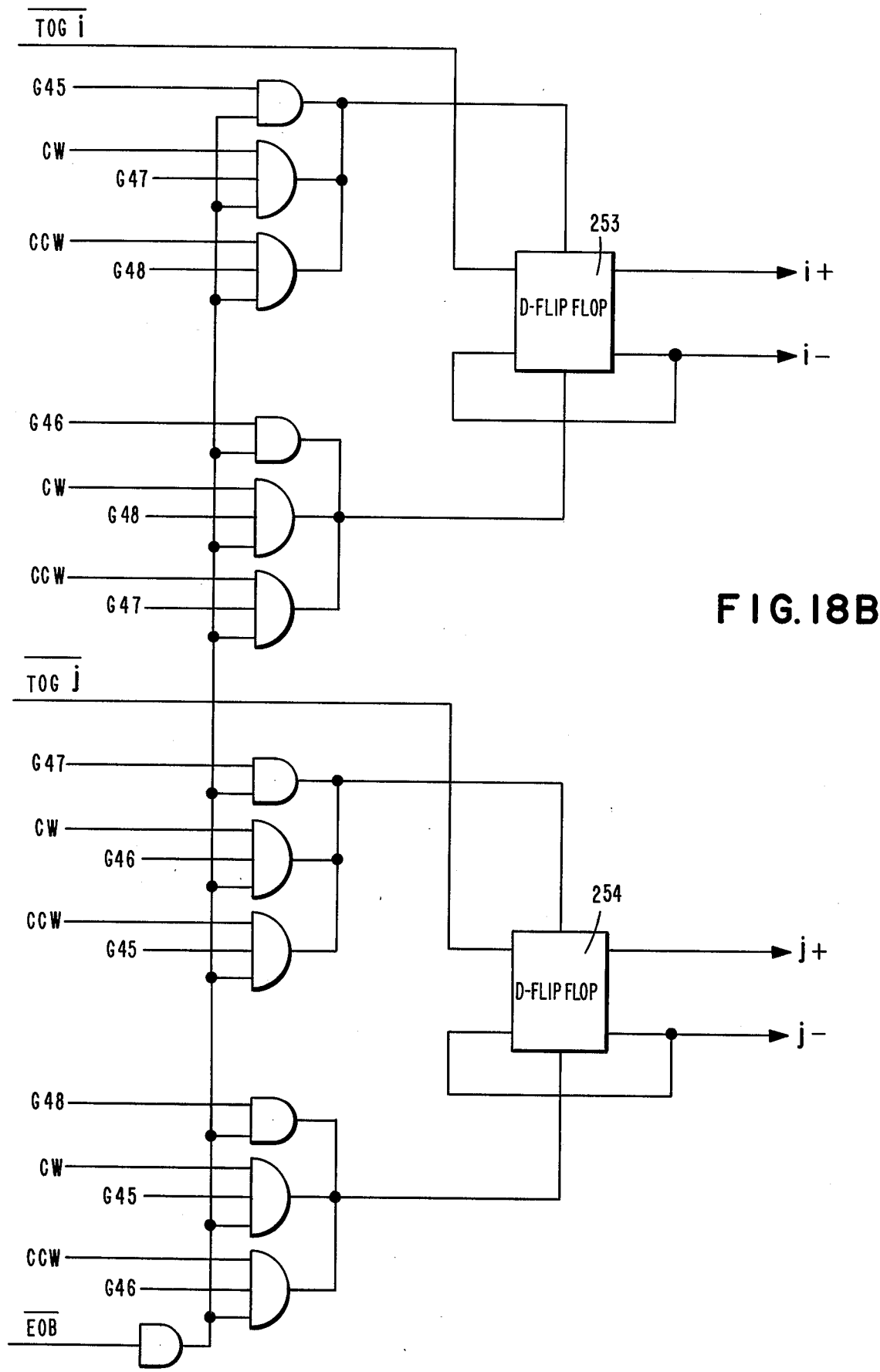
Figure 18C:
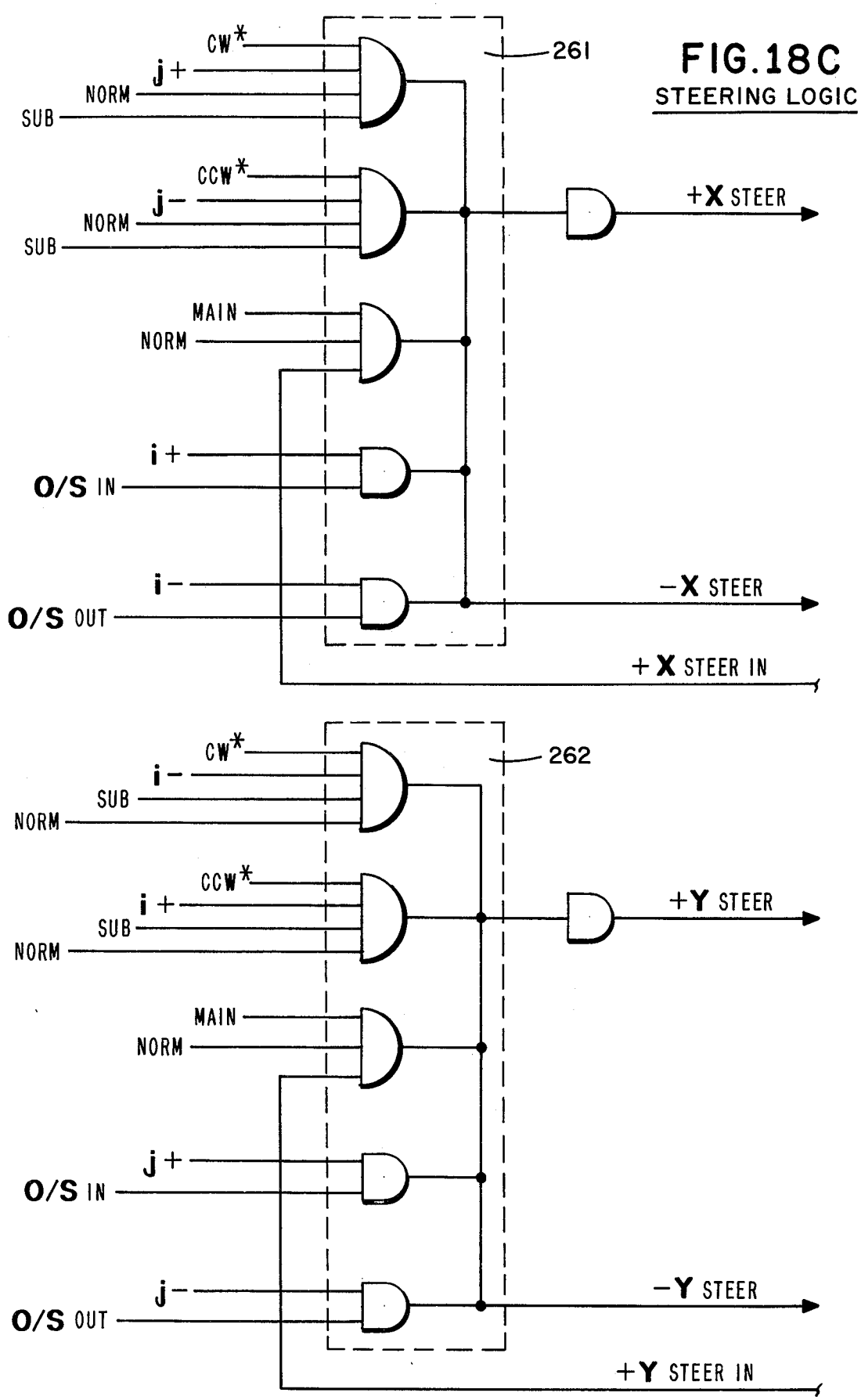

In ring counter state (0001), gate 598 is enabled and assuming an i sequence had been performed (gate 599a and/or gate 599b is enabled), a second $E - J$ or $E + J$ cross-error update computation is performed in a manner similar to that performed during ring counter state (1111). The result of this computation is clocked into cross-error register 50 coincident with clock pulse $CLKU_8$ which also sequences ring counter 582 to its reset state (0000). In this state, assuming that a sub-contour sequence had been performed, the output of gate 577 (FIG. 15C) is enabled to set its output lo. If, at the same time, the sub-contour error is zero ($e = o$) and the contents of i register 44 are zero ($i = o$), indicating that the sub-vector is along the X axis, a signal TO i ($\overline{TO\ i}$ lo) will be generated to change the state of flip-flop 253 (FIG. 18B). Alternatively, a signal TOGGLE j will be generated ($\overline{TOGGLE\ j}$ lo) if the sub-contour error is zero ($e = o$) and the contents of the j register 46 are zero ($j = o$), indicating that the sub-vector is along the Y axis. Either of the TO i or TO j signals will cause flip-flop 575 (FIG. 15C) to change state and flip-flop 576 will be reset ($\overline{JUST\ TO}$ hi, JUST TO lo).

In the above discussion, it was assumed that a sub-contour sequence (i Sequence or j Sequence) had just taken place. If, however, a main contour sequence (I Sequence or J Sequence) had just taken place, the update logic would perform no computational steps during ring counter sequence states (1110), (1111), and (0111). In state (0011), had a main contour I Sequence taken place, gate 580a is enabled, thereby generating a signal GATE jCE ($\overline{GATE\ jCE}$ lo) at the output of gate 580b and causing signal GATE E ($\overline{GATE\ E}$ lo) to be generated at the output of gate 581. The signal GATE jCE is applied to true/comp logic gate 343 to generate a COMP signal to cause the complementer 32 to complement the contents of j register 46 (normally stored in tens complement form) before gating j to adder inputs 36B. Since the complementer performs only a nines complement transformation (whereas the tens complement of j must be transformed), the signal GATE jCE is applied to gate circuit 344 to generate CIN which increments the adder contents by 1. This completes the tens complement transformation of j. The adder therefore performs the computation $E + j$ which is clocked into the cross-error register 50 coincident with the next succeeding clock pulse $CLKU_6$.

In the next succeeding ring counter state (0001), assuming that a main contour J Sequence had been performed, gate 580C is enabled to generate signal GATE iCE ($\overline{GATE\ iCE}$ lo) and at the same time causes gate 581 to generate a GATE E signal. The signal GATE iCE is applied to true/comp logic gate 342 to generate a TRUE signal causing complementer 32 to gate the contents of i register 44 through to adder inputs 36B without change. The adder then performs the computation $E + i$ and clocks the output into cross-error register 50 coincident with clock pulse $CLKU_7$.

Figure 25B:
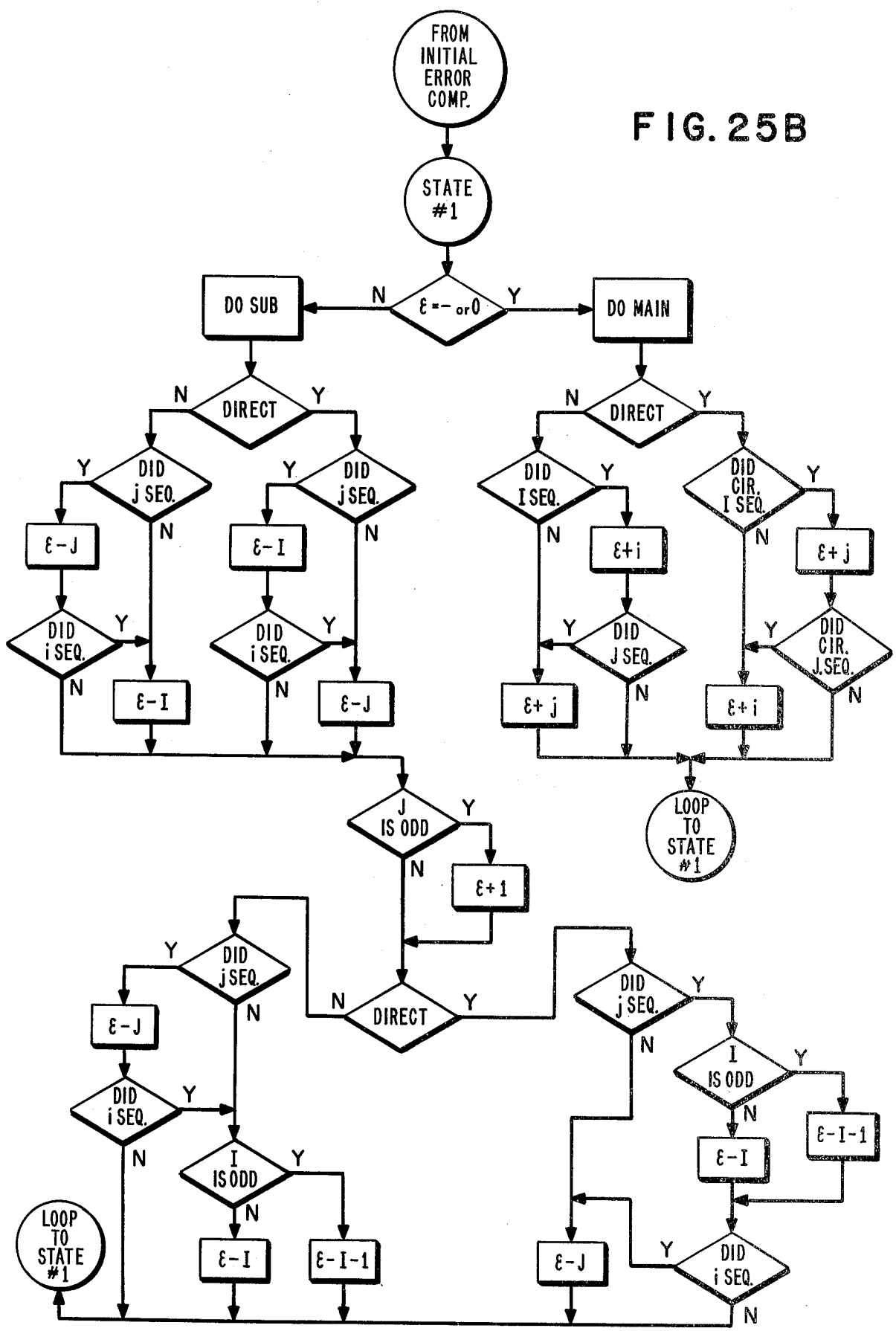
FIG. 25B is an update control flow chart.

FIG. 25B is a flow chart which shows the operations performed by the update control logic during an update cycle.

CRC CONTROL LOGIC (FIGS. 27A–27B)

The CRC control logic is responsible for the overall performance of the CRC system. Since all CRC problems are performed in the XY plane, the CRC problem commences with the decoding of an X or Y from the tape. Either character will generate the signals CLRT and CLRE (output of gate 645) which clears the i/j temporary register 62 and the cross-error register 50, respectively. Providing that the system is not in the non-compensation, or G40, mode ($\overline{G40}$ lo) and the values of i and j are not both zero, the decoded X or Y will cause the output of gate 645a to go lo and the output of gate 649 to go hi to set the FINISH flip-flop 644 lo ($\overline{FINISH}$ hi). This condition enables the entire CRC system and prevents the normal (non-CRC) operations from occurring until the completion of the CRC problem. (In a non-CRC mode or in a conventional control, the X and Y counters are loaded with data from tape and upon receipt of the EOB signal, the tape reader stops and the move is performed. Upon completion of the move, when the X and Y counters have both been counted down to zero, the inhibit on the tape reader is removed and new data is read in. As will be seen, the above is a necessary but not sufficient condition for concluding a CRC problem).

The first operation performed following receipt of the EOB signal is to enable the initial computation ring 601 (FIG. 20) provided that the signal $\overline{COMPLETE}$ is not lo by virtue of the G07 mode ($\overline{GO6}$ lo) being invoked. Being in the G08 mode ensures that the initial cross-error will be zero since the cross-error register was cleared upon receipt of the CLR$E$ signal and an initial computation is inhibited. If an initial computation is performed, the signal COMPLETE will go hi at the completion of the initial computation cycle. When COMPLETE goes hi, the update ring 582 (FIG. 24A) is enabled since the update flip-flop 641 had also been set ($\overline{UPDATE}$ hi) by pulse DZ. The update logic 58 first generates a TSCE pulse which resets the update flip-flop ($\overline{UPDATe}$ hi) and also clocks the MAIN-SUB flip-flop 643. The latter will be set to MAIN if the cross-error is zero or negative ($\overline{E_o + E}$ — hi). If the cross-error is positive ($E_o + E$ — hi), the flip-flop 643 will be set to SUB. If MAIN is chosen, the MAIN ENABLE signal will be hi, main contour ring counter 422 (FIG. 10A) will be enabled, and a main contouring sequence will commence. Upon completion of the main contouring sequence, a TM pulse is generated which sets the update flip-flop hi ($\overline{UPDATE}$ lo) and MAIN ENABLE lo; main contour ring 422 is thereby disabled until the next main contour sequence is indicated.

If the MAIN SUB flip-flop 643 had been set to SUB, the sub-contour ring 561 (FIG. 15A) will be enabled, and a sub-contour sequence will commence. Upon completion of the sub-contour sequence a TMOS pulse is generated which sets the update flip-flop hi $\overline{UPDATE}$ lo) which disables the sub-contouring ring until the next sub-contour sequence. Near the end of the problem, when the X and Y counters both attain a value of zero (CZOX and CZOY hi), the signal LAST PULSE is generated by gate 646 ($\overline{LAST PULSE}$ lo). This is the last pulse to be presented to the main X and Y axis counters. The CRC problem is now forced to continue until the cross-error becomes zero or negative, indicating that the sub-vector is leading the main vector. When the update ring 582 now sequences to the (0000) state, a gate 647 is enabled (output goes lo). If the problem being performed is an outside cut, ADD (X+Y) will be lo; the output of gate 648 will go lo, the output of gate 649 will go hi, and flip-flop 644 will be reset ($\overline{FINISH}$ lo). The CRC problem is then over.

For inside cuts, the signal ADD (X+Y) may not be lo, in which case the finish flip-flop 644 will not be reset immediately. Rather a pulse $\overline{T ADD}$ will be generated which will cause a PULSE (X+Y) flip-flop 650 to be set (PULSE X+Y hi) and the Main-Sub flip-flop 643 to be set to MAIN. When ADD (X+Y) ultimately goes lo, the finish flip-flop will be set (FINISH hi). The FINISH (hi) signal is fed to offset load logic gate circuit 251 (FIG. 17A) to generate a DZ ENABLE hi signal which causes a DZ hi ($\overline{DZ}$ lo) to reset all appropriate ring counters and registers.

Figure 29:
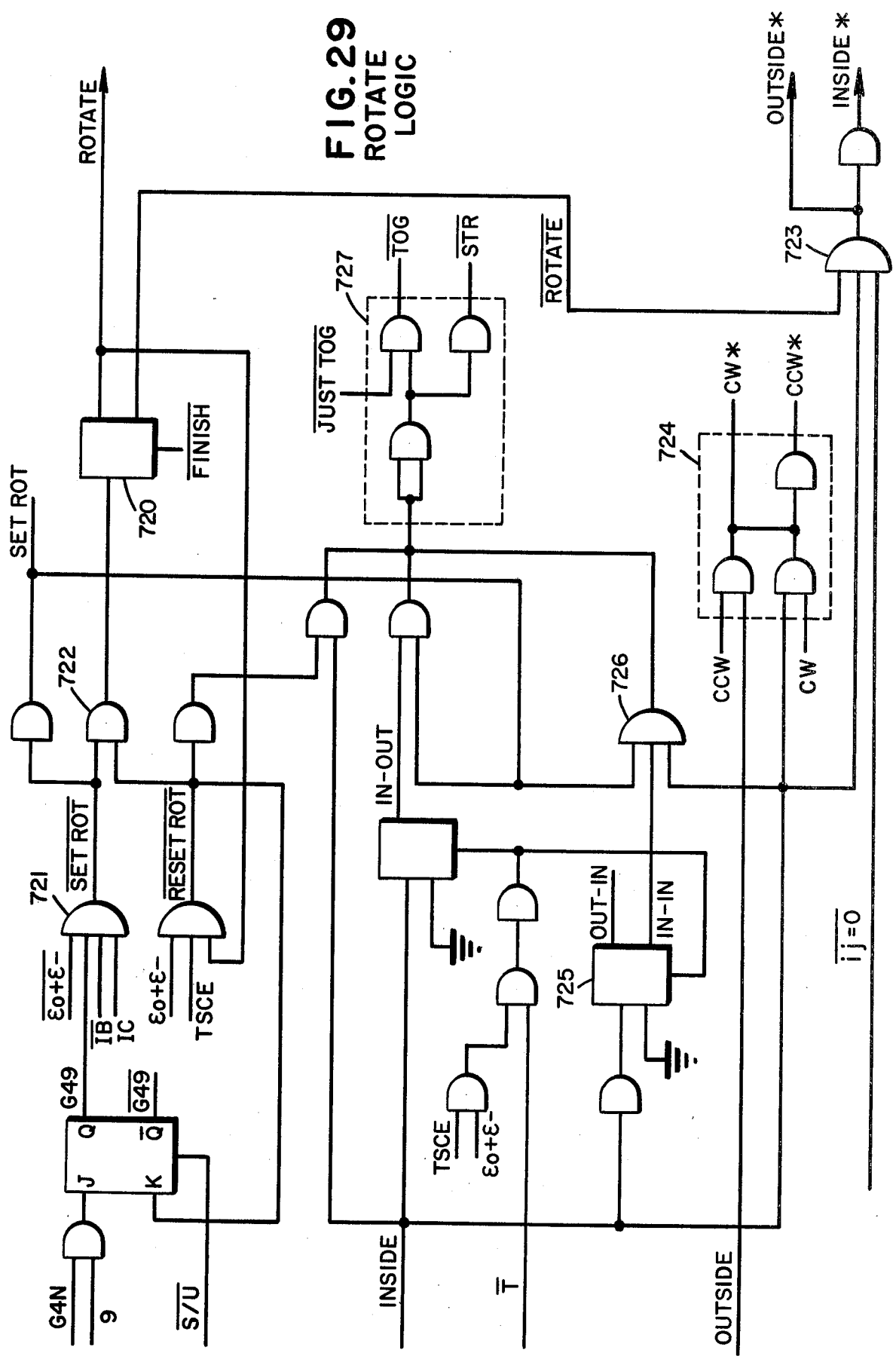
FIG. 29 shows the rotate logic.

ROTATE LOGIC (FIGS. 28 and 29)

In a contour cutting operation, it is often necessary to cut two surfaces which are not continuous or tangent to one another. Such would be the case at corners or the like. At the point of discontinuity several possible situations exist. The surfaces can go (1) from an outside cut to an outside cut; (2) from an outside cut to an inside cut; (3) from an inside cut to an outside cut; or (4) from an inside cut to an inside cut. The fourth possibility is depicted in FIG. 28. At each juncture, the rotate logic will cause the offset vector to rotate around the point of discontinuity, starting from a location perpendicular to the first surface and going to a location were it is perpendicular to the second surface.

Referring to FIG. 28, the contour control system could be first programmed to cut an arc AB having a radius $R_1$ and using a tool having a radius $r_1$. To perform this contouring operation, the operator would program codes G42, G43 and G48 (see Table A). Decoding G42 will cause flip-flop 255$b$ (FIG. 18A) to sew CW hi; G43 will cause the INSIDE/OUTSIDE flip-flop 255$a$ to set INSIDE hi; G48 will cause flip-flop 575 (FIG. 15C) to set DIROS hi. Thus, the CRC system will perform an inside cut in a direct offset mode. At the end of the problem, point P will be coincident with end point B. The next problem requires a cut along arc BC and would employ program codes G06, G42, G43 and G49. Codes G42 and G43 need not be reprogrammed after problem AB since no mode change is involved. At the end of problem AB, the sub-contour vector is located at $r'_1$. To begin the next problem (contouring arc BC), the sub-vector must be rotated to location $r_2$. This requires rotating the sub-vector about the point of discontinuity B. The system toggles the sense of the problem to first perform a cross offset problem and then a direct offset problem as the sub-vector $r$ crosses the Y axis. Also, the sub-contour system must be made to cause motion along the X and/or Y axis for each TMOS pulse generated, even though an inside contour mode had been programmed. This is accomplished by the rotate logic of FIG. 29 which enables the CRC system to step along the X and/or Y axes under the control of sub-contour stepping pulses.

A vector rotation operation requires that the G06 and G49 codes be programmed. The G06 mode will enable the initialize control logic to compute the initial cross-error. When initialize control logic ring counter 601 sequences to state (0011) and the initial cross-error is positive ($\overline{Eo + E}$ — hi), a programmed G49 will cause the output of gate 721 to go lo ($\overline{SET ROT}$ lo) and the output of gate 722 to go hi, thereby setting a ROTATE flip-flop 720 (ROTATE hi). Contouring problem BC requires an inside cut with motion in the clockwise direction to be performed and these instructions are programmed by the operator. Rotation of the subvector from location $r'_1$ to $r_2$ requires rotation in a counterclockwise direction. The programmed instructions are therefore modified internally in the logic apparatus to simulate clockwise movement while actually counterclockwise movement is performed and to permit movement to occur based on sub-contour output pulses even though an inside cut instruction was programmed.

When the rotate flip-flop 720 was set hi, $\overline{ROTATE}$ goes lo and the output of gate 723 goes hi (OUTSIDE * hi). The programmed instructions INSIDE hi and CW hi cause gate circuit 724 to generate a CCW * hi. The outputs of gate circuit 724 are coupled to appropriate indicated inputs of the steering logic gate circuits 261 and 262 (FIG. 18C) which control the direction of movement relative to the X and Y axes.

The signal OUTSIDE * (hi) is applied as one input to a gate 263A and a gate 263B of the output pulse logic (FIGS. 30A–30B). The SUB output from MAIN/SUB flip-flop 643 (FIG. 27A), the $i$ SEQ output from flip-flop 567 (FIG. 15B) and the TMOS output from gate 574 (FIG. 15A) are connected to gate 263A as its other inputs. Gate 263B has the same OUTSIDE *, SUB and TMOS inputs as gate 263A; output $j$ SEQ of flip-flop 568 is connected as the fourth input. TMOS pulses occurring at the end of a sub $i$ sequence (SUB hi, $i$ SEQ hi) pulse the X axis motor ($\overline{X\ PUL\ OUT}$ lo) through gate 244; gate 263B is enabled by TMOS pulses generated at the conclusion of a sub $j$ sequence (SUB hi, $j$ SEQ hi) to pulse the Y axis motor ($\overline{Y\ PUL\ OUT}$ lo) through gate 245.

When rotating the subvector from an inside to an inside cut, the sense of the sub-contour problem is changed from that of the just-completed sub-contour problem. Thus, as shown in FIG. 28, the sub-contour problem for arc AB was direct but rotation from $r'_1$ to $r_2$ involves a cross problem. Where the sub-vector crosses a cardinal axis (in this case, the Y axis) during a rotation sequence, the sense of the sub-contour operation switches from cross to direct under the control of the sub-contour logic.

The instruction signal INSIDE does not change from arc AB to arc BC; therefore flip-flop 725 will remain reset hi (OUT-IN lo, IN-IN hi); the output of gate 726 will thus go lo when the SET ROT input goes hi, generating a toggle signal ($\overline{TOG}$ lo) at the output of gate circuit 727. This is applied to the input of gates 578A and 578B (FIG. 15C) to cause direct/cross flip-flop 575 to change state.

During the rotation mode, the cross error is constantly being updated as the offset vector rotates. When the sign of the cross-error becomes negative or the value of the cross-error becomes zero ($\overline{Eo + E}$ − hi), a RESET ROT pulse is generated ($\overline{RESET\ ROT}$ lo) coincident with the next TSCE pulse. This pulse resets the rotate flip-flop 720 (ROTATE lo) and will also toggle the sense of the problem back since the new problem calls for an inside cut.

OUTPUT PULSE LOGIC (FIGS. 30A–30C)

In a conventional contouring system, or in a noncompensation mode of the contouring system of this invention, the total distances to be traversed along the X and Y axes are loaded into the X and Y axis counters, respectively. As the counters are counted to zero, the X and Y axis motors are pulsed accordingly. In the CRC mode, the path of the center of the cutter (the tip of the offset vector) will, for an outside problem, traverse a distance greater than that programmed whereas, for an inside problem, the cutter will traverse a distance less than that programmed. These differences are accounted for by the operation of the sub-contour system; in an outside sub-contouring mode, the sub-contour system will generate additional motor drive pulses, whereas this is not so for an inside contour mode.

X and Y axes drive pulses ($\overline{XPULOUT}$ lo and $\overline{YPULOUT}$ lo) are generated under the control of an OUTPUT PULSE LOGIC section of the pulse out and steering logic 26.

Pulses from the X counting channel ($\overline{XPULIN}$ lo) are gated through gates 266a, 264a and 244 to the X axis motor logic ($\overline{XPULOUT}$ lo) when the main contour is enabled (MAIN hi) during the normal running of the problem (NORM hi) and the problem is outside (OUTSIDE * hi). Pulses from the Y counting channel ($\overline{YPULIN}$ lo) are gated through gates 266b, 264b and 245 to the Y axis motor logic ($\overline{YPULOUT}$ lo). In the sub-contour mode, the output pulse TMOS will be gated through gates 263a and 244 to generate ($\overline{XPULOUT}$ lo) if in the OUTSIDE * mode and if the sub-contour sequence included an $i$ sequence. Similarly, for a $j$ sequence, the TMOS pulse will be gated through gates 263b and 245 to the Y axis motor logic ($\overline{YPULOUT}$ lo). For an inside cut, the output pulse logic controls the generation of drive pulses so that the net move along the X or Y axis will be less than that programmed. A detailed description of the manner in which this is accomplished is given below with respect to the X axis drive only, since the Y axis drive control is essentially identical.

The output pulse counting logic (FIG. 30A) includes two counters, an owe counter 901 and a subtract counter 902, which are initially reset to states (00) and (00), respectively, by the decade zero signal DZ ($\overline{DZ}$ lo).

Each move pulse (TM) generated by the main contour logic or (TMOS) generated by the sub-contour logic will set update flip-flop 641 (FIG. 27A) to enable the update logic 58 to update the cross-error; the sign of the updated cross-error will, as has been described above, trigger a CRC control logic operation to enable the main or sub-contour logic as appropriate. During the course of a cross-error update after a sub-contour $i$ sequence, an $E$ UPDATE $i$ SEQ signal will be generated by the output of gate 588 (FIG. 24B) in update ring counter state (1111). The signal $E$ UPDATE $i$ SEQ will be applied to the indicated input of a gate 906 to sequence counter 901 from state (00) (even) to state (10) (owe one pulse).

Each time an X PUL IN ($\overline{XPULIN}$ lo) signal is generated during a main I sequence (MAIN hi), gate 266A will be enabled and a signal X PUL hi will be generated.

Thus, if the next contouring sequence after the first $i$ sequence is a main contour I sequence, an X PUL signal will be generated and applied to the input of a gate 907 to sequence counter 901 from the (10) state back to the (00) state; the next main I sequence will propagate X PUL signals through a gate 905 and gate 244 to the X axis motor logic.

If, however, the next sequence after the first sub $i$ sequence is another sub $i$ sequence, counter 901 will sequence from state (10) to state (01) (owe two pulses). Thereafter, two successive main I sequences will be required to shift counter 901 first to state (10) and then to state (00) so that the third successive main I sequence will propagate X PUL OUT signals to the X axis motor logic through gate 905. Subsequent X pulses will be prevented from decrementing counter 901 below (00) by gate 907a.

It will be seen, therefore, that whenever a sub $i$ sequence has been performed, owe counter 901 is clocked up. Whenever a main I sequence is performed, the owe counter is clocked down. An X pulse is gated through only when the owe counter is even, which represents a net surplus of main sequences.

Near the conclusion of the CRC problem, the X and Y counters will have been clocked to zero, but as was stated previously, the problem cannot be ended until the sub-vector leads the main vector or the cross-error becomes zero or negative. If the main counters do reach zero with the sub-vector lagging the main vector, additional sub sequences will be required. The subtract counter 902 is utilized in conjunction with owe counter 901 to prevent the system from owing one or perhaps two pulses which have already been taken. (Since the sub-vector cannot be greater than the main vector, a maximum of two consecutive sub sequences is all that is ever required).

At the start of an inside contour problem, the first two X PUL signals generated after the owe counter has been returned to state (00) are applied to one input of a gate 903 to clock subtract counter 902 first to state (10) and then to state (01). In this latter state, output $\overline{DX}$ goes lo, inhibiting further X PUL signals from being gated through gate 903 to clock counter 902.

For example, if the first contour sequence had been a main I sequence, subtract contour 902 will be clocked to state (10). If the next two sequences are sub $i$ sequences, owe counter 901 will be clocked first to state (10) and then to state (01). The next two main I sequences clock counter 901 to state (10) and then to state (00). If the next succeeding sequence is another main I sequence, counter 902 will be clocked to state (01); no further clocking of counter 902 by X PUL signals will occur for the remainder of the problem.

The first two X PUL signals which clock counter 902 will be prevented from pulsing the X axis motor due to the fact that gate 905 will remain disabled until after counter 902 has been clocked to state (01). For a problem involving an inside cut, the signal OUTSIDE * will be lo, thereby disabling gate 264a and preventing X PUL signals from going directly to the X axis motor logic.

Thereafter, the generation of X PUL OUT signals will be controlled by the operation of owe counter 901. From the above, it will be seen that further X PUL signals will propagate through gates 905 and 244 to pulse the X axis motor whenever a main contour sequence is performed after the first two command pulses have been inhibited from operating the X axis motor and after counter 901 has returned to state (00).

At the conclusion of the CRC problem, when the sub vector has advanced beyond the main vector, and after a LAST PULSE signal has been generated ($\overline{LAST\ PULSE}$ lo), the output pulse logic (FIG. 30C) compares the states of counters 901 and 902 and returns a number of pulses to the system which is equal to the difference between the states of the two counters. This will account for the two pulses subtracted at the beginning of the CRC problem. A lo output at either of gates 908 or 909 will generate a signal ADD X and a signal ADD (X+Y). The latter will set flip-flop 650 (PULSE (X+Y) hi) which is applied along with the ADD X and a TM (the latter generated at the conclusion of a main contour sequence) to a gate 910. An output pulse is thereby generated to simultaneously step the X axis motor and clock counter 902 down one state. If counter 902 had been in state (01), indicating that two pulses must be returned to the system, the counter is sequenced down to state (10) and gate 910 is again enabled at the conclusion of the next succeeding main contour sequence resulting in a TM output signal. When the states of counters 901 and 902 agree, input ADD X goes lo, all relevant gates are disabled, and the problem is over.

It is to be understood that various modifications in the structural details of the preferred embodiment described herein may e made within the scope of this invention and without departing from the spirit thereof. It is intended that the scope of this invention shall be limited solely by the hereafter appended claims.

What is claimed is:

1. A control system for controlling movement of a machining means relative to a workpiece support means in accordance with a set of predetermined input instructions corresponding to a prescribed path of movement in at least two directions with respect to a common origin, wherein X and Y, respectively, represent the total excursions in said two directions, I and J represent coordinates of one end of a main contour vector along said X and Y excursions, respectively, said main contour vector having its other end coincident with said common origin, and $i$ and $j$ represent the lengths of components, along said X and Y excursions, respectively, of one end of a sub-contour vector having its other end coincident with said one end of said main contour vector, said control system comprising:

main contour logic means for generating output signals for controlling the relative movement of said machining and support means in at least one of the X and Y directions as a function of the relative magnitudes of I and J and the algebraic sign of a main contour error determined from the values of I and J;

sub-contour logic means for generating output signals for controlling said relative movement in at least one of the X and Y directions as a function of the relative magnitudes of $i$ and $j$ and the algebraic sign of a sub-contour error determined from the values of $i$ and $j$;

cross-error logic means for determining the algebraic sign of a cross-error $E = Ij - iJ$; and cutter compensation control logic means coupled to said main contour control logic means, said sub-contour control logic means, and said cross-error logic means for selectively enabling one or the other of said main and sub-contour control logic means depending on the algebraic sign of said cross-error.

2. The control system according to claim 1, further comprising: update means coupled to said cross-error logic means for updating the value of said cross-error by at least one of the values of I, J, $i$ and $j$ after each operation of the selected main and sub-contour control logic means.

3. A control system for controlling movement of a machining means relative to a workpiece support means in accordance with a set of predetermined input instructions corresponding to a prescribed path of movement in at least two directions with respect to a common origin, wherein X and Y, respectively, represent the total excursions in said two directions, I and J represent coordinates of one end of a main contour vector along said X and Y excursions, respectively, said main contour vector having its other end coincident with said common origin, and $i$ and $j$ represent the lengths of components, along said X and Y excursions, respectively, of one end of a sub-contour vector having its other end coincident with said one end of said main contour vector, said control system comprising:

drive control means for controlling the relative movement of said machining and support means in said X and Y directions;

main contour control logic means coupled to said drive control means and including means for determining the algebraic sign of a main contour error from at least one of I and J and for determining the relative magnitudes of I and J, and means for generating instruction signals for said drive control means as a function of the sign of said main contour error and the relative magnitudes of I and J;

sub-contour control logic means coupled to said drive control means and including sub-contour error mans for determining the algebraic sign of a sub-contour error from $i$ and $j$ and for determining the relative magnitudes of $i$ and $j$, and means for generating instruction signals for said drive control means as a function of the sign of said sub-contour error and the relative magnitudes of $i$ and $j$;

cross-error logic means for determining a cross-error $E = Ij - iJ$;

cutter compensation control logic means coupled to said cross-error logic means, said main contour control logic means, and said sub-contour logic means for selectively enabling one or the other of said main and sub-contour control logic means depending upon the sign of said cross-error; and update means coupled to said cross-error logic means for updating the value of said cross-error upon the generation of an instruction signal at the output of the selected main and sub-contour control logic means.

4. The control system according to claim 3, further comprising: rotate logic means interposed between said sub contour control logic and said drive control means for controlling movement of said sub vector between two successive machining operations.

5. The control system according to claim 3, wherein said drive control means further comprises output logic means coupled to said main and sub-contour control logic means for inhibiting at least some of the instruction signals generated by said main and sub-contour control logic means when said input instructions call for an inside or concave contour to be performed.

6. The control system according to claim 5, wherein said outut logic means comprises:

means inhibiting a predetermined initial number of main contour control logic instruction signals; and means inhibiting a further predetermined number of main contour control logic instruction signals following the generation of a corresponding number of instruction signals from said sub-contour control logic means.

7. The control system according to claim 6, wherein said means inhibiting said predetermined initial number of main control logic instruction signals comprises:

first counter means;

means coupling said sub-contour control logic means to said first counter means for incrementing said first counter means as a function of the generation of instruction signals from said sub-contour control logic means; and means coupling said main contour control logic means to said first counter means for decrementing said first counter means upon the generation of instruction signals from said main contour control logic means.

8. The control system according to claim 7, wherein said means inhibiting said further predetermined number of main contour control logic output signals comprises:

second counter means; and means coupling said first counter means and said main contour control logic means to said second counter means for incrementing said second counter means upon the generation of instruction signals fron said main contour control logic means when the contents of said first counter means is a predetermined value.

9. The control system according to claim 3, wherein:

said main contour control logic means further comprises means for incrementing at least one of I and J after a determination of said main contour error; and said sub-contour control logic means further comprises means for incrementing at least one of $i$ and $j$ after a determination of said sub-contour error.

10. The control system according to claim 9, wherein said update means comprises: means for incrementing said crosserror E with at least one of the values of I, J, $i$ and $j$ after an instruction signal has been generated by one of said main and sub-contour control logic means.

11. The system according to claim 3, wherein said cutter compensation control logic means includes means for enabling said main contour control logic means and concurrently disabling said sub-contour control logic means when said cross-error E is less than or equal to zero, and for enabling said sub-contour control logic means and concurrently disabling said main contour control logic means when said cross-error E is greater than zero.

12. The control system according to claim 8; wherein said rotate logic means comprises means for gating instruction signals from said sub-contour control logic means to said drive control means only upon the occurrence of a programmed instruction input signal to said rotate logic means calling for rotation of said one of said machining and support means relative to the other about a point of discontinuity.

13. A method for controlling movement of a machining means relative to a workpiece support means in accordance with a set of predetermined input instructions corresponding to a prescribed path of movement in at least two directions relative to a common origin, wherein X and Y, respectively, represent the total excursions in said two directions, I and J represent coordinates of one end of a main contour vector along said X and Y excursions, respectively, said main contour vector having its other end coincident with said common origin, and $i$ and $j$ represent the lengths of components, along said X and Y excursions, respectively, of one end of a sub-contour vector having its other end coincident with said one end of said main contour vector, said method comprising the steps of:

determining a main contour error from I and J and the algebraic sign of said main contour error;

determining the relative magnitudes of I and J;

performing a main contour operation to generate a drive instruction signal as a function of the algebraic sign of said main contour error and the relative magnitudes of I and J;

determining a sub-contour error from $i$ and $j$ and the algebraic sign of said sub-contour error;

determining the relative magnitudes of $i$ and $j$;

performing a sub-contour operation to generate a drive instruction signal as a function of the algebraic sign of said sub-contour error and the relative magnitudes of $i$ and $j$;

determining the algebraic sign of a cross-error $E = Ij - iJ$;

selecting one of said main and sub-contour operations as a function of the algebraic sign of said cross-error; and positioning said machining and support means relative to each other under the control of the drive instruction signal generated by the selected main and sub-contour operation.

14. The method according to claim 13, wherein said main contour operation comprises at least one of an I sequence and a J sequence where an I sequence is performed when I is less than J and results in the generation of a signal calling for movement in the X direction and a J sequence is performed when I is greater than or equal to J and results in the generation of a signal calling for movement in the Y direction; wherein:
- an I sequence includes the steps of adding the value of I to said main contour error, thereafter incrementing the value of I by 1, and thereafer algebraically adding the incremented value of I to said main contour error; and
- a J sequence includes the steps of subtracting the value of J from said main contour error, thereafter incrementing the value of J by 1, and thereafter algebraically adding the incremented value of J to said main contour error.

15. The method according to claim 14, further comprising the step of: moving said machining and support means relative to each other under the control of a sub-contour operation at the conclusion of a first machining operation to align said sub-vector relative to said main vector at the start of a next succeeding second machining operation.

16. The method according to claim 14, further comprising the step of: inhibiting some outputs of said sub-contour operation from moving said machining and support means relative to each other when said input instructions call for an inside or concave contour operation to be performed to prevent said sub-vector from getting ahead of said main vector.

17. The method according to claim 14, comprising the further steps of:
- performing a main contour operation when the cross-error $E$ is less than or equal to zero;
- incrementing the value of the cross-error $E$ by one of $i$ and $j$ after the performance of one of said I and J sequences; and
- incrementing the value of the cross-error $E$ by the other of $i$ and $j$ after the performance of the other of said I and J sequences.

18. The method according to claim 17, wherein said sub-contour operation comprises at least one of an $i$ sequence and a $j$ sequence, where an $i$ sequence is performed when $i$ is less than $j$ and results in the generation of a signal calling for movement in the X direction, and a $j$ sequence is performed when $i$ is greater than or equal to $j$ and results in the generation of a signal calling for movement in the Y direction, and wherein:
- an $i$ sequence includes the steps of algebraically adding the value of $i$ to said sub-contour error, thereafter incrementing the value of $i$ by 1, and thereafter algebraically adding the incremented value of $i$ to said sub-contour error; and
- a $j$ sequence includes the steps of algebraically adding the value of $j$ to said sub-contour error, thereafter incrementing the value of $j$ by 1, and thereafter algebraically adding the incremented value of j to said sub-contour error.

19. The method according to claim 18, comprising the further steps of:
- performing a sub-contour operation when the cross-error $E$ is greater than zero;
- incrementing the value of the cross-error $E$ by one of I and J after the performance of one of said $i$ and $j$ sequences; and
- incrementing the value of the cross-error $E$ by the other of I and J after the performance of the other of said $i$ and $j$ sequences.

20. The method according to claim 19 comprising the further steps of:
- comparing the signs of I and i;
- subtracting the value of J from the value of the cross-error $E$ after the performance of a $j$ sequence when the signs of I and $i$ agree.

21. The method according to claim 19, comprising the further steps of:
- comparing the signs of I and $i$;
- adding the value of J to the value of $E$ after the performance of a $j$ sequence when the signs of I and $i$ do not agree, 22. The method according to claim 19, comprising the further steps of:
- comparng the signs of J and $j$; and
- subtracting the value of I from the value of the cross-error $E$ after the performance of an $i$ sequence when the signs of J and $j$ agree.

23. The method according to claim 19, comprising the further steps of:
- comparing the signs of J and $j$; and
- adding the value of I to the value of the cross-error $E$ after the performance of an $i$ sequence when the signs of J and $j$ do not agree.

* * * * *